United States Patent [19]

Nakai et al.

[11] Patent Number: 5,748,798
[45] Date of Patent: May 5, 1998

[54] METHOD AND SYSTEM FOR ADDING EFFECTS TO GRAY SCALE IMAGES

[75] Inventors: Masaru Nakai, Moriguchi; Taketo Yoshii, Amagasaki; Katsuyuki Morita, Ikeda; Yoshiyuki Miyabe, Osaka; Mika Matsui, Hirakata, all of Japan

[73] Assignee: Matsushita Wlectric Ind., Osaka-fu, Japan

[21] Appl. No.: 363,373

[22] Filed: Dec. 23, 1994

[30] Foreign Application Priority Data

Dec. 28, 1993 [JP] Japan .................. 5-336368
Dec. 28, 1993 [JP] Japan .................. 5-336369

[51] Int. Cl.6 ............... G06K 9/44; G06K 9/40; H04N 1/38; G06F 15/00
[52] U.S. Cl. ............ 382/258; 382/257; 382/259; 382/266; 395/110; 358/464
[58] Field of Search ............. 358/464; 382/256, 382/257, 258, 163, 259, 263, 266, 267; 395/110

[56] References Cited

U.S. PATENT DOCUMENTS

| | | | |
|---|---|---|---|
| 4,859,999 | 8/1989 | Koso | 382/266 |
| 5,062,724 | 11/1991 | Iizuka | 340/735 |
| 5,113,252 | 5/1992 | Horie et al. | 358/464 |
| 5,131,049 | 7/1992 | Bloomberg et al. | 382/257 |
| 5,142,589 | 8/1992 | Lougheed et al. | 382/259 |
| 5,181,261 | 1/1993 | Nagao | 382/266 |
| 5,506,941 | 4/1996 | Kurumida | 395/110 |
| 5,509,085 | 4/1996 | Kakutani | 382/167 |
| 5,526,476 | 6/1996 | Motokado et al. | 395/151 |

*Primary Examiner*—Andrew W. Johns
*Assistant Examiner*—Monica S. Davis
*Attorney, Agent, or Firm*—Price, Gess & Ubell

[57] ABSTRACT

The present invention enables application of the bold process to thicken the data or the outline process to hollow the inside of the data to leave the contour thereof to the gray scale data representing the gray scale font data or image data. Using the gray scale modified data as a result of modification process can make sentences visually appealing. The gray scale modified data comprises an area judging means, a background color area processing means, and a non-background color area processing means. The area judging means judges whether each pixel on the gray scale data to be processed has the background color level. The background color area processing means sets a value calculated by the values of the neighboring pixels of each pixel on the background color area to the value of the mapping pixel on the modified data. The non-background color area processing means sets a value calculated by a certain process for each pixel on the non-background color area to the value of the mapping pixel on the modified data.

42 Claims, 50 Drawing Sheets

$G_0(i, j)$

- 0
- 1
- 2
- 3
- 4
- 5

G5 ( i, j )

G6 ( i, j )

$G_1(i,j)$
(SHIFT TO LEFT BY 1 PIXEL)

$G_2(i,j)$
(SHIFT TO RIGHT BY 1 PIXEL)

G4(i,j)

G7(i,j)

METHOD AND SYSTEM FOR ADDING EFFECTS TO GRAY SCALE IMAGES

BACKGROUND OF THE INVENTION

1. Field of the Invention

The present invention relates to a method and system for generating modified data such as bold or outline data from gray scale data.

2. Description of the Prior Art

A system for generating modified data by applying a modification process to bi-value (e.g., black and white) data such as font data or image data is a known art.

The modification process referred herein includes a bold process to expand an image in the font data or image data, and an outline process to hollow the font data or image data to leave the contour thereof. The modified data referred herein means the post-bold-process data (bold data) or post-outline-process data (outline data). The bold data of the font data, in particular, are generally referred to as "bold type". Visually appealing sentences or the like can be generated when the modified data are used.

FIG. 56 is a view showing an example of the structure of a modified data generating system which performs the bold process.

In the drawing, numeral 5601 denotes a shift data generating unit and numeral 5602 denotes a bi-value data synthesizing unit.

The operation of the above modified data generating system will be explained while referring to FIGS. 56 through 59.

FIG. 57 shows an example of the bi-value data to be processed, or namely, the font data of "十", the Chinese character for a number ten. All the pixels, P(1,1), P(1,2), P(1,3), . . . , P(1,16), P(2,1), . . . , P(16,16), are indicated individually either in white or black. Assume that a value "0" is given to the white pixel while a value "1" to the black pixel for the use of the computers.

The shift data generating unit 5601 generates, for example, four kinds of data as shown in FIGS. 58(a) through 58(d) by shifting the bi-value data shown in FIG. 57 vertically (up and down) and horizontally (left and right) by one pixel, respectively.

The bi-value data synthesizing unit 5602 synthesizes the four kinds of data shown in FIGS. 58(a) through 58(d) and the original data shown in FIG. 57 by calculating the logical OR of the value of the mapping pixels (pixels positioned at the same location) to generate bi-value bold data as shown in FIG. 59. When at least one of the mapping pixels exhibits "1" (black), the post-synthesis pixel exhibits "1"; when all the mapping pixels exhibit "0" (white), the post-synthesis pixel exhibits "0". The bi-value bold data may be generated by shifting the original data in the directions other than vertical and horizontal directions, or by shifting the same by more than one pixel.

The bi-value bold data shown in FIG. 59 are generated by applying the bold process to the bi-value data shown in FIG. 57 as explained above.

FIG. 60 is a view showing an example of the structure of a modified data generating system which performs the outline process.

In the drawing, numeral 6001 denotes a bi-value bold data generating unit and numeral 6002 denotes an exclusive OR calculating unit.

The operation of the above modified data generating system will be explained while referring to FIGS. 57 through 61.

Note that the bi-value data shown in FIG. 57, which were used to explain the bold process, are also used herein.

The bi-value bold data generating unit 6001 corresponds to the modified data generating system for performing the bold process shown in FIG. 56. The bi-value bold data generating unit 6001 generates four kinds of data as shown in FIGS. 58(a) through 58(d) by shifting the bi-value data shown in FIG. 57 vertically (up and down) and horizontally (left and right) by one pixel, respectively. Accordingly, the bi-value bold data generating unit 6001 synthesizes the four kinds of data and the original data by calculating the OR of the mapping pixels (pixels positioned at the same location) to generate the bi-value bold data as shown in FIG. 59.

The exclusive OR calculating unit 6002 generates bi-value outline data as shown in FIG. 61 by calculating the exclusive OR of the values of the mapping pixels (pixels positioned at the same location) on the original bi-value data shown in FIG. 57 and the bi-value bold data shown in FIG. 59 generated by the bi-value bold data generating unit. When both the mapping pixels (pixels positioned at the same location) exhibit the same value, or namely either "1" or "0", the post-calculation pixel exhibits "0"; when the mapping pixels exhibit different values, that is to say, one exhibits "1" and the other "0", the post-calculation pixel exhibits "1".

The bi-value outline data as shown in FIG. 61 are generated by applying the outline process to the bi-value data shown in FIG. 57 as explained above.

With the above prior art, however, it is the bi-value data such as the ones shown in FIG. 57 that are applicable to the modification process such as the bold process or outline process, meaning that the gray scale data including intermediate shades of gray can not be modified.

The gray scale data referred herein are, for example, the data as shown in FIG. 7.

The gray scale data represent the font data of "十" shown in FIG. 8, the Chinese character for a number ten, in six values (0–5) depending on the tone. The correlation between the six values and tone is set forth in FIG. 7 in the right: "0" represents white and "5" represents black while "1" through "4" representing intermediate shades of gray. The value of each pixel in FIG. 7 is determined in proportional to the area of the black font data within each pixel in FIG. 8.

By displaying the gray scale data on a gray scale output device such as a color display unit, the font data or image data are displayed as if they were displayed in smaller pixels than in those of actual size. The font data or image data thus displayed have higher fidelity to the original shape: the contour is smooth and the shape is well balanced and hence well defined.

It is impossible to apply the bold process or outline process to the gray scale data with the conventional modified data generating system. Let us prove this by following a hypothetical method for applying the bold process to the gray scale data based on the method utilized for the bi-value data.

To begin with, the shift data generating unit 5601 of the conventional modified data generating system shown in FIG. 56 generates four kinds of shift data as shown in FIGS. 9(a) through 9(d) by shifting the gray scale data shown in FIG. 7 vertically (up and down) and horizontally (left and right) by one pixel, respectively. Next, the bi-value data synthesizing unit 5602 calculates the OR of the values of the mapping pixels on the four kinds of shift data and the original gray scale data shown in FIG. 7. However, since there is no calculation such that calculates the OR of the gray scale data, the maximum value is calculated instead. The resulting gray scale bold data are shown in FIG. 10, which should be the bold font data of FIG. 8, or the ones as shown in FIG. 13, in gray scale. The data in FIG. 10 reveal that the vertical stem pixels of "+", the Chinese character for a number ten, are all displayed in the intermediate shades of gray, which causes an imbalance with the value in the horizontal stem, and thus reducing the fidelity of the resulting data with respect to the bold font data.

The stem referred herein means each of the straight lines that altogether form the font data.

As has been proved above, the conventional modified data generating system can not generate gray scale bold data or outline data naturally when it uses a hypothetical method for applying the bold process based on the one utilized for the bi-value data.

For this reason, it is impossible to generate visually appealing sentences using the gray scale modified data.

SUMMARY OF THE INVENTION

Accordingly, the present invention has a first object to provide a gray scale modified data generating system for applying an adequate bold process or outline process to the gray scale data.

The present invention has a second object to provide a method for generating gray scale modified data for generating well defined post-bold-process or post-outline-process gray scale data.

The present invention has a third object to provide a method and system for generating gray scale modified data for expanding an image in the gray scale data linearly, for example, horizontally or vertically.

The above objects can be fulfilled by a system for generating modified image data composed of destination pixels corresponding to source pixels in gray scale image data by applying a process adding effects to the gray scale image data, the system comprising:

an area judging unit for judging whether each source pixel has a background color level;

a first processing unit for setting, when the source pixel is judged to have the background color level, a level to the destination pixel in a corresponding position, the level being calculated based on a plurality of pixels adjacent to the source pixel; and a second processing unit for setting, when the source pixel is judged not to have the background color level, a level calculated by a predetermined process to the destination pixel in a corresponding position.

The process adding effects may be a bold process to expand images in the gray scale image data vertically and horizontally;

the first processing unit may set, when the source pixel is judged by the area judging unit to have the background color level, a highest level among levels of four pixels adjacent to the source pixel vertically and horizontally, respectively, to the destination pixel;

the second processing unit may set, when the source pixel is judged by the area judging unit not to have the background color level, a foreground color level to the destination pixel.

The process adding effects may be a bold process to expand images in the gray scale image data horizontally;

the first processing unit may set a level of a destination pixel in the modified image data at a higher level out of levels of two pixels adjacent to a source pixel on its right and left, when the source pixel is judged to have the background color level by the area judging unit. The second processing unit may include:

a first judging unit for further judging whether a source pixel has an intermediate shade level or a foreground color level when the source pixel is judged not to have the background color level by the area judging unit;

a second judging unit for judging whether at least one of a highest level out of levels of three adjacent pixels over and a highest out of levels of three adjacent pixels under and diagonally upper right and upper left of the source pixel and diagonally lower right and lower left of the source pixel has the background color level when the source pixel is judged to have an intermediate shade level by the first judging unit; and a level setting unit for setting a level of a destination pixel in the modified image data to equal a level of the source pixel, if it is a case that the source pixel is judged to have the intermediate shade level by the first judging unit and at least one of its highest levels is judged by the second judging unit to be the background color level, and, if it is not the case, for setting a level of a destination pixel in a corresponding position in the modified data to equal the foreground color level when the source pixel is in a non-background color area.

The process adding effects may be a bold process to expand images in the gray scale image data vertically;

the first processing unit may set a level of a destination pixel in the modified image data at a higher level out of levels of two pixels adjacent to a source pixel above and below, when the source pixel is judged to have the background color level by the area judging unit.

The second processing unit may include:

a first judging unit for further judging whether a source pixel has an intermediate shade level or a foreground color level when the source pixel is judged not to have the background color level by the area judging unit;

a second judging unit for judging whether at least one of a highest level out of levels of three adjacent pixels left and diagonally upper left and lower left of the source pixel and a highest out of levels of three adjacent pixels right and diagonally upper right and lower right of the source pixel has the background color level when the source pixel is judged to have an intermediate shade level by the first judging unit; and a level setting unit for setting a level of a destination pixel in the modified image data to equal a level of the source pixel, if it is a case that the source pixel is judged to have the intermediate shade level by the first judging unit and at least one of its highest levels is judged by the second judging unit to be the background color level, and, if it is not the case, for setting a level of a destination pixel in a corresponding position in the modified data to equal the foreground color level when the source pixel is in a non-background color area.

The process adding effects may be an outline process applied to the gray scale image data;

the first processing unit may set, when the source pixel is judged by the area judging unit to have the background color level, a highest level among levels of four pixels adjacent to the source pixel vertically and horizontally, respectively, to the level to the destination pixel in the modified image data; and the second processing unit may set, when the source pixel is judged by the area judging unit not to have the background color level, a level of reverse video of the source pixel to the level of the destination pixel in the modified image data.

The system may furter comprises a repetition control unit for controlling the first processing unit and the second processing unit to repeat an operation for a specific number of times.

The above object can also be fulfilled by a method for generating modified image data composed of destination pixels corresponded to source pixels in gray scale image data by applying a process adding effects to gray scale image data, comprising the steps of:

area judging step for judging whether each source pixel has a background color level;

first processing step for setting, when the source pixel is judged to have the background color level, a level to the destination pixel in a corresponding position, the level being calculated based on a plurality of pixels adjacent to the source pixel; and second processing step for setting, when the source pixel is judged not to have the background color level, a level calculated by a predetermined process to the destination pixel in a corresponding position.

The process adding effects may be a bold process to expand images in the gray scale image data vertically and horizontally;

the first processing step may set, when the source pixel is judged by the area judging step to have the background color level, a highest level among levels of four pixels adjacent to the source pixel vertically and horizontally, respectively, to the destination pixel;

the second processing step may set, when the source pixel is judged by the area judging step not to have the background color level, a foreground color level to the destination pixel.

The process adding effects may be a bold process to expand images in the gray scale image data horizontally;

the first processing step may set a level of a destination pixel in the modified image data at a higher level out of levels of two pixels adjacent to a source pixel on its right and left, when the source pixel is judged to have the background color level by the area judging step. The second processing step may include:

a first judging step for further judging whether a source pixel has an intermediate shade level or a foreground color level when the source pixel is judged not to have the background color level by the area judging step;

a second judging step for judging whether at least one of a highest level out of levels of three adjacent pixels over and diagonally upper right and upper left of the source pixel and a highest out of levels of three adjacent pixels under and diagonally lower right and lower left of the source pixel has the background color level when the source pixel is judged to have an intermediate shade level by the first judging step; and a level setting step for setting a level of a destination pixel in the modified image data to equal a level of the source pixel, if it is a case that the source pixel is judged to have the intermediate shade level by the first judging step and at least one of its highest levels is judged by the second judging step to be the background color level, and, if it is not the case, for setting a level of a destination pixel in a corresponding position in the modified data to equal the foreground color level when the source pixel is in a non-background color area.

The process adding effects may be a bold process to expand images in the gray scale image data vertically;

the first processing step may set a level of a destination pixel in the modified image data at a higher level out of levels of two pixels adjacent to a source pixel above and below, when the source pixel is judged to have the background color level by the area judging step.

The second processing step may include:

a first judging step for further judging whether a source pixel has an intermediate shade level or a foreground color level when the source pixel is judged not to have the background color level by the area judging step;

a second judging step for judging whether at least one of a highest level out of levels of three adjacent pixels left and diagonally upper left and lower left of the source pixel and a highest out of levels of three adjacent pixels right and diagonally upper right and lower right of the source pixel has the background color level when the source pixel is judged to have an intermediate shade level by the first judging step; and a level setting step for setting a level of a destination pixel in the modified image data to equal a level of the source pixel, if it is a case that the source pixel is judged to have the intermediate shade level by the first judging step and at least one of its highest levels is judged by the second judging step to be the background color level, and, if it is not the case, for setting a level of a destination pixel in a corresponding position in the modified data to equal the foreground color level when the source pixel is in a non-background color area.

The process adding effects may be an outline process applied to the gray scale image data;

the first processing step may set, when the source pixel is judged by the area judging step to have the background color level, a highest level among levels of four pixels adjacent to the source pixel vertically and horizontally, respectively, to the level to the destination pixel in the modified image data; and the second processing step may set, when the source pixel is judged by the area judging step not to have the background color level, a level of reverse video of the source pixel to the level of the destination pixel in the modified image data.

The above object can also be fulfilled by a system for generating modified image data composed of destination pixels corresponded to source pixels in gray scale image data by applying a process adding effects to the gray scale image data, the system comprising:

a generating unit for generating a plurality of pieces of shifted data by shifting each source pixel in the gray scale image data in a plurality of predetermined directions, such as vertically and horizontally, by one pixel;

a first synthesizing unit for generating synthesized gray scale data by setting as a level of a corresponding pixel in the synthesized gray scale data a highest level among levels of pixels in a corresponding position in the plurality of pieces of shifted data generated by the generating unit;

an updated data generating unit for generating updated data by applying a given process to each source pixel in a non-background color area of the gray scale image data; and a second synthesizing unit for synthesizing a level of a pixel in the updated data and a level of a pixel in a corresponding position in the synthesized gray scale data.

The process adding effects may be a bold process to expand images in the gray scale image data vertically and horizontally;

the generating unit may generate four pieces of shifted data by shifting the source pixel in four directions by one pixel, the four directions being up, down, right and left;

the updated data generating unit may generate the updated data by updating the level of each source pixel in the non-background color area of the gray scale image data to a foreground color level; and the second synthesizing unit may overwrite the level of each source pixel in the non-background color area in the updated data with a level of a pixel in a corresponding position in the synthesized gray scale data generated by the first synthesizing unit.

The process adding effects may be a bold process to expand images in the gray scale image data horizontally; and the generating unit may generate two pieces of shifted data by shifting the gray scale image data in a right and a left direction by one pixel.

The updated data generating unit may include:

a first judging unit for judging whether each source pixel in the gray scale image data has a background color level, an intermediate shade level, or the foreground color level;

a second judging unit for judging whether at least one of a highest level out of levels of three adjacent pixels above and diagonally to upper right and upper left of a source pixel and a highest level out of levels of three adjacent pixels under and diagonally to lower right and lower left of the source pixel in the non-background color area is the background color level, when the source pixel is judged to have the intermediate shade level by the first judging unit;

a level setting unit for setting a level of a pixel in a corresponding position in the updated data to equal a level of the source pixel, if it is a case that the source pixel is judged to have the intermediate shade level by the first judging unit and at least one of its highest levels is judged by the second judging unit to be the background color level, and, if it is not the case, for setting a level of a pixel in a corresponding position in the updated data to equal the foreground color level when the source pixel is in the non-background color area;

the second synthesizing unit may overwrite a level of each pixel in the non-background color area of the updated data over a level of a corresponding pixel in the synthesized gray scale data generated by the first synthesizing unit.

The process adding effects may be a bold process to expand images in the gray scale image data vertically; and the generating unit may generate two pieces of shifted data by shifting the gray scale image data in an up and a down direction by one pixel.

The updated data generating unit may include:

a first judging unit for judging whether each source pixel in the gray scale image data has a background color level, an intermediate shade level, or the foreground color level;

a second judging unit for judging whether at least one of a highest level out of levels of three adjacent pixels left and diagonally to upper left and lower left of a source pixel and a highest level out of levels of three adjacent pixels right and diagonally to upper right and lower right of the source pixel in the non-background color area is the background color level, when the source pixel is judged to have the intermediate shade level by the first judging unit;

a level setting unit for setting a level of a pixel in a corresponding position in the updated data to equal a level of the source pixel, if it is a case that the source pixel is judged to have the intermediate shade level by the first judging unit and at least one of its highest levels is judged by the second judging unit to be the background color level, and, if it is not the case, for setting a level of a pixel in a corresponding position in the updated data to equal the foreground color level when the source pixel is in the non-background color area;

the second synthesizing unit may overwrite a level of each pixel in the non-background color area of the updated data over a level of a corresponding pixel in the synthesized gray scale data generated by the first synthesizing unit.

The process adding effects may be an outline process;

the generating unit may generate four pieces of shifted data by shifting the gray scale image data in four directions by one pixel, the four directions being up, down, right and left;

the updated data generating unit may set a level of a corresponding pixel in the updated data to equal a level of reverse video of each pixel in the non-background color area of the gray scale image data; and the second synthesizing unit may overwrite a level of each pixel of the non-background color area of the updated data over a level of a corresponding pixel in the synthesized gray scale data generated by the first synthesizing unit.

The system may further comprise a repetition control unit for controlling the generating unit, the first synthesizing unit, the updated data generating unit, and the second synthesizing unit to repeat an operation for a specific number of times.

The above object can also be fulfilled by a system for generating modified image data composed of destination pixels corresponded to source pixels in gray scale image data by adding a bold process to images in the gray scale image, comprising:

a generating unit for generating four pieces of shifted data by shifting the gray scale image data in four directions by one pixel, the four directions being up, down, right and left;

an updated data generating unit for generating updated data by updating a level of each pixel in a non-background color area of the gray scale image data to a foreground color level; and a gray scale data synthesizing unit for setting a highest level among levels of pixels in the four pieces of shifted data and the updated data to a level of a destination pixel in a corresponding position in the modified image data.

The system may further comprise a repetition control unit for controlling the generating unit, the updated data generating unit, and the gray scale data synthesizing unit to repeat an operation for a specific number of times.

The above object also can be fulfilled by a system for generating modified outline image data composed of destination pixels corresponded to source pixels in gray scale image data based on the gray scale image data, comprising:

a gray scale bold image data generating unit for generating gray scale bold image data based on the gray scale image data;

a background reverse video data generating unit for generating background reverse video data by reversing a level of each source pixel in the gray scale image data; and a background reverse video data overwriting unit for overwriting a level of each pixel of the background reverse video data in a non-background color area of the gray scale image data over a level of each pixel in a corresponding position in the gray scale bold image data.

The gray scale bold image data generating unit may include:

a generating unit for generating a plurality of pieces of shifted data by shifting the gray scale image data in a plurality of predetermined directions, such as vertically and horizontally, by one pixel;

a first synthesizing unit for generating synthesized gray scale data by synthesizing using a method to validate data exhibiting a highest level among all of pixels in a corresponding position in the plurality of pieces of shifted data shifted by the generating unit;

an updated data generating unit for generating bi-level data by changing levels of pixels in an area other than a background color area of the gray scale image data to a foreground color level; and a second synthesizing unit for generating gray scale bold image data by overwriting only levels of pixels having a foreground color level in the bi-level data generated by the updated data generating unit over levels of corresponding pixels in the synthesized gray scale data synthesized by the first synthesizing unit.

The gray scale bold image data generating unit may further include repetition control unit for controlling the gray scale bold image data generating unit to repeat generation of the gray scale bold image data for a specific number of times to produce image data of images of various degrees of boldness.

The above objects also can be fulfilled by a method for generating modified image data composed of destination pixels corresponded to source pixels in gray scale image data by applying a process adding effects based on the gray scale image data, comprising the steps of:

generating step for generating a plurality of pieces of shifted data by shifting each source pixel in the gray scale image data in a plurality of predetermined directions, such as vertically and horizontally, by one pixel;

first synthesizing step for generating synthesized gray scale data by setting as a level of a corresponding pixel in the synthesized gray scale data a highest level among levels of pixels in a corresponding position in the plurality of pieces of shifted data generated by the generating step;

updated data generating step for generating updated data by applying a given process to each source pixel in a non-background color area of the gray scale image data; and second synthesizing step for synthesizing a level of a pixel in the updated data and a level of a pixel in a corresponding position in the synthesized gray scale data.

The process adding effects may be a bold process to expand images in the gray scale image data vertically and horizontally;

the generating step may generate four pieces of shifted data by shifting the source pixel in four directions by one pixel, the four directions being up, down, right and left;

the updated data generating step may generate the updated data by updating the level of each source pixel in the non-background color area of the gray scale image data to a foreground color level; and the second synthesizing step may overwrite the level of each source pixel in the non-background color area in the updated data with a level of a pixel in a corresponding position in the synthesized gray scale data generated by the first synthesizing step.

The process adding effects may be a bold process to expand images in the gray scale image data horizontally; and the generating step may generate two pieces of shifted data by shifting the gray scale image data in a right and a left direction by one pixel.

The updated data generating step may include:

a first judging step for judging whether each source pixel in the gray scale image data has a background color level, an intermediate shade level, or the foreground color level;

a second judging step for judging whether at least one of a highest level out of levels of three adjacent pixels above and diagonally to upper right and upper left of a source pixel and a highest level out of levels of three adjacent pixels under and diagonally to lower right and lower left of the source pixel in the non-background color area is the background color level, when the source pixel is judged to have the intermediate shade level by the first judging step;

a level setting step for setting a level of a pixel in a corresponding position in the updated data to equal a level of the source pixel, if it is a case that the source pixel is judged to have the intermediate shade level by the first judging step and at least one of its highest levels is judged by the second judging step to be the background color level, and, if it is not the case, for setting a level of a pixel in a corresponding position in the updated data to equal the foreground color level when the source pixel is in the non-background color area;

the second synthesizing step may overwrite a level of each pixel in the non-background color area of the updated data over a level of a corresponding pixel in the synthesized gray scale data generated by the first synthesizing step.

The process adding effects may be a bold process to expand images in the gray scale image data vertically; and the generating step may generate two pieces of shifted data by shifting the gray scale image data in an up and a down direction by one pixel.

The updated data generating step may include:

a first judging step for judging whether each source pixel in the gray scale image data has a background color level, an intermediate shade level, or the foreground color level;

a second judging step for judging whether at least one of a highest level out of levels of three adjacent pixels left and diagonally to upper left and lower left of a source pixel and a highest level out of levels of three adjacent pixels right and diagonally to upper right and lower right of the source pixel in the non-background color area is the background color level, when the source pixel is judged to have the intermediate shade level by the first judging step;

a level setting step for setting a level of a pixel in a corresponding position in the updated data to equal a level of the source pixel, if it is a case that the source pixel is judged to have the intermediate shade level by the first judging step and at least one of its highest levels is judged by the second judging step to be the background color level, and, if it is not the case, for setting a level of a pixel in a corresponding position in the updated data to equal the foreground color level when the source pixel is in the non-background color area;

the second synthesizing step may overwrite a level of each pixel in the non-background color area of the updated data over a level of a corresponding pixel in the synthesized gray scale data generated by the first synthesizing step.

The process adding effects may be an outline process;

the generating step may generate four pieces of shifted data by shifting the gray scale image data in four directions by one pixel, the four directions being up, down, right and left;

the updated data generating step may set a level of a corresponding pixel in the updated data to equal a level of reverse video of each pixel in the non-background color area of the gray scale image data; and the second synthesizing step may overwrite a level of each pixel of the non-background color area of the updated data over a level of a corresponding pixel in the synthesized gray scale data generated by the first synthesizing step.

The above objects can also be fulfilled by a method for generating modified image data by applying a bold process to gray scale image data vertically and horizontally, comprising the steps of:

generating step for generating four pieces of shifted data by shifting the gray scale image data in four directions by one pixel, the four directions being up, down, right and left;

updated data generating step for generating updated data by updating a level of each pixel in a non-background color area of the gray scale image data to a foreground color level; and gray scale data synthesizing step for setting a highest level among levels of pixels in the four pieces of shifted data and the updated data to a level of a destination pixel in a corresponding position in the modified image data.

The above objects can also be fuliffed by a gray scale modified data generation method for generating modified gray scale outline data based on gray scale image data, comprising the steps of:

gray scale bold image data generating step for generating gray scale bold image data based on the gray scale image data;

background reverse video data generating step for generating background reverse video data by reversing a level of each source pixel in the gray scale image data; and background reverse video data overwriting step for overwriting a level of each pixel of the background reverse video data in a non-background color area of the gray scale image data over a level of each pixel in a corresponding position in the gray scale bold image data.

The gray scale bold image data generating step may include:

a generating step for generating a plurality of pieces of shifted data by shifting the gray scale image data in a plurality of predetermined directions, such as vertically and horizontally, by one pixel;

a first synthesizing step for generating synthesized gray scale data by synthesizing using a method to validate data exhibiting a highest level among all of pixels in a corresponding position in the plurality of pieces of shifted data shifted by the generating step;

an updated data generating step for generating bi-level data by changing levels of pixels in an area other than a background color area of the gray scale image data to a foreground color level; and a second synthesizing step for generating gray scale bold image data by overwriting only levels of pixels having a foreground color level in the bi-level data generated by the updated data generating step over levels of corresponding pixels in the synthesized gray scale data synthesized by the first synthesizing step.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The present invention in accordance with embodiments will be explained in the following.

First Embodiment

The first embodiment relates to the generation of modified data by applying the bold process to the gray scale data vertically and horizontally.

Figure 1:
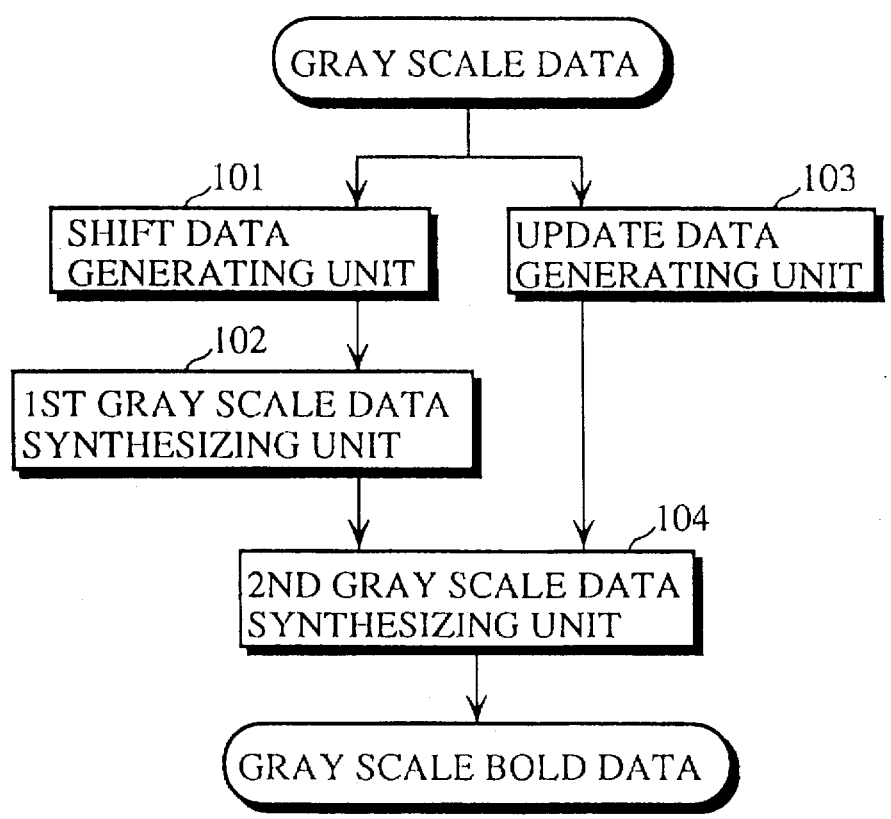
FIG. 1 is a view depicting a structure of a gray scale modified data generating system in accordance with a first embodiment of the present invention.

FIG. 1 is a view depicting the structure of the gray scale modified data generating system in accordance with the first embodiment of the present invention. In the drawing, numeral 101 denotes a shift data generating unit, numeral 102 denotes a first gray scale data synthesizing unit, numeral 103 denotes an update data generating unit, and numeral 104 denotes a second gray scale data synthesizing unit.

Figure 7:
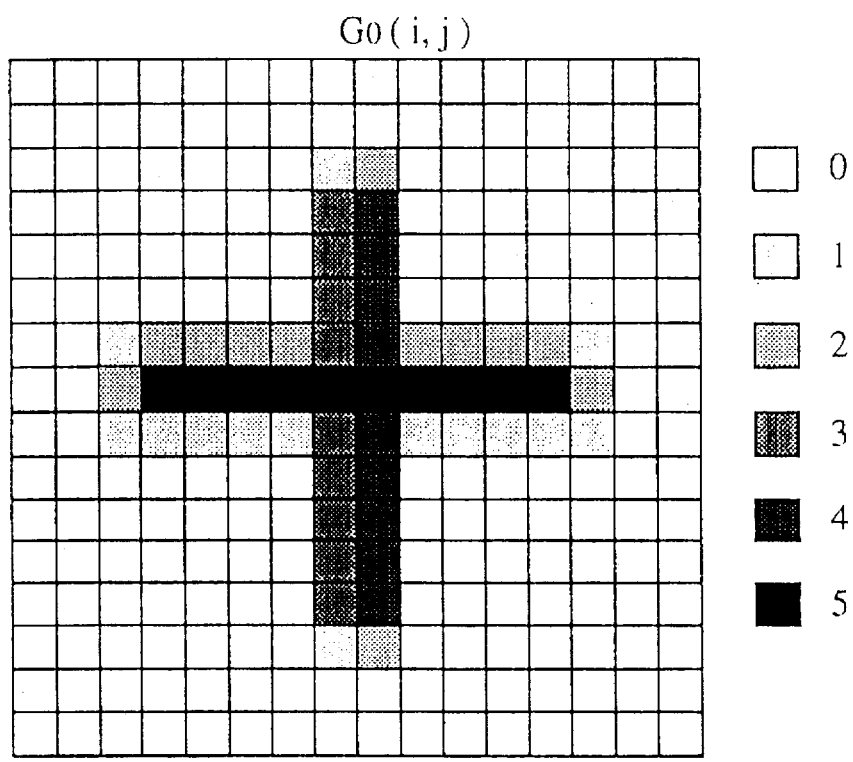
FIG. 7 shows an example of gray scale data to be processed (font data of "十", the Chinese character for a number ten.

FIG. 7 shows an example of the gray scale data to be processed. The gray scale data in FIG. 7 consist of 256 pixels (16×16=256): 16-pixel high and 16-pixel wide.

Here, the gray scale data are represented in six values: white is represented by a value "0" and black is represented by a value "5" while the intermediate shades of gray are represented by values "1" through "4". The background color is white, on which characters are drawn in either black or gray. Gray is generally used for the contour of the characters to reproduce very fine shapes truly. Six-value data are used in this embodiment; however, the gray scale data are not limited to the 6-value data, and the values are not necessarily set to "0" through "5". Likewise, white is set to the lowest value while black the highest herein; however, other colors, for example yellow and blue, can be set to the lowest and highest values, respectively. In such a case, the intermediate shades are not gray, but colors between yellow and blue.

Figure 2:
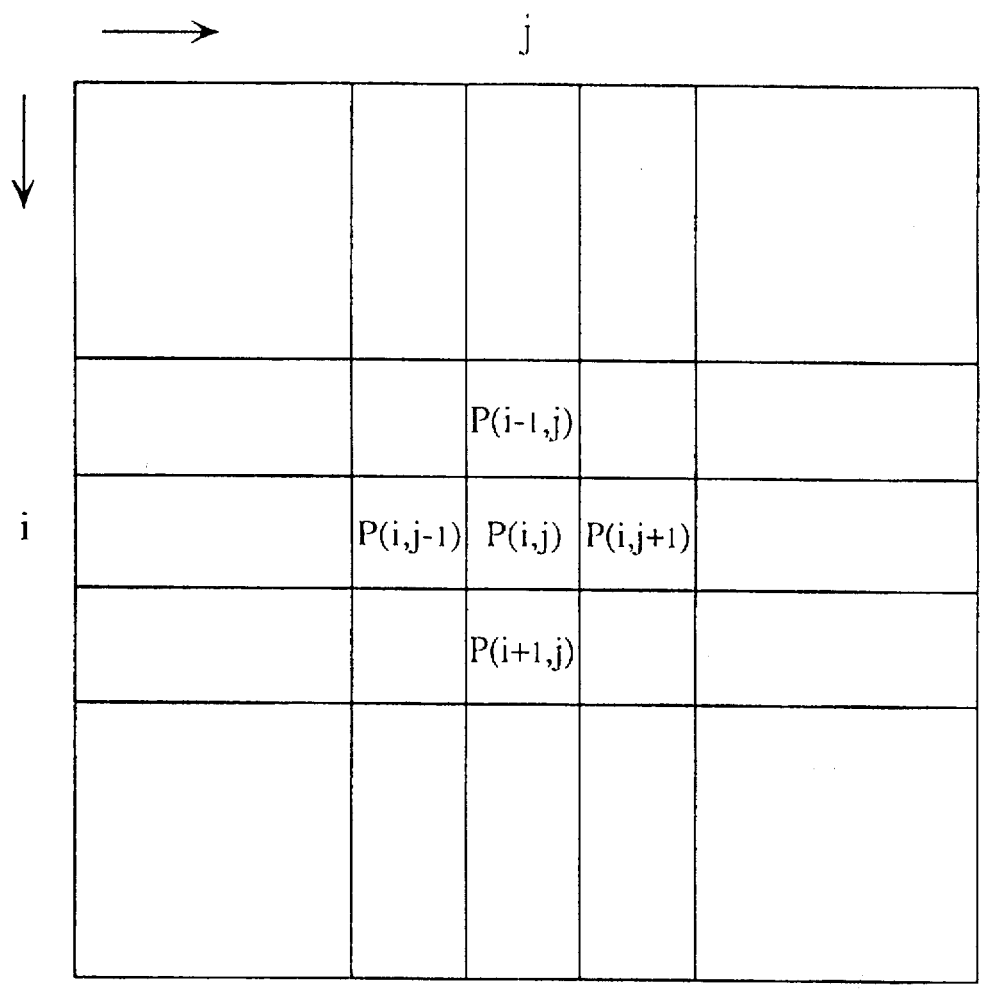
FIG. 2 is a view explaining the position of pixels.
Figure 3:
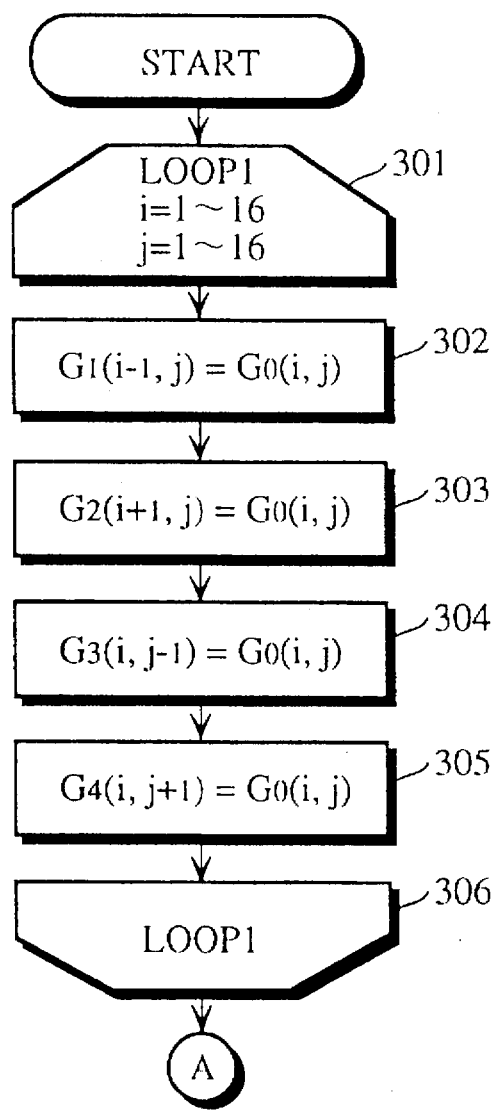
FIG. 3 is a flowchart detailing a procedure of a shift data generating unit 101.

The shift data generating unit 101 generates a plurality of pieces of shift data by shifting the to-be-processed gray scale data in a plurality of predetermined directions such as the horizontal and vertical directions by one pixel. This procedure is detailed by the flowchart in FIG. 3. In the drawing, Gn(i, j) represents the value of a pixel Pn(i, j), which is the pixel positioned at the i'th row and j'th column in the gray scale data as shown in FIG. 2. In FIG. 3, G0(i, j), G1(i, j), G2(i, j), G3(i, j), and G4(i, j) represent the values of the pixel at the i'th row and j'th column in the gray scale data to be processed, the data shifted upward, the data shifted downward, the data shifted to the left, and the data shifted to the right, respectively. The loop 1 (Steps 301 through 306) means that Steps 302 through 305 are repeated for each of the 256 pixels.

Although it is not shown in the flowchart, note that the value of all the intermediate data and resulting data excluding the to-be-processed gray scale data are set to a value "0" initially, and that the value of the pixel will not be calculated if "i" or "j" is beyond a range from 1 through 16. This applies to all the other flowcharts.

In this embodiment, the shift data generating unit 101 generates four kinds of shift data by shifting the gray scale data shown in FIG. 7 in four directions: up, down, left, and right, which are respectively shown in FIGS. 9(a) through 9(d).

Figure 4:
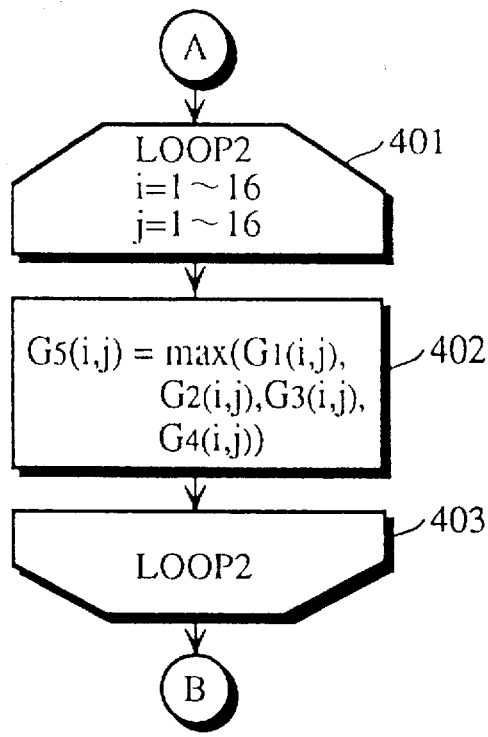
FIG. 4 is a flowchart detailing a procedure of a first gray scale data synthesizing unit 102.

The first gray scale data synthesizing unit 102 generates the gray scale synthesized data by setting the greatest value among the values of the mapping pixels on the plurality pieces of shift data generated by the shift data generating unit 101 to the mapping pixel on the gray scale synthesized data. This procedure is detailed by the flowchart in FIG. 4, where G5(i, j) represents the value of the pixel positioned at the i'th row and j'th column in the gray scale synthesized data to be generated.

In this embodiment, four kinds of data respectively shown in FIGS. 9(a) through 9(d) are generated by the shift data generating unit 101, which are subsequently synthesized by the first gray scale data synthesizing unit 102. In other words, the greatest value among the values of four mapping pixels on the four kinds of data is set to the value of the mapping pixel on the resulting gray scale synthesized data for each of the 256 pixels.

Figure 10:
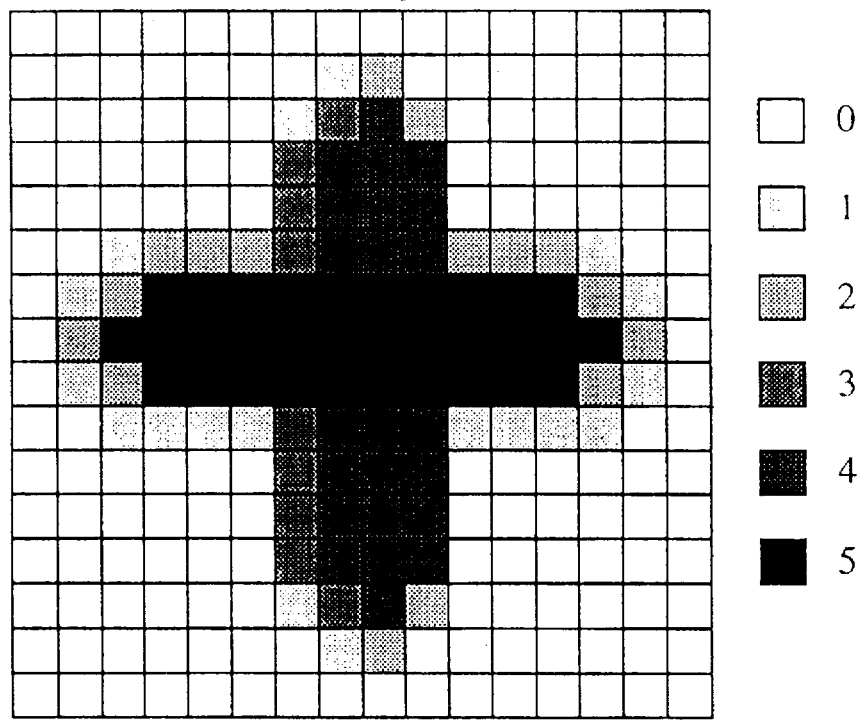
FIG. 10 shows gray scale synthesized data generated by the first gray scale data synthesizing unit based on the gray scale data shown in FIGS. 9(a) through 9(d)

More precisely, in case of a pixel positioned at the 8'th column from the left and 4'th row from the top, the mapping pixels, G1(4, 8), G2(4, 8), G3(4, 8), and G4(4, 8), on the four kinds of data shown in FIGS. 9(a) through 9(d) exhibit the values "3", "1", "4", and "0", respectively. Thus, the highest value "4" (=G3(4, 8)) among the four values is set to the value G5(4, 8) of the pixel positioned at the 8'th column and 4'th row on the gray scale synthesized data. FIG. 10 shows the gray scale synthesized data G5(i, j) generated by synthesizing the four kinds of shift data shown in FIGS. 9(a) through 9(d), respectively.

Figure 5:
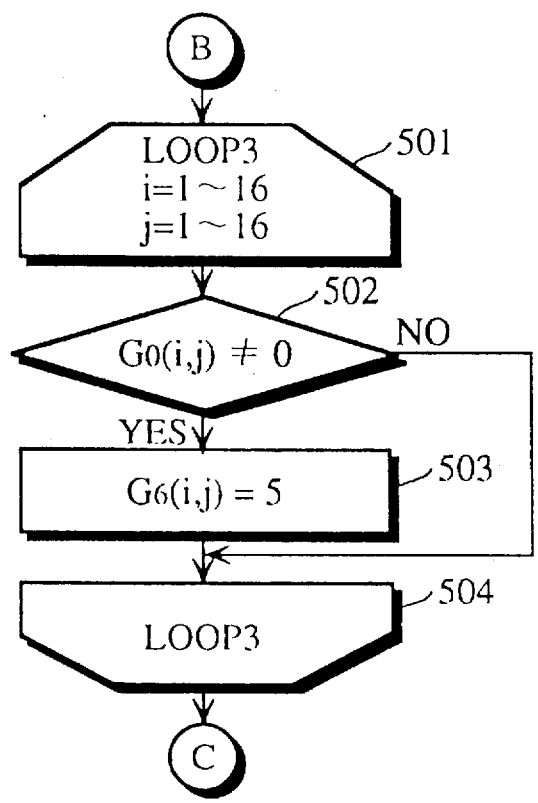
FIG. 5 is a flowchart detailing a procedure of an update data generating unit 103.

The update data generating unit 103 updates the non-background color area in the to-be-processed gray scale data, or namely all the pixels other those in the background area, to the value of the foreground color. This procedure is detailed by the flowchart in FIG. 5, where G6(i, j) represents the value of the pixel positioned at the i'th row and j'th column on the data to be updated.

Figure 11:
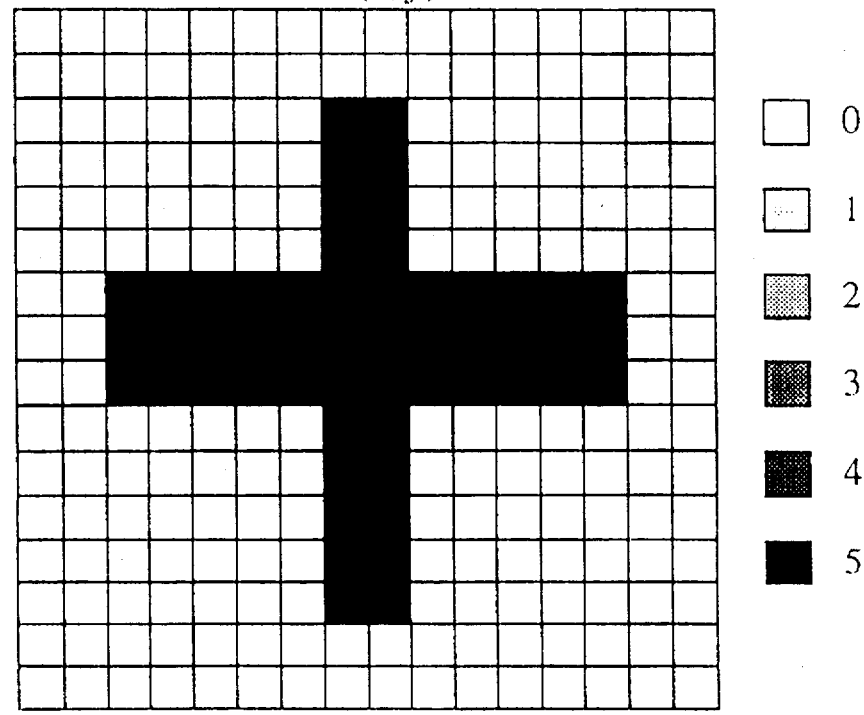
FIG. 11 shows bi-value data generated by the update data generating unit based on the gray scale data shown in FIG. 7.

In this embodiment, the background color and foreground color are represented by a value "0" and a value "5", respectively, while the intermediate shades of gray are represented by values "1" through "4". Thus, the values of the intermediate shades of gray in FIG. 7 is updated to "5", making the resulting data into bi-value data consisting of the background color value "0" and the foreground color value "5". FIG. 11 shows the update data G6(i, j) thus generated.

Figure 6:
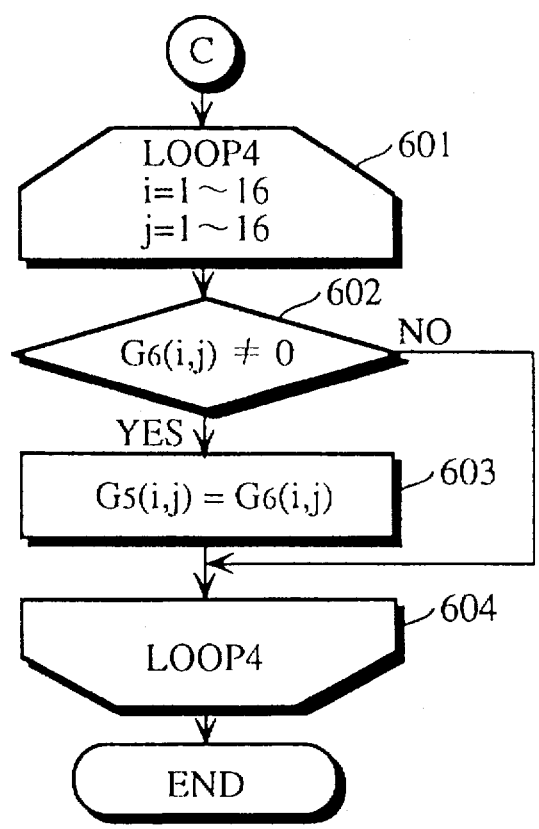
FIG. 6 is a flowchart detailing a procedure of a second gray scale data synthesizing unit 104.

The second gray scale data synthesizing unit 104 overwrites the value of each pixel on the non-background color area of the update data with the value of their respective mapping pixels on the gray scale synthesized data generated by the first gray scale data synthesizing unit 102. This procedure is detailed by the flowchart in FIG. 6, where G5(i, j) represents the value of the pixel positioned at the i'th row and j'th column on the gray scale bold data obtained as a result of this procedure.

In this embodiment, the second gray scale data synthesizing unit 104 overwrites the value "5" of each pixel on the non-background color area of the update data shown in FIG. 11 with their respective mapping pixels on the gray scale synthesized data shown in FIG. 10.

Figure 8:
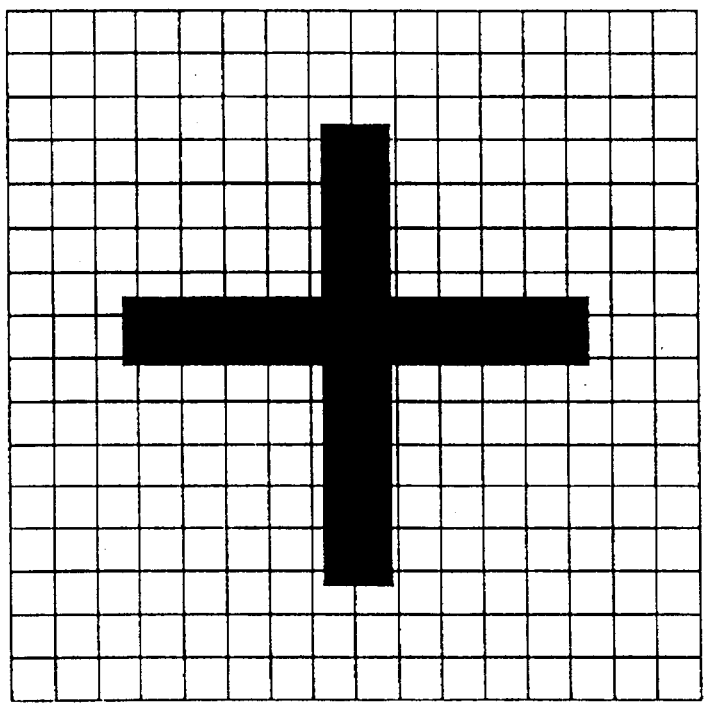
FIG. 8 shows bi-value font data, which are the original of the gray scale data shown in FIG. 7.
Figure 9A:
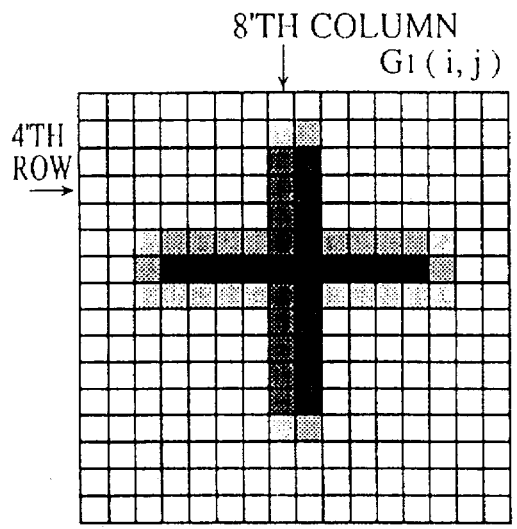
FIGS. 9(a) through (d) show four kinds of shift data generated by the shift data generating unit based on the gray scale data in FIG. 7.
Figure 9B:
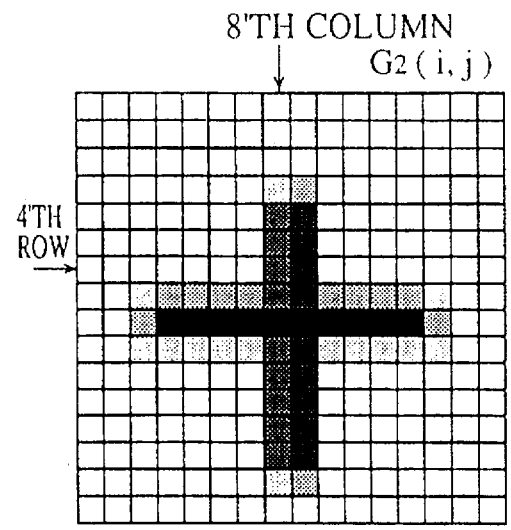
Figure 9C:
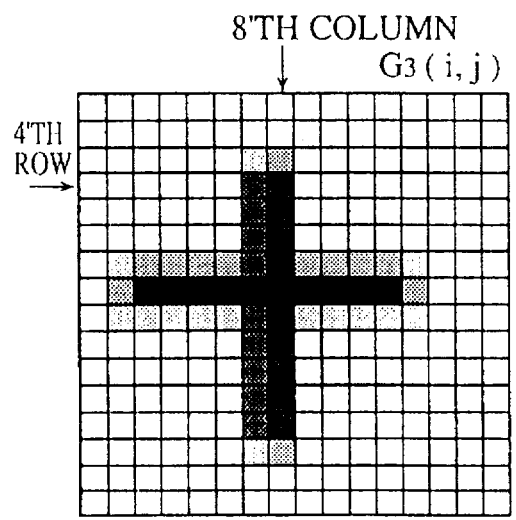
Figure 9D:
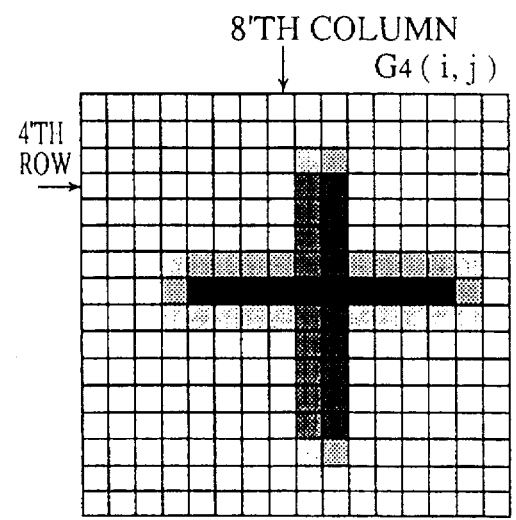
Figure 12:
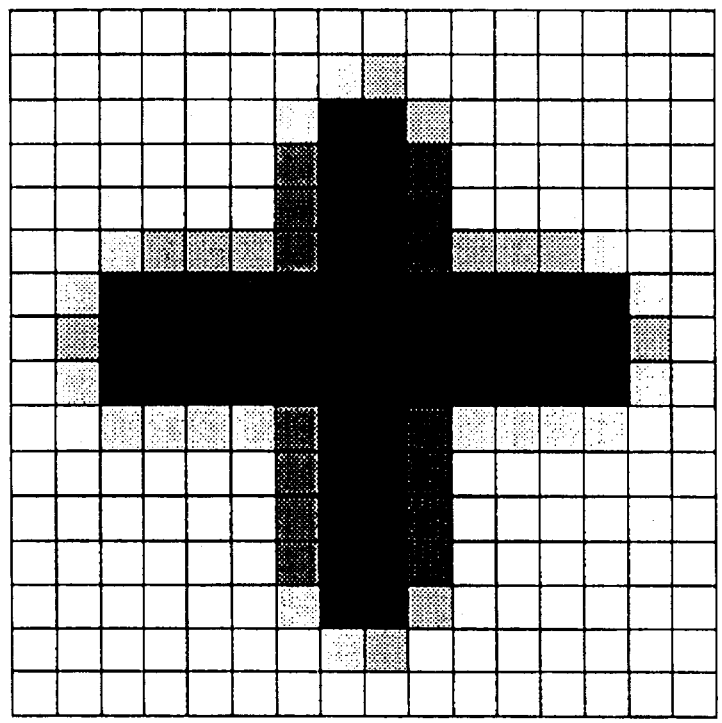
FIG. 12 shows gray scale bold data generated by the gray scale modified data generating system of the first embodiment.
Figure 13:
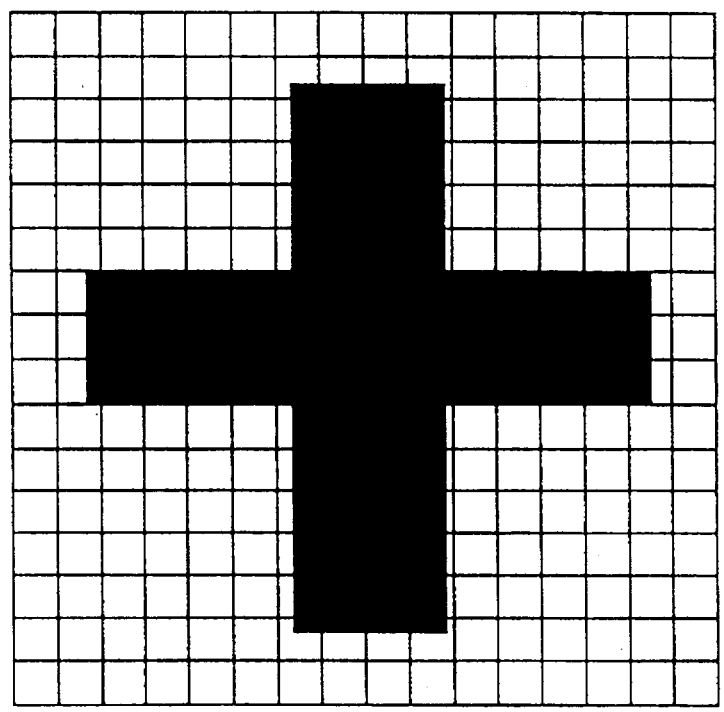
FIG. 13 shows bi-value bold data generated by expanding an image in the bi-value font data in FIG. 8.

In this way, the gray scale bold data shown in FIG. 12 are generated. The contour of the gray scale bold data corresponds to the value of the contour of the original gray scale data shown in FIG. 7, and the gray scale bold data are approximate to the data shown in FIG. 13 representing the bi-value bold font data "+", the Chinese character for a number ten, if they are displayed in the values "0" through "5". Accordingly, the gray scale bold data shown in FIG. 12 maintain high fidelity to the bi-value bold font data generated by directly applying the bold process to the bi-value font data shown in FIG. 8.

The gray scale modified data generating system of the first embodiment can display well defined gray scale bold data on a gray scale output device.

Second Embodiment

The gray scale modified data generating system of the first embodiment can additionally include a repetition control unit for controlling a repetitive operation.

Figure 14:
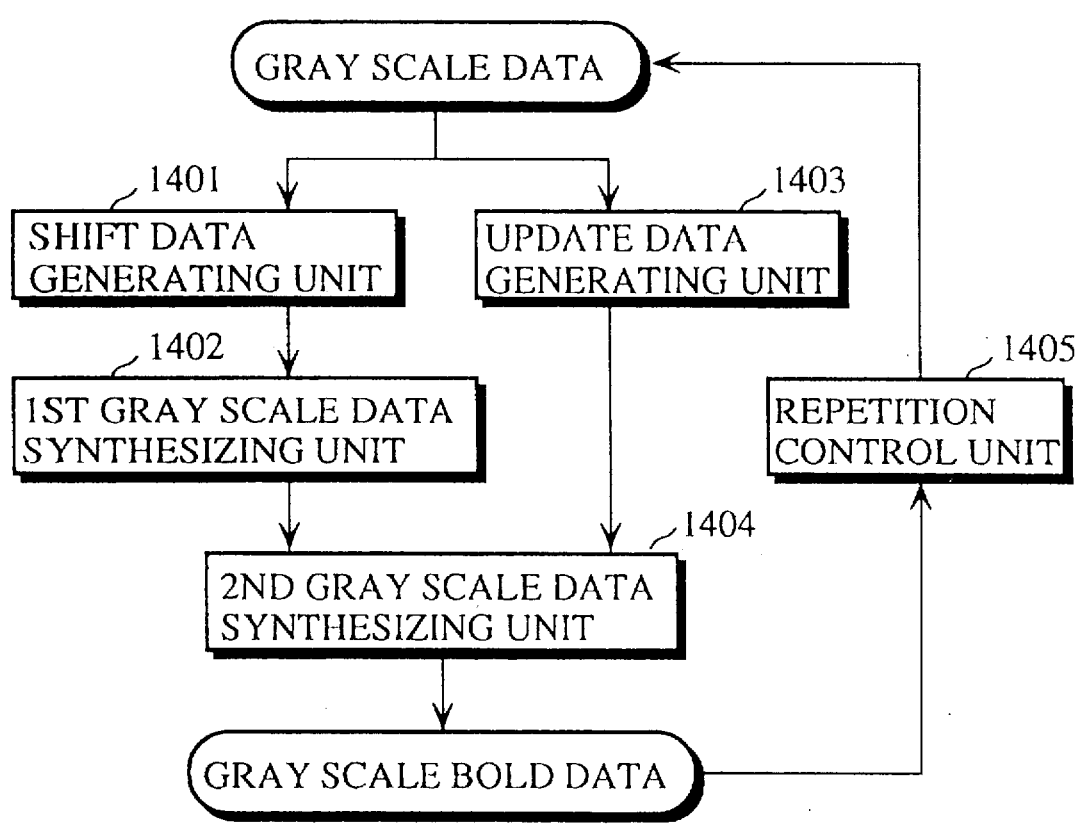
FIG. 14 is a view depicting a structure of a gray scale modified data generating system in accordance with a second embodiment of the present invention.
Figure 15:
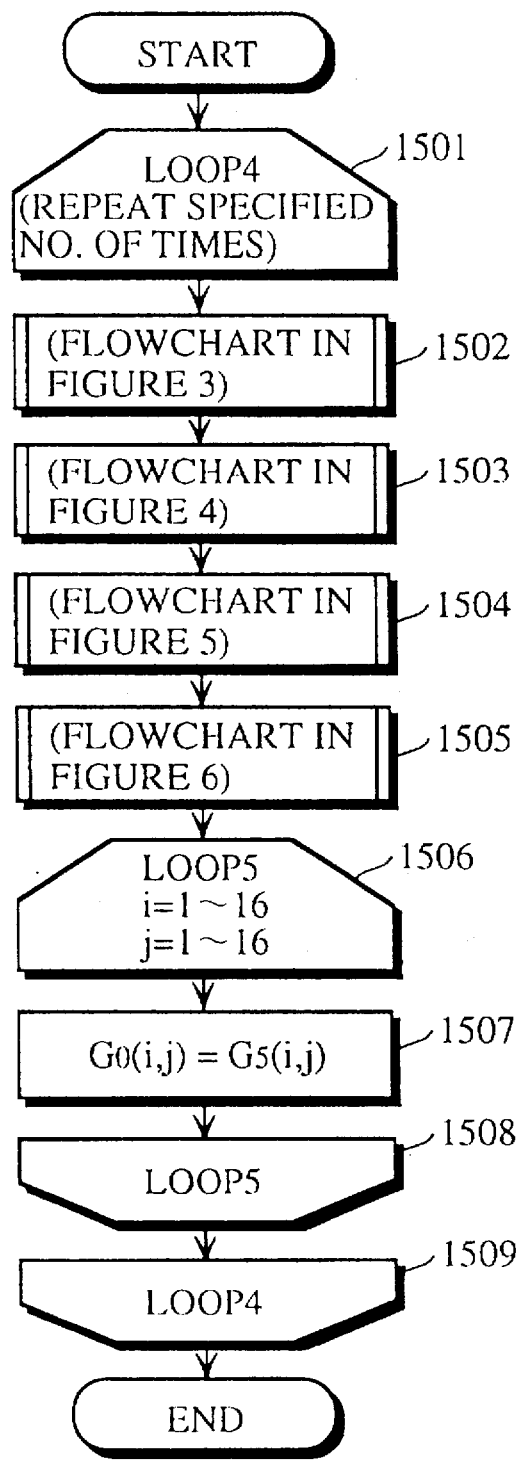
FIG. 15 is a flowchart detailing a procedure of the gray scale modified data generating system of the second embodiment.

FIG. 14 is a view depicting the structure of the gray scale modified data generating system of the second embodiment. In the drawing, numeral 1401 denotes a shift data generating unit, numeral 1402 denotes a first gray scale data synthesizing unit, numeral 1403 denotes an update data generating unit, numeral 1404 denotes a second gray scale data synthesizing unit, and numeral 1405 denotes a repetition control unit. The units denoted by numerals 1401 through 1404 are identical with their respective counterparts of the gray scale modified data generating system in the first embodiment. The entire procedure of the second embodiment is detailed by the flowchart in FIG. 15, where the procedures in the first embodiment (Steps 1502 through 1505) are repeated in the loop 4 (Steps 1501 through 1509).

The repetition control unit 1405 repeats the generation of the gray scale bold data by the gray scale modified data generating system for a specific number of times to generate data in various thickness.

To be more concrete, a case where the gray scale bold data are generated based on the gray scale data in FIG. 7 by setting the number of repetition times to two will be explained. In the first cycle, the gray scale bold data shown in FIG. 12 are generated as explained in the first embodiment. In the second cycle, the bold data generating process is applied in the same manner as the first embodiment to the gray scale bold data in FIG. 12 generated in the first cycle.

Figure 16:
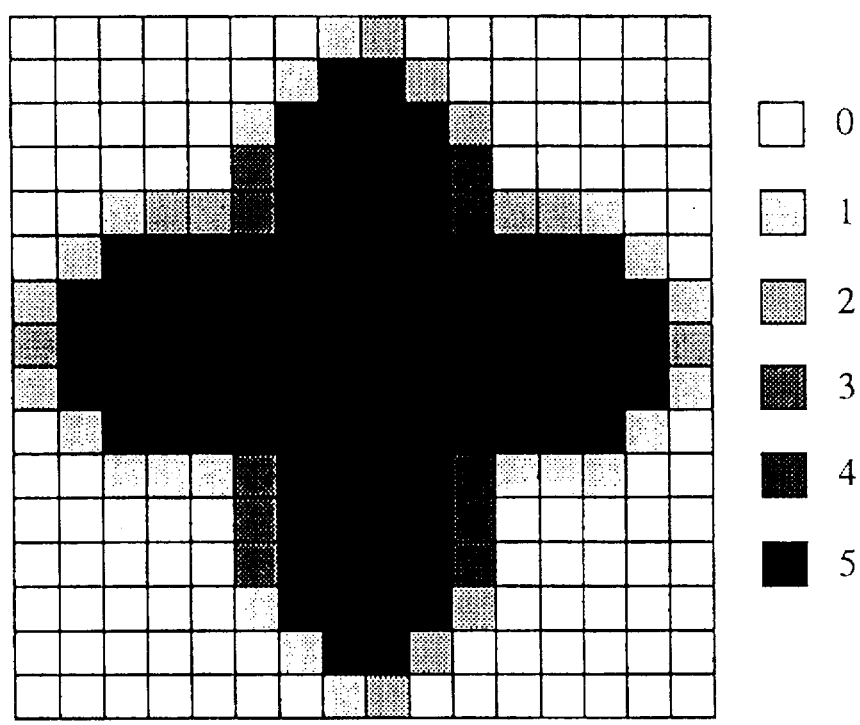
FIG. 16 shows gray scale bold data generated by the gray scale modified data generating systems of the second and fourth embodiments.

FIG. 16 shows the gray scale bold data generated by repeating the bold data generating process twice. It can be acknowledged that the gray scale bold data in the second embodiment are thicker than those in the first embodiment. The gray scale bold data in various thickness can be generated by setting an arbitrary number to the repetition times.

Third Embodiment

In the third embodiment, a system for applying the bold process to the gray scale data vertically and horizontally at a higher speed will be explained.

Figure 17:
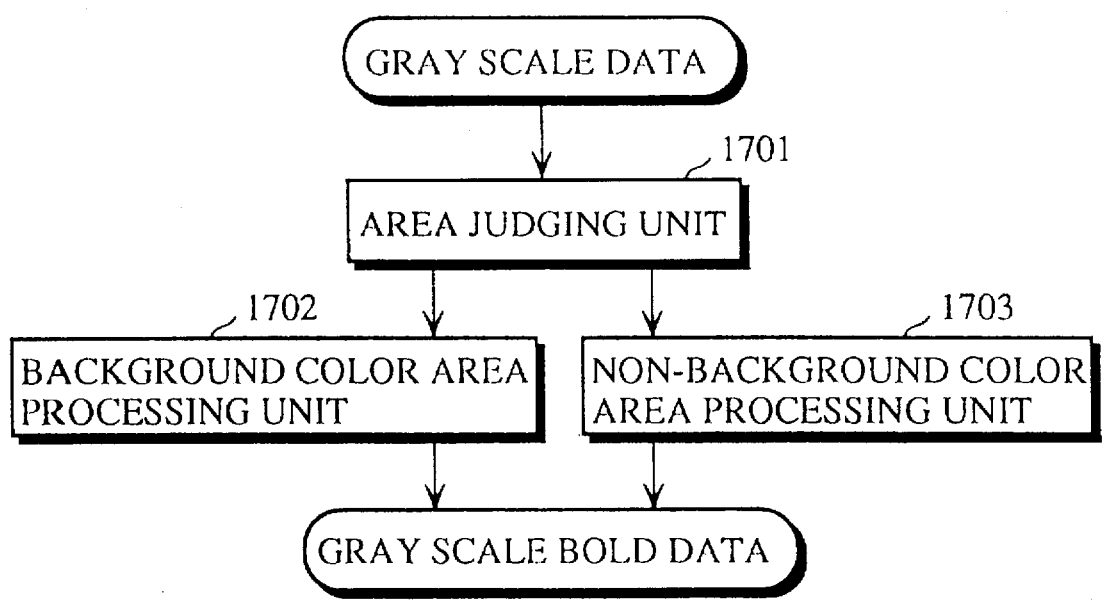
FIG. 17 is a view depicting a structure of a gray scale modified data generating system in accordance with a third embodiment of the present invention.
Figure 18:
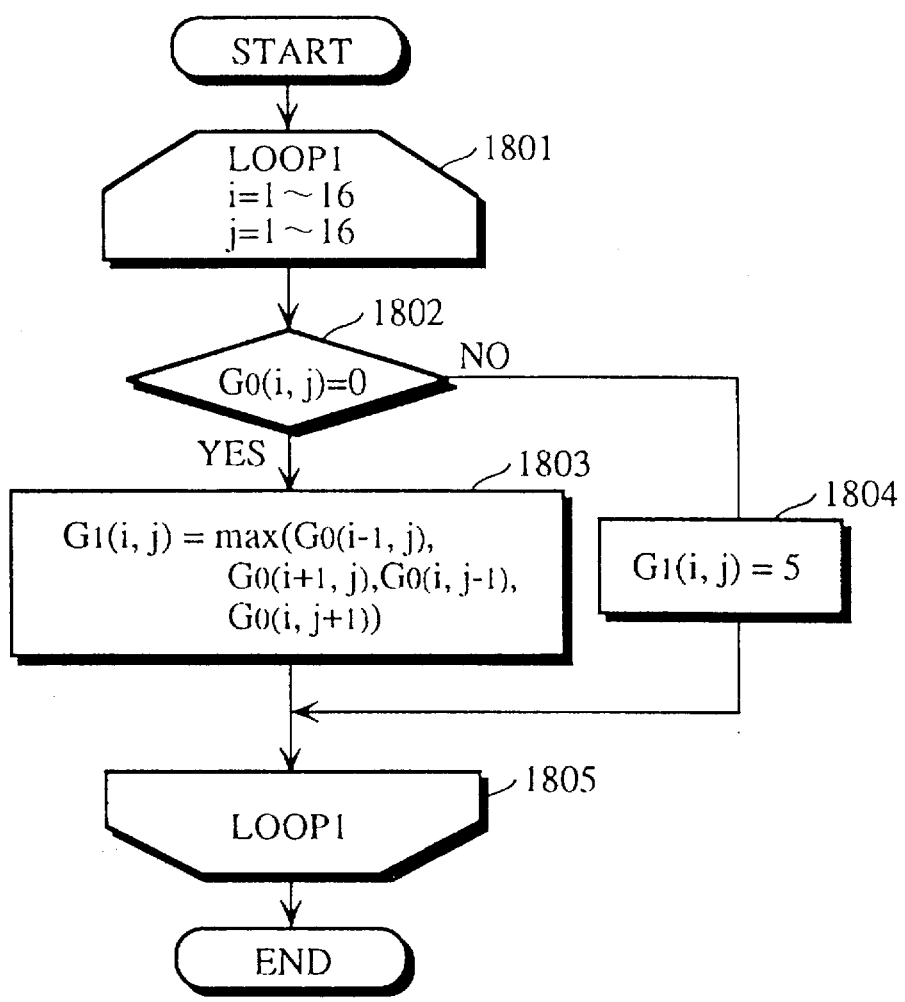
FIG. 18 is a flowchart detailing a procedure of the gray scale modified data generating system of the third embodiment.

FIG. 17 is a view depicting the structure of the gray scale modified data generating system of the third embodiment. In the drawing, numeral 1701 denotes an area judging unit, numeral 1702 denotes a background color area processing unit, and numeral 1703 denotes a non-background color area processing unit. The entire procedure of this embodiment is detailed by the flowchart in FIG. 18, where G0(i, j) and G1(i, j) represent the values of the pixel positioned at the i'th row and j'th column on the gray scale data to be processed and the resulting gray scale bold data, respectively.

Figure 19:
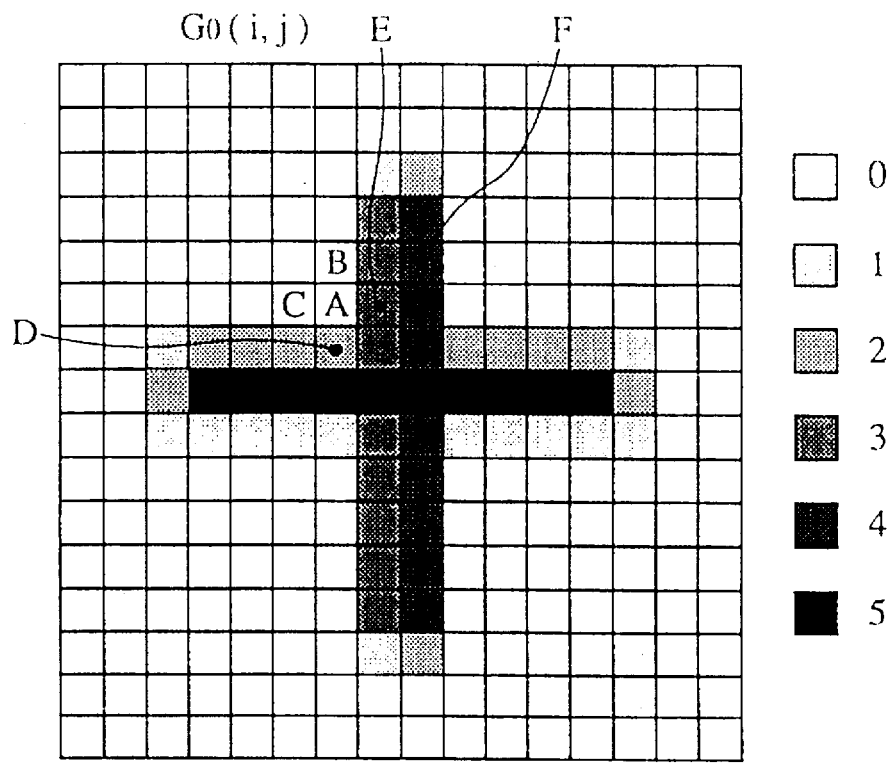
FIG. 19 shows the gray scale data in FIG. 7 with some of the pixels being labeled with references.

The gray scale data to be processed are the data shown in FIG. 7, and FIG. 19 shows the same with some of the pixels being labeled with references.

The area judging unit 1701 judges whether each pixel on the to-be-processed gray scale data has the background color. This procedure corresponds to Step 1802.

In this embodiment, the background color is represented by a value "0". Thus, for example, a pixel A in FIG. 19 is judged to have the background color, while a pixel F in FIG. 19 is judged not so.

The background color area processing unit 1702 sets the highest value among four vertical and horizontal neighboring pixels of a pixel to the value of its mapping pixel on the gray scale bold data when the pixel is judged to have the background color by the area judging unit 1701. This procedure corresponds to Step 1803.

For example, the pixel A in FIG. 19 is judged to have the background color, and the highest value among the values of its neighboring pixels B, C, D, E is calculated. Of all the pixels B, C, D, E respectively exhibiting the values "0", "0", "2", and "3", the highest value is the value "3", which is accordingly set to the value of the mapping pixel of the pixel A on the gray scale bold data shown in FIG. 20.

The non-background color area processing unit 1703 sets the foreground color value "5" to the mapping pixel on the gray scale bold data when a pixel is judged not to have the background color by the area judging unit 1701. This procedure corresponds to Step 1804.

Figure 20:
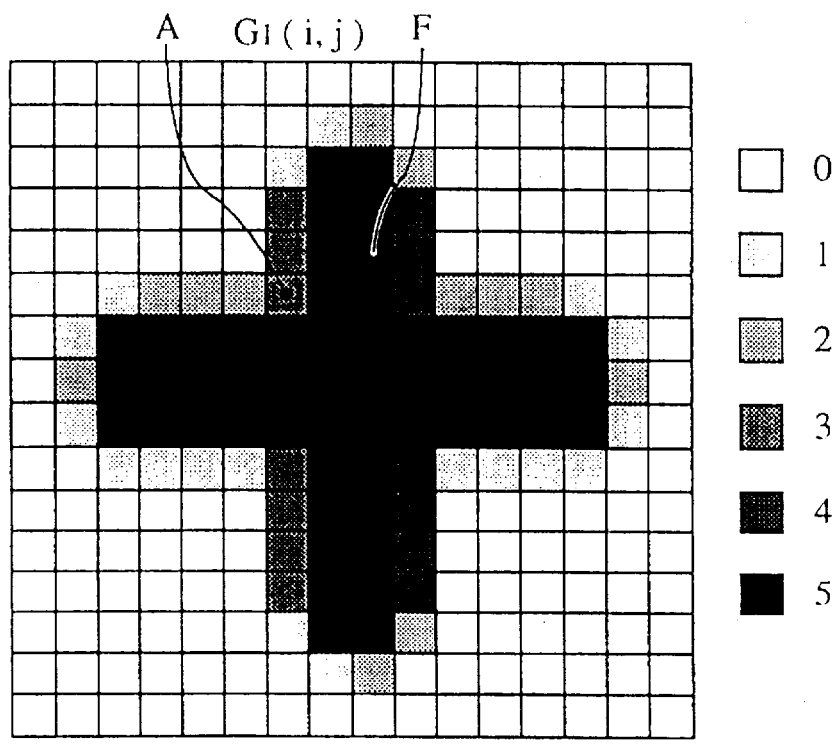
FIG. 20 shows gray scale bold data generated by the gray scale modified data generating system of the third embodiment.

For example, the pixel F in FIG. 19 is judged not to have the background color, and the foreground color value "5" is set to the value of the mapping pixel of the pixel F on the gray scale bold data shown in FIG. 20.

By applying the above procedures to all the pixels in FIG. 19, the gray scale bold data G1(i, j) shown in FIG. 20 are generated.

The resulting data are identical with the gray scale bold data shown in FIG. 12 generated by the gray scale modified data generating system of the first embodiment. The pixel A and pixel F in the gray scale bold data shown in FIG. 20 correspond to the pixel A and pixel F in the gray scale data shown in FIG. 19, respectively. In this embodiment, the pixel A and pixel F are finally set to the previously calculated values "3" and "5", respectively.

The gray scale modified data generating system of the third embodiment operates faster than the gray scale modified data generating system of the first embodiment. This is because the former carries out the shift-synthesize process and update-overwrite process at the same time.

Fourth Embodiment

The gray scale modified data generating system of the third embodiment can additionally include a repetition control unit for controlling the repetitive operation.

Figure 21:
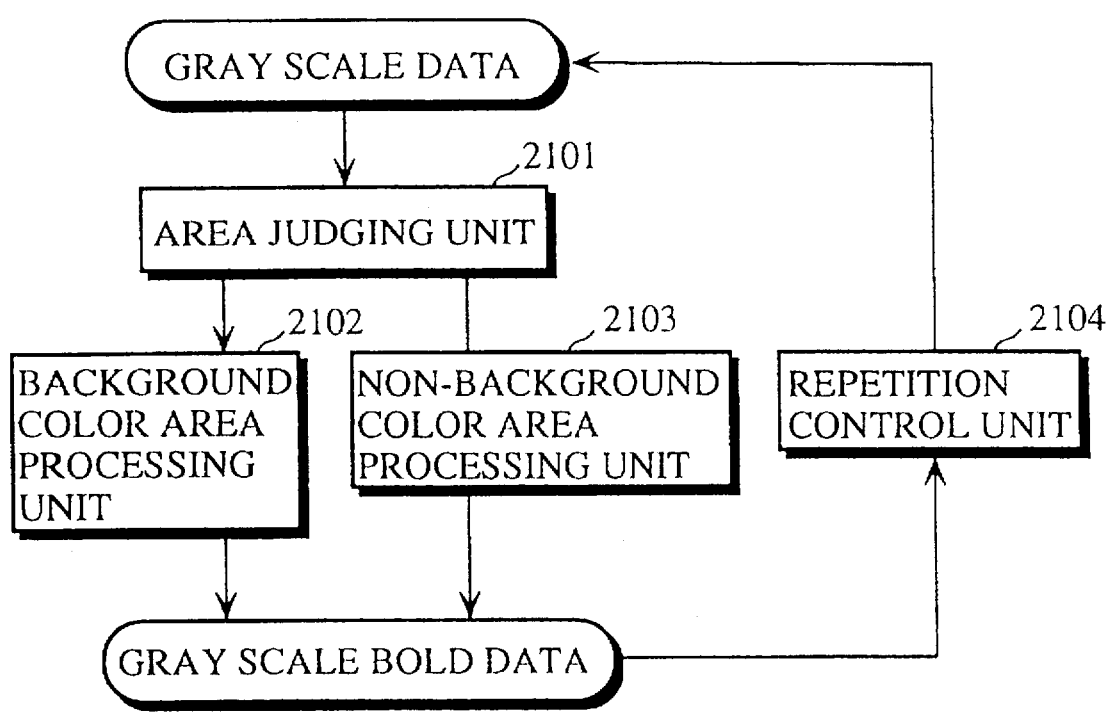
FIG. 21 is a view depicting a structure of a gray scale modified data generating system in accordance with a fourth embodiment of the present invention.
Figure 22:
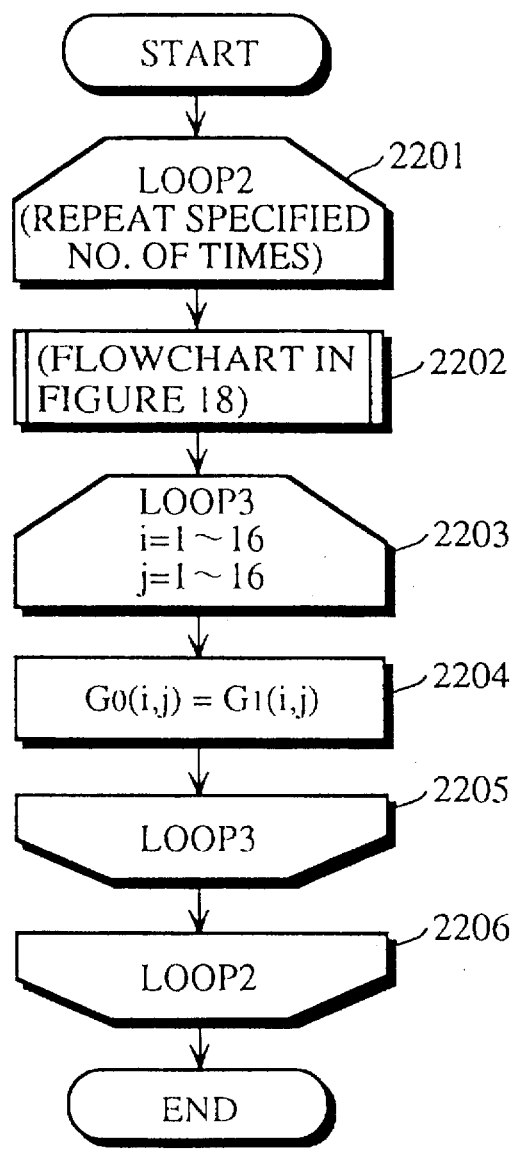
FIG. 22 is a flowchart detailing a procedure of the gray scale modified data generating system of the fourth embodiment.

FIG. 21 is a view depicting the structure of the gray scale modified data generating system of the fourth embodiment. In the drawing, numeral 2101 denotes an area judging unit, numeral 2102 denotes a background color area processing unit, numeral 2103 denotes a non-background color area processing unit, and numeral 2104 denotes a repetition control unit. The units denoted by numerals 2101 through 2103 are identical with their respective counterparts of the gray scale modified data generating system of the third embodiment. The entire procedure of the fourth embodiment is detailed by the flowchart in FIG. 22, where the procedure in the third embodiment (Step 2202) is repeated in the loop 2 (Steps 2201 through 2206).

The repetition control unit 2104 repeats the generation of the gray scale bold data by the gray scale modified data generating system for a specific number of times to generate data in various thickness.

To be more concrete, a case where the gray scale bold data are generated based on the gray scale data in FIG. 7 by setting the number of repetition times to two will be explained. In the first cycle, the gray scale bold data shown in FIG. 12 are generated as explained in the third embodiment. In the second cycle, the bold data generating process is applied in the same manner as the third embodiment to the gray scale bold data in FIG. 12 generated in the first cycle. FIG. 16 shows the gray scale bold data generated by repeating the bold data generating process twice. The resulting data are identical with those generated by the gray scale modified data generating system of the second embodiment. It can be acknowledged that the gray scale bold data in the fourth embodiment are thicker than those in the third embodiment. The gray scale bold data in various thickness can be generated by setting an arbitrary number to the repetition times.

The gray scale modified data generating system of the fourth embodiment operates faster than the gray scale modified data generating system of the second embodiment. This is because the former carries out the shift-synthesize process and update-overwrite process in the first embodiment at the same time and repeats such simultaneous processing.

Fifth Embodiment

In the fifth embodiment, a system that generates modified data by applying the bold process to the gray scale data horizontally will be explained.

Prior to the explanation, inconvenience caused when the bold process is not applied in four directions (vertically and horizontally) but in two directions (horizontally) with the system of the first embodiment.

Figure 23:
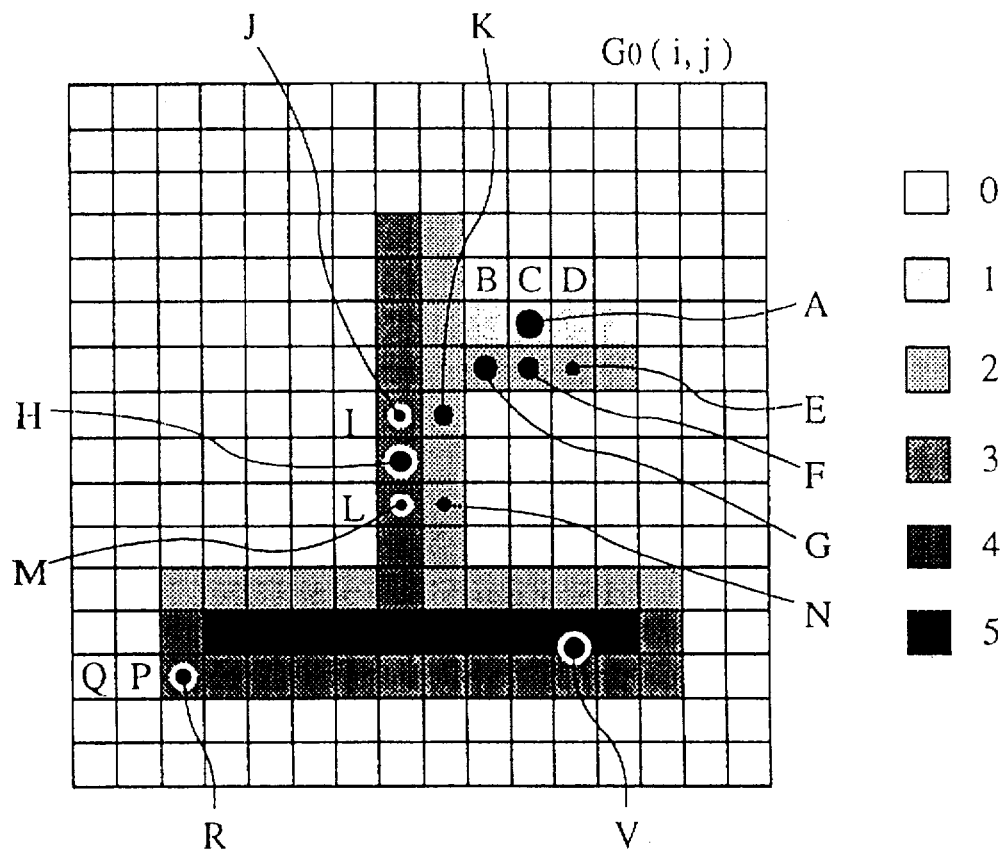
FIG. 23 shows an example of gray scale data to be processed (font data of "上", the Chinese character of an adverb "up")

An example of the gray scale data to be processed are shown in FIG. 23; the gray scale data represent the gray scale font data of " 上 ", the Chinese character for an adverb "up".

Figure 24A:
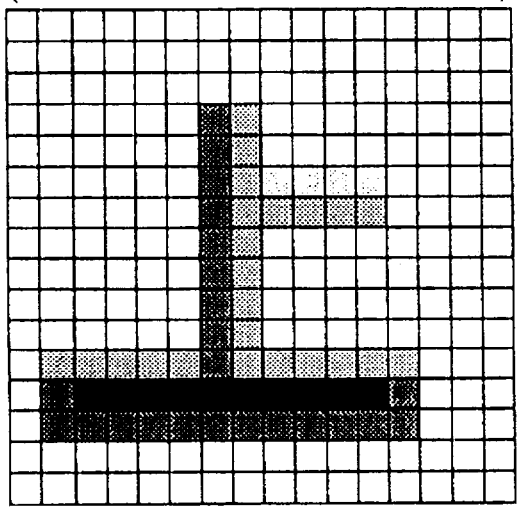
FIGS. 24(a) and 24(b) show two kinds of shift data generated by the shift data generating unit based on the gray scale data in FIG. 23.
Figure 24B:
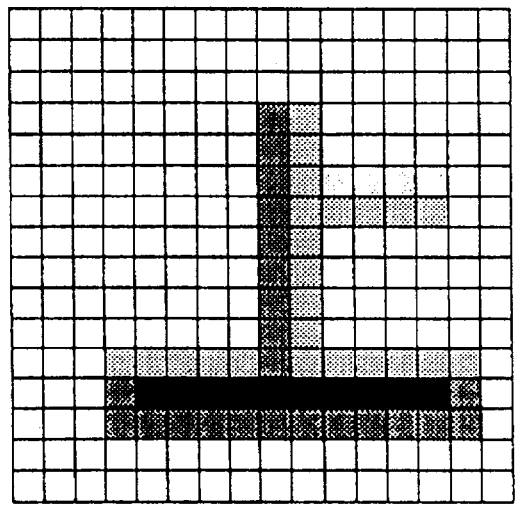

The shift data generating unit 101 generates two kinds of shift data as shown in FIGS. 24(a) and 24(b) by shifting the gray scale data shown in FIG. 23 to the left and right by one pixel, respectively.

Figure 25:
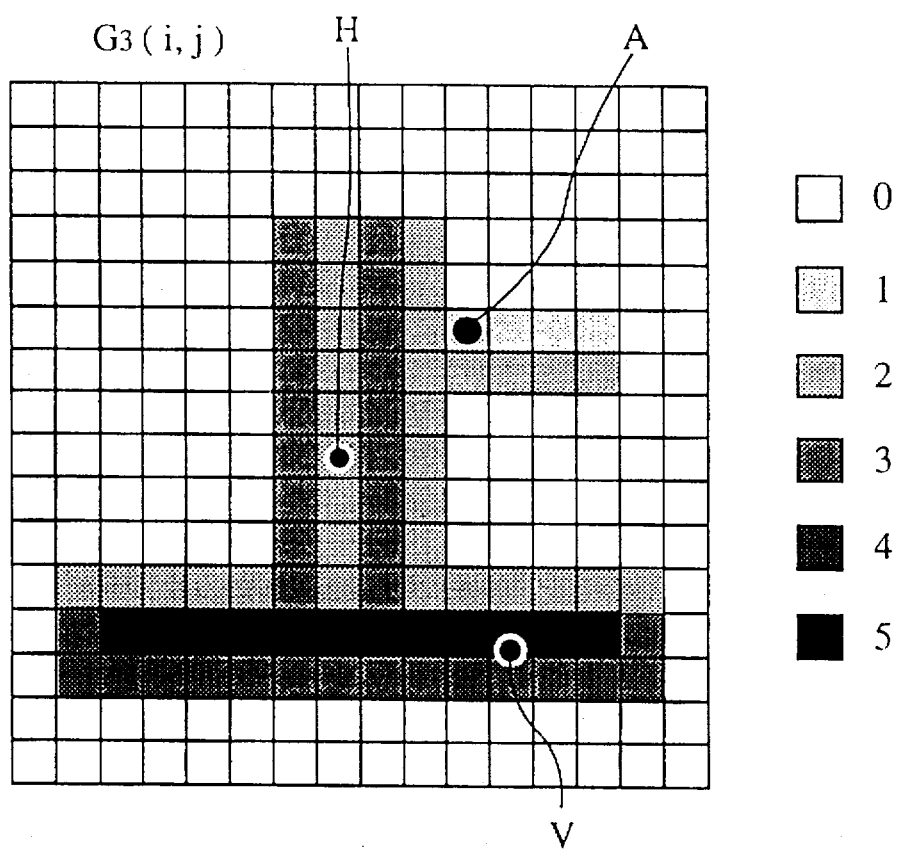
FIG. 25 shows gray scale synthesized data generated by the first gray scale data synthesizing unit based on the gray scale data in FIGS. 24(a) and 24(b)

The first gray scale data synthesizing unit 102 synthesizes the two kinds of data to produce the gray scale synthesized data as shown in FIG. 25.

Figure 26:
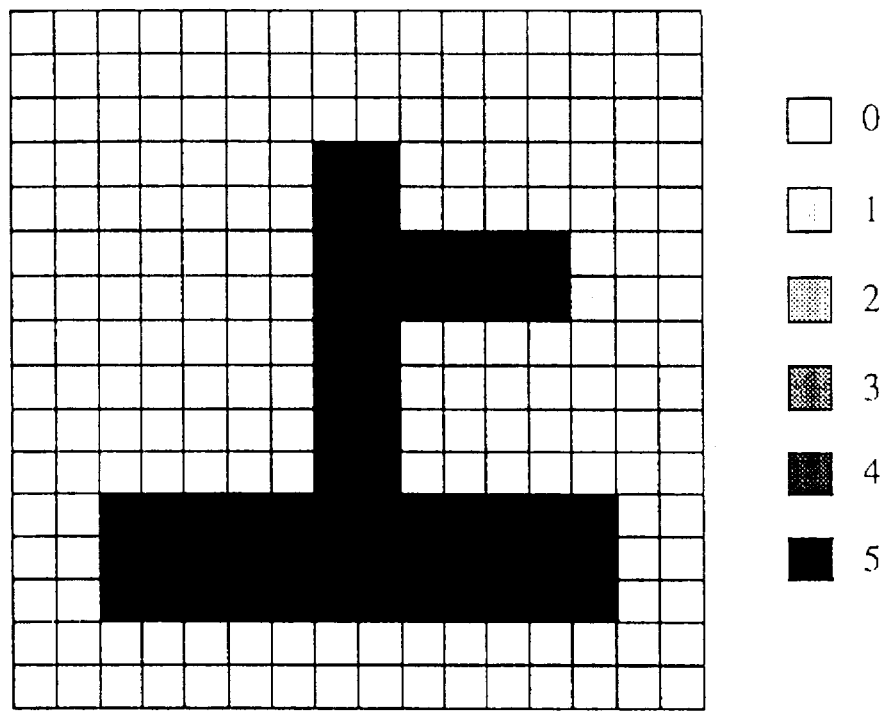
FIG. 26 shows update data generated by the update data generating unit based on the gray scale data in FIG. 23.

The update data generating unit 103 updates the gray scale data shown in FIG. 23 to generated the update data shown in FIG. 26.

Figure 27:
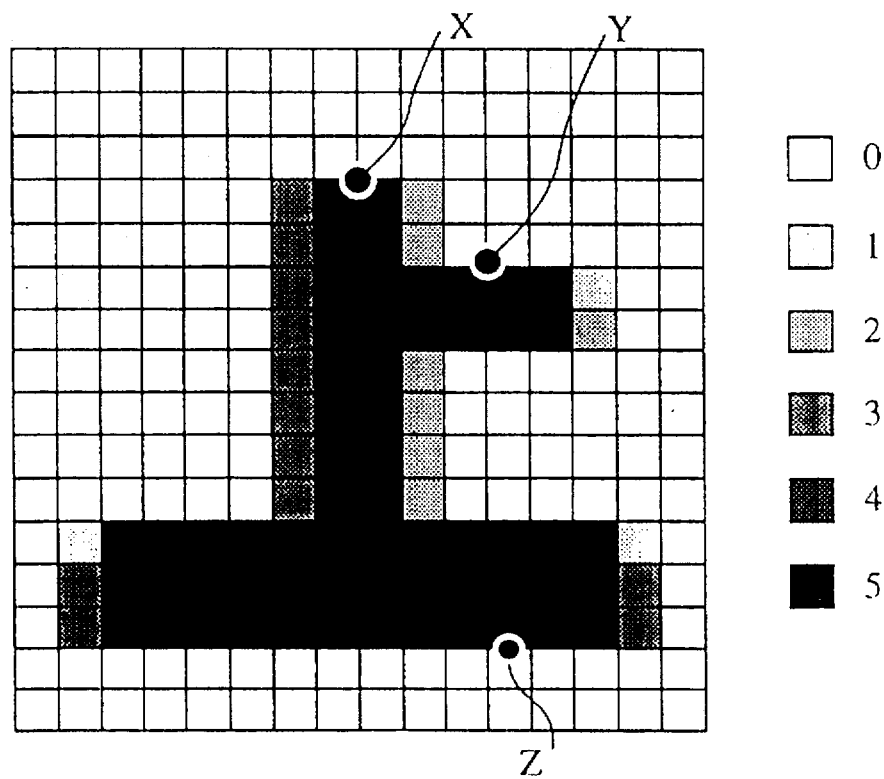
FIG. 27 shows low-quality gray scale bold data generated by applying the bold process horizontally to the gray scale data in FIG. 23 using the gray scale modified data generating system of the first embodiment.

The second gray scale data synthesizing unit 104 synthesizes the gray scale synthesized data shown in FIG. 25 and the update data shown in FIG. 26 to generated the gray scale bold data shown in FIG. 27.

In the resulting gray scale bold data shown in FIG. 27, however, a part of the contour in the horizontal stem is unnatural. Such a part is identified by capital letters X, Y, and Z in FIG. 27, where a pixel of the background color and a pixel of the foreground color are adjacent. In other words, the color of contour has become the foreground color, where it should be an intermediate shade of gray. For this reason, the horizontal stem is displayed thicker more than necessary, making the gray scale bold data shown in FIG. 27 unnatural.

To eliminate such inconvenience, there is a method to synthesize the original gray scale data shown in FIG. 23 and the gray scale synthesized data shown in FIG. 25. To be more specific, the value of the mapping pixels on the original gray scale data shown in FIG. 23 or the gray scale synthesized data shown in FIG. 25, whichever greater, is set to the mapping pixel on the gray scale bold data. The gray scale bold data as shown in FIG. 28 are generated as a result of this method.

Figure 28:
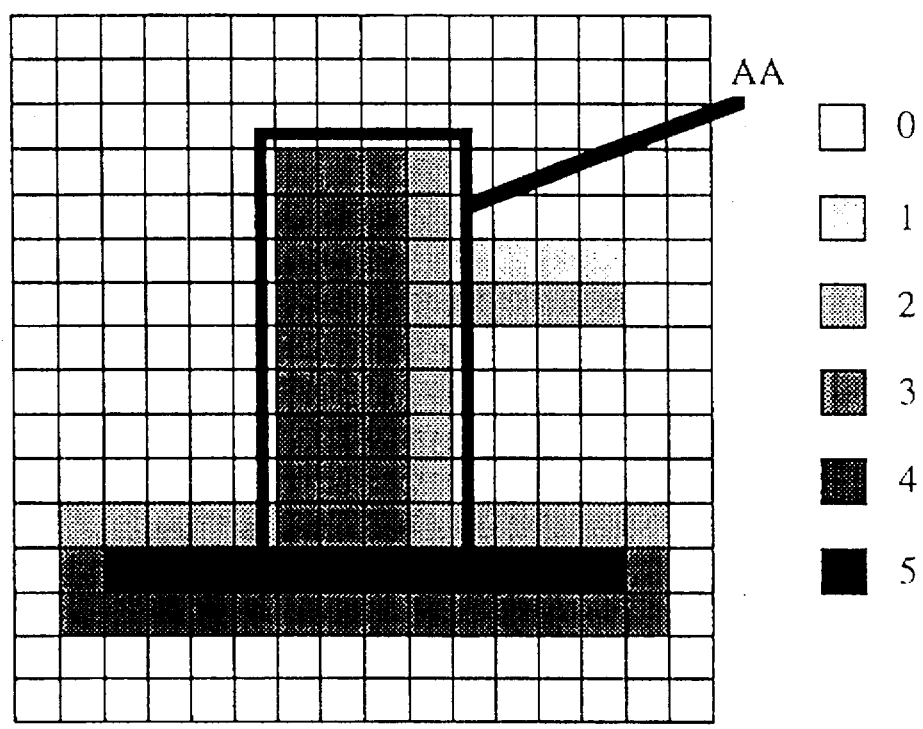
FIG. 28 shows low-quality gray scale bold data generated by synthesizing the gray scale data in FIG. 23 and the gray scale synthesized data in FIG. 25.

However, the vertical stem of " 上 ", the Chinese character for an adverb "up", enclosed by a rectangle AA shown in FIG. 28, is expanded sufficiently, but undesirably turned into intermediate shades of gray. This method changes the entire vertical stem to an approximate color to the background color (herein almost white), making the resulting gray scale bold data unnatural.

As has been explained, the above two methods are not suitable for generating the bold data by applying the bold process to the gray scale data either vertically or horizontally. These methods degrade the quality of the diagonal lines in addition to the vertical and horizontal stems.

Accordingly, the gray scale modified data generating system of the fifth embodiment upgrades the quality by the following method.

Figure 29:
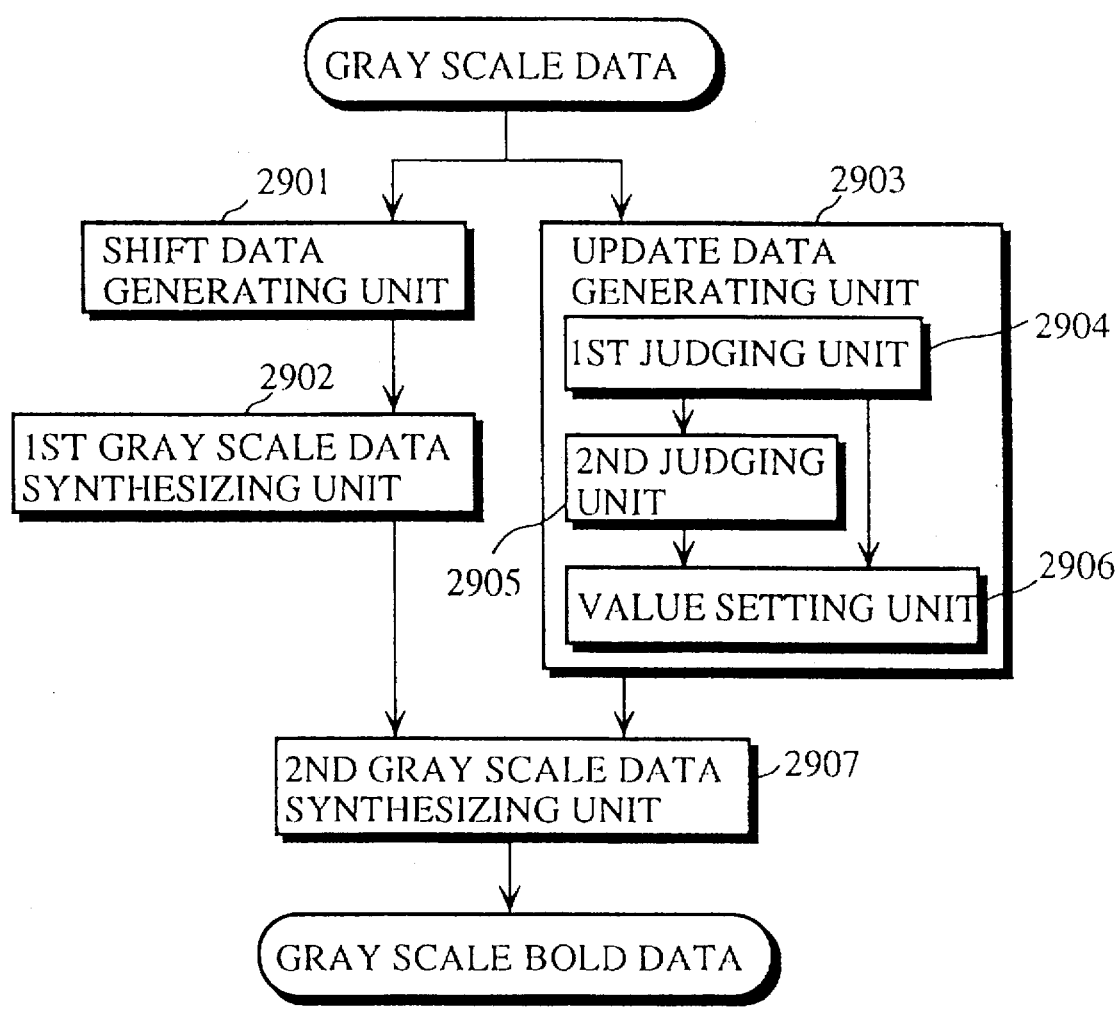
FIG. 29 is a view depicting a structure of a gray scale modified data generating system in accordance with a fifth embodiment of the present invention.

FIG. 29 is a view depicting the structure of the gray scale modified data generating system of the fifth embodiment. In the drawing, numeral 2901 denotes a shift data generating unit, numeral 2902 denotes a first gray scale data synthesizing unit, numeral 2903 denotes an update data generating unit, and numeral 2907 denotes a second gray scale data synthesizing unit.

The gray scale data to be processed are the data shown in FIG. 23.

Figure 30:
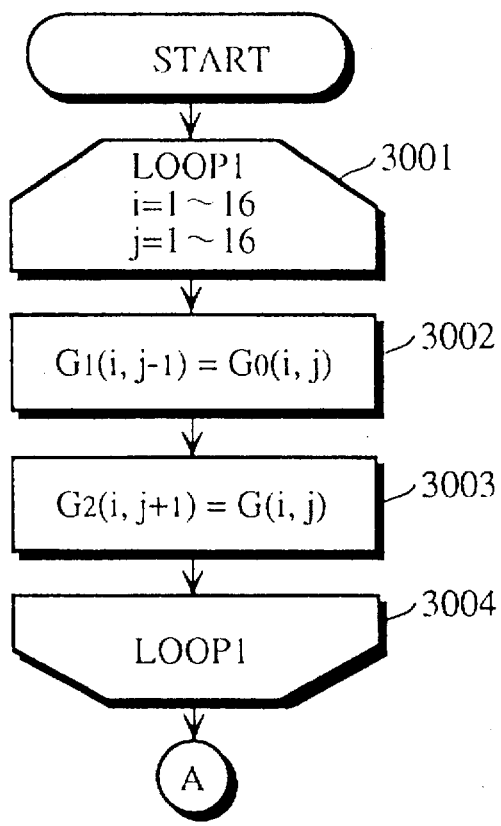
FIG. 30 is a flowchart detailing a procedure of a shift data generating unit 2901.

The shift data generating unit 2901 generates two pieces of shift data G1(i, j) and G2(i, j), which are respectively shown in FIGS. 24(a) and 24(b), by shifting the gray scale data shown in FIG. 23 in two directions horizontally by one pixel. This procedure is detailed by the flowchart in FIG. 30, where G0(i, j), G1(i, j), and G2(i, j) represent the values of the pixel positioned at the i'th row and j'th column in the gray scale data to be processed, the data shifted to the left by the shift data generating unit 2901, and the data shifted to the right by the shift data generating unit 2901, respectively.

The first gray scale data synthesizing unit 2902 synthesizes the two kinds of data thus generated to generated the gray scale synthesized data G3(i, j) as shown in FIG. 25.

Figure 31:
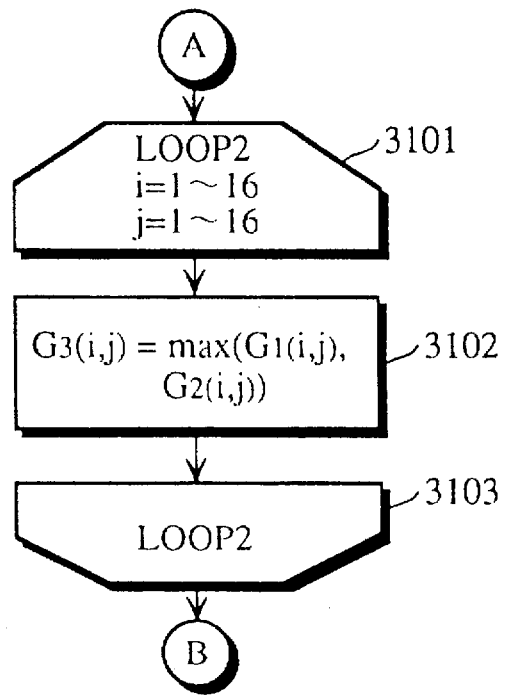
FIG. 31 is a flowchart detailing a procedure of a first gray scale data synthesizing unit 2902.

This procedure is detailed by the flowchart in FIG. 31, where G3(i, j) represents the value of the pixel positioned at the i'th row and j'th column on the gray scale synthesized data generated by the first gray scale data synthesizing unit 2902.

Figure 32:
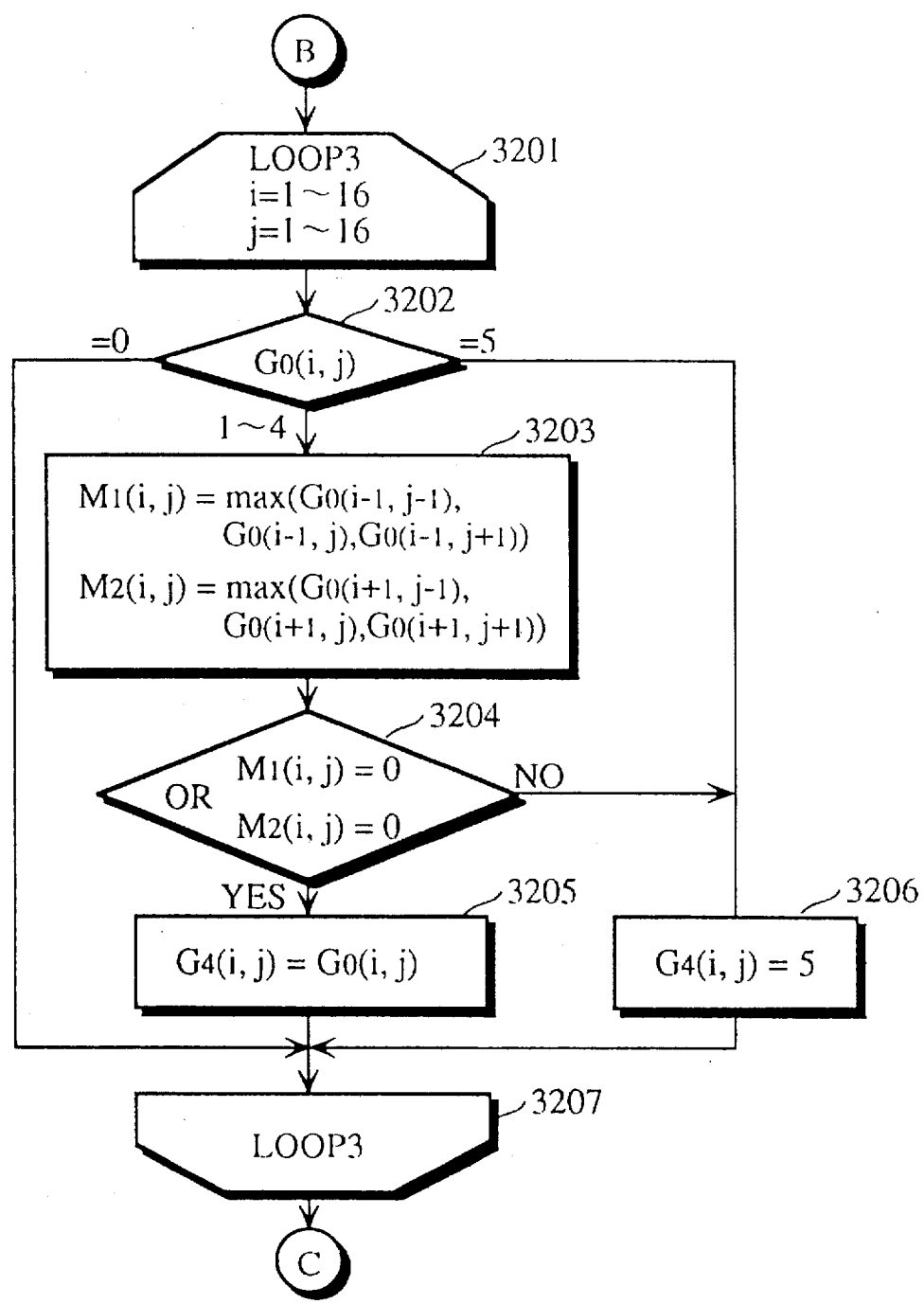
FIG. 32 is a flowchart detailing a procedure of an update data generating unit 2903.

The update data generating unit 2903 includes a first judging unit 2904, a second judging unit 2905, and a value setting unit 2906. This procedure is detailed by the flowchart in FIG. 32. In the drawing, M1(i, j) and M2(i, j) represent the greatest value among three pixels over a pixel P(i, j) and three pixels thereunder, respectively. Also in the drawing, G4(i, j) represents the value of the pixel positioned at the i'th row and j'th column on the update data generated by the update data generating unit 2903.

The first judging unit 2904 judges whether each pixel on the gray scale data has the background color, intermediate shades of gray, or foreground color. This procedure corresponds to Step 3202.

For example, the first judging unit 2904 judges the pixel P on the gray scale data shown in FIG. 23 to have the background color value "0"; pixels A and H to have the intermediate shades of gray values "1" and "3", respectively; and a pixel V to have the foreground color value "5".

The second judging unit 2905 judges whether the highest value among the three neighboring pixels over and diagonally to the upper right and left of a pixel or the highest value among the three neighboring pixels under and diagonally to the lower right and left of the pixel is the background color when the pixel is judged to have the intermediate shades of gray by the first judging unit 2904. This procedure corresponds to Steps 3203 through 3203.

For example, the first judging unit 2904 judges the pixel A to have the intermediate shade of gray "1", and the second judging unit 2905 calculates the highest value among the three neighboring pixels over the pixel A and that of the three neighboring pixels thereunder. Pixels B, C, and D are the neighboring pixels over the pixel A, which exhibit the values "0", "0", and "0", respectively. Thus, the highest value among them is the value "0". On the other hand, pixels E, F, and G are the neighboring pixels under the pixel A, which exhibit the values "2", "2", and "2", respectively. Thus, the highest value among them is the value "2". Given two highest values "0" and "2", the second judging unit 2905 judges that one of the highest values thus calculated is the background color value.

On the other hand, since the pixel H exhibits the value "3", the first judging unit 2904 judges that the pixel H to have the intermediate shade of gray value. Accordingly, as is with the pixel A, the second judging unit 2905 calculates the highest value of the three neighboring pixels over the pixel H and that of the three neighboring pixels thereunder. Pixels I, J, and K are the three neighboring pixels over the pixel H, which exhibit the values "0", "3", and "2", respectively. Thus, the value "3" is the greatest value. On the other hand, pixels L, M, and N are the three neighboring pixels under the pixel H, which exhibit the values "0", "3", and "2", respectively. Thus, the value "3" is the greatest value. Since both the highest values thus calculated exhibit "3", the second judging unit 2905 judges that neither of them is the foreground color value.

The value setting unit 2906 sets the value of a pixel to the value of its mapping pixel on the update data when the pixel is judged to have the intermediate shade of gray by the first judging unit 2904 and one of its highest values is judged to be the background color value by the second judging unit 2905. This procedure corresponds to Step 3205. On the other hand, the value setting unit 2906 sets the foreground color value to the value of the mapping pixel on the update data when a pixel is judged to have an intermediate shade of gray by the first judging unit 2904, and one of its highest values is judged not to be the background color value but to be the non-background color value by the second judging unit 2905. This procedure corresponds to Step 3206.

For example, the pixel A is judged to have an intermediate shade of gray by the first judging unit 2904, and one of its two highest values is judged to be the background color value by the second judging unit 2905. Thus, the value setting unit 2906 sets the value "1" of the pixel A to the value of its mapping pixel on the update data.

On the other hand, the pixel H is judged to have an intermediate shade of gray by the first judging unit 2904, and one of its two highest values is judged not to be the background color value by the second judging unit 2905. Thus, the value setting unit 2906 sets the foreground color value "5" to the value of its mapping pixel on the update data.

Similarly, the pixel V is judged to have the foreground color value by the first judging unit 2904, and the value setting unit 2906 sets the foreground color value "5" to the value of its mapping pixel on the update data.

Figure 34:
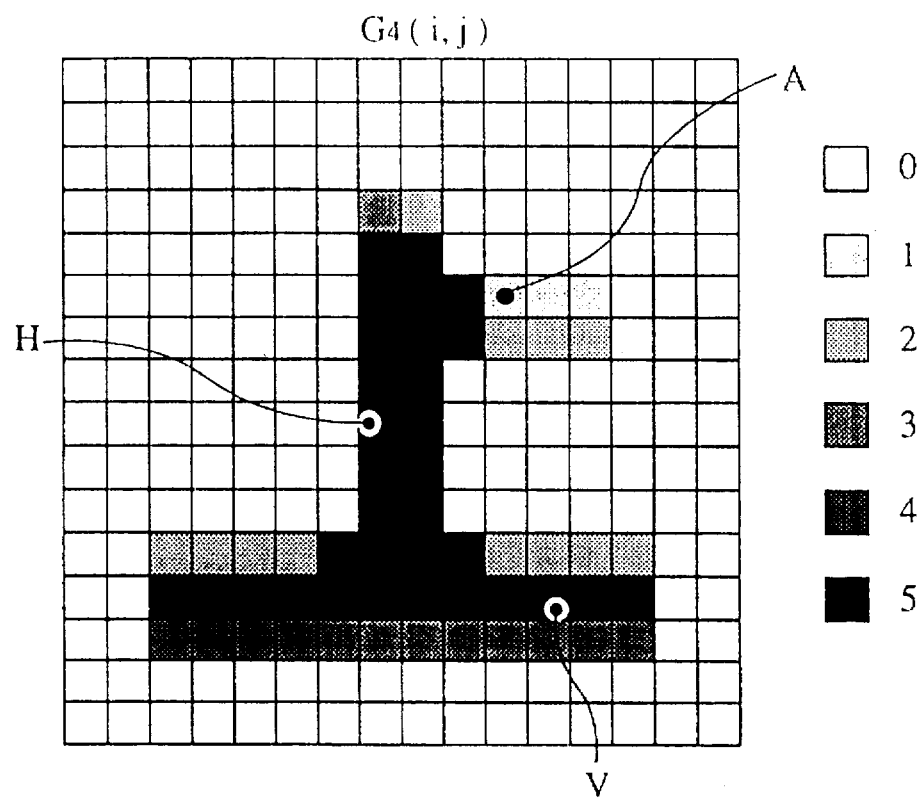
FIG. 34 shows update data generated by the update data generating unit based on the gray scale data in FIG. 23.

The update data G4(i, j) thus generated by the update data generating unit 2903 are shown in FIG. 34. The pixel A exhibits the value "1" in both FIG. 23 and FIG. 34; the pixel H exhibit the value "3" in FIG. 23 which is updated to the value "5" in FIG. 34; and the pixel V exhibits the value "5" in both FIG. 23 and FIG. 34.

Figure 33:
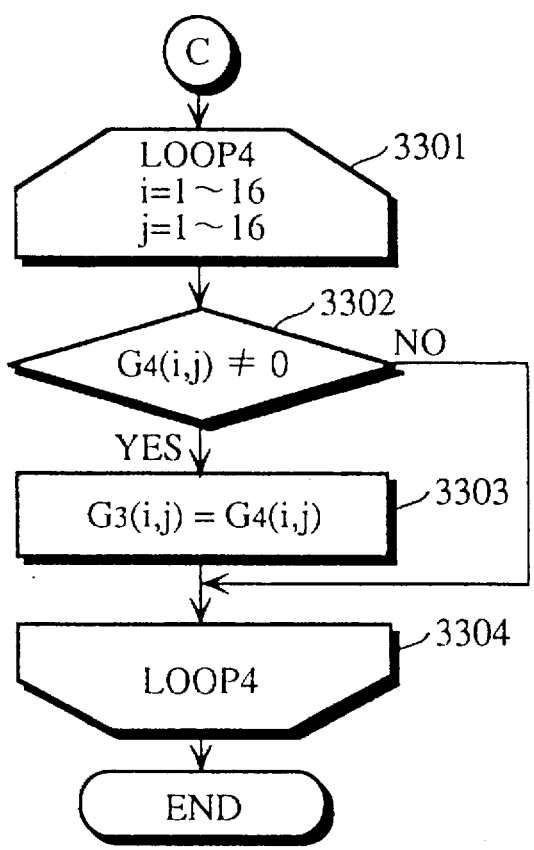
FIG. 33 is a flowchart detailing a procedure of a second gray scale data synthesizing unit 2907.
Figure 35:
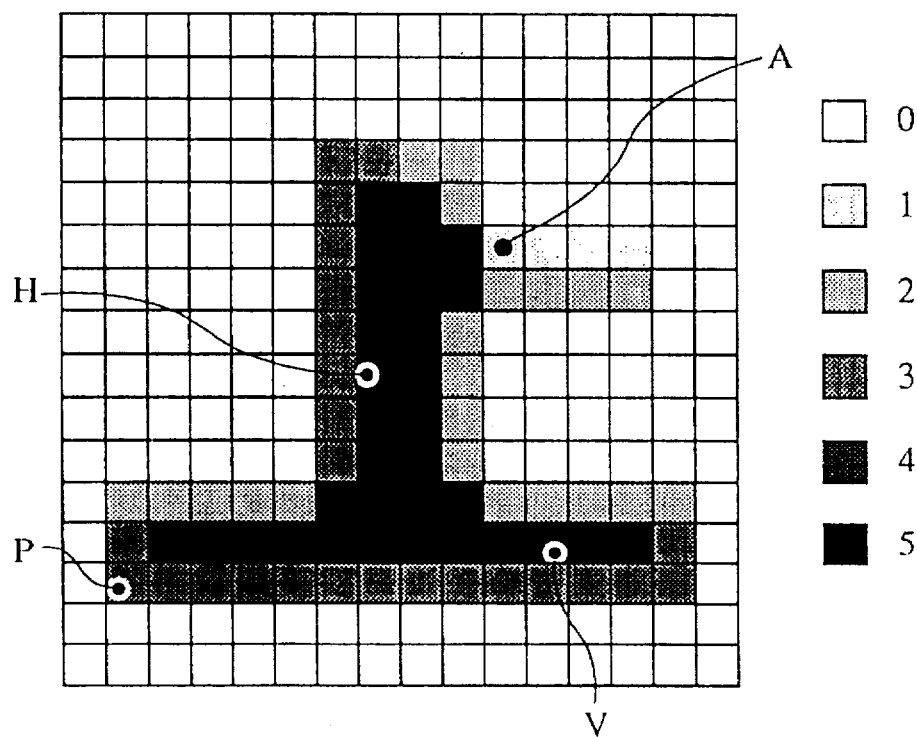
FIG. 35 shows gray scale bold data generated by gray scale modified data generating systems of the fifth and seventh embodiments.

The second gray scale data synthesizing unit 2907 overwrites the value of the each pixel on the gray scale synthesized data generated by the first gray scale data synthesizing unit 2902 with the value of the mapping pixel on the non-background color area of the update data. This procedure is detailed by the flowchart in FIG. 33, where G3(i, j) represents the value of the pixel positioned at the i'th row and j'th column in the resulting gray scale bold data. In this embodiment, the value of the pixel of the gray scale synthesized data in FIG. 25 is written with the value of the mapping pixel corresponding to the non-background color area of the update data shown in FIG. 34. Thus, the gray scale bold data as shown in FIG. 35 are generated. The values of the pixels A, H, and V in FIG. 35 are overwritten with the values "1", "5", and "5", respectively by the second gray scale data synthesizing unit 2907. It is apparent from the gray scale bold data shown in FIG. 35 that the horizontal stem is expanded and the center thereof is set to the background color, while the contour of both the vertical and horizontal stems remain at intermediate shades of gray. Thus, the gray scale bold data shown in FIG. 35 are natural and well defined compared with those shown in FIGS. 27 and 28.

Sixth Embodiment

The gray scale modified data generating system of the fifth embodiment can additionally include a repetition control unit for controlling the repetitive operation.

Figure 36:
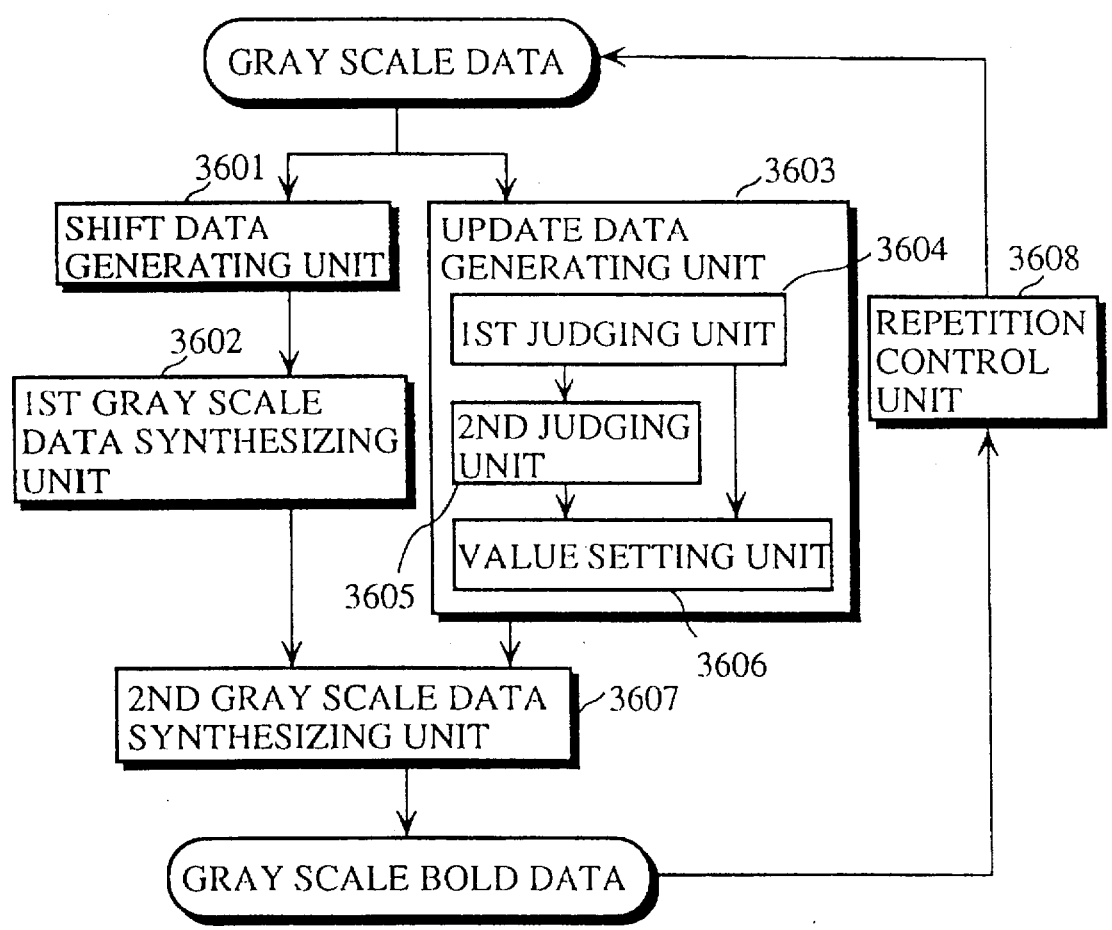
FIG. 36 is a view depicting a structure of a gray scale modified data generating system in accordance with a sixth embodiment.
Figure 37:
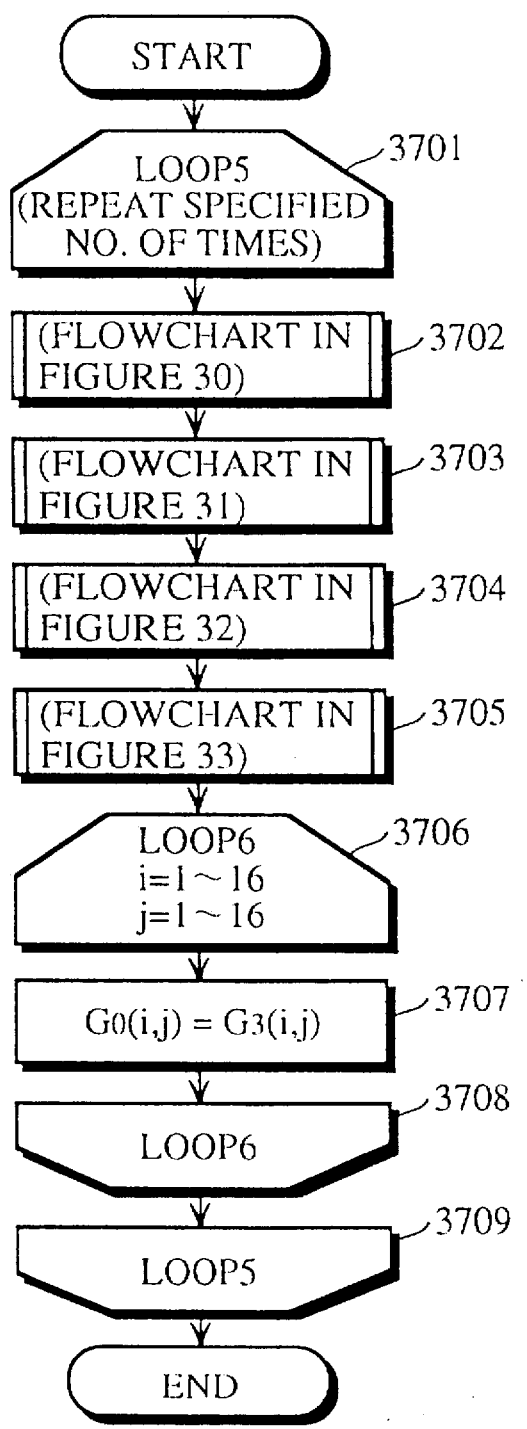
FIG. 37 is a flowchart detailing a procedure of the gray scale modified data of the sixth embodiment.

FIG. 36 is a view depicting the structure of the gray scale modified data generating system of the sixth embodiment. In the drawing, numeral 3601 denotes a shift data generating unit, numeral 3602 denotes a first gray scale data synthesizing unit, numeral 3063 denotes an update data generating unit, numeral 3604 denotes a first judging unit, numeral 3605 denotes second judging unit, numeral 3606 denotes a value setting unit, numeral 3607 denotes a second gray scale data synthesizing unit, and numeral 3608 denotes a repetition control unit. The units denoted by numerals 3601 through 3607 are identical with their respective counterparts of the gray scale modified data generating system of the fifth embodiment. The entire procedure of the sixth embodiment is detailed by the flowchart in FIG. 37, where the procedures in the fifth embodiment (Steps 3702 through 3705) are repeated in the loop 5 (Steps 3701 through 3709).

The repetition control unit 3608 repeats the generation of the gray scale bold data by the gray scale modified data generating system for a specific number of times to generate data in various thickness.

Figure 38:
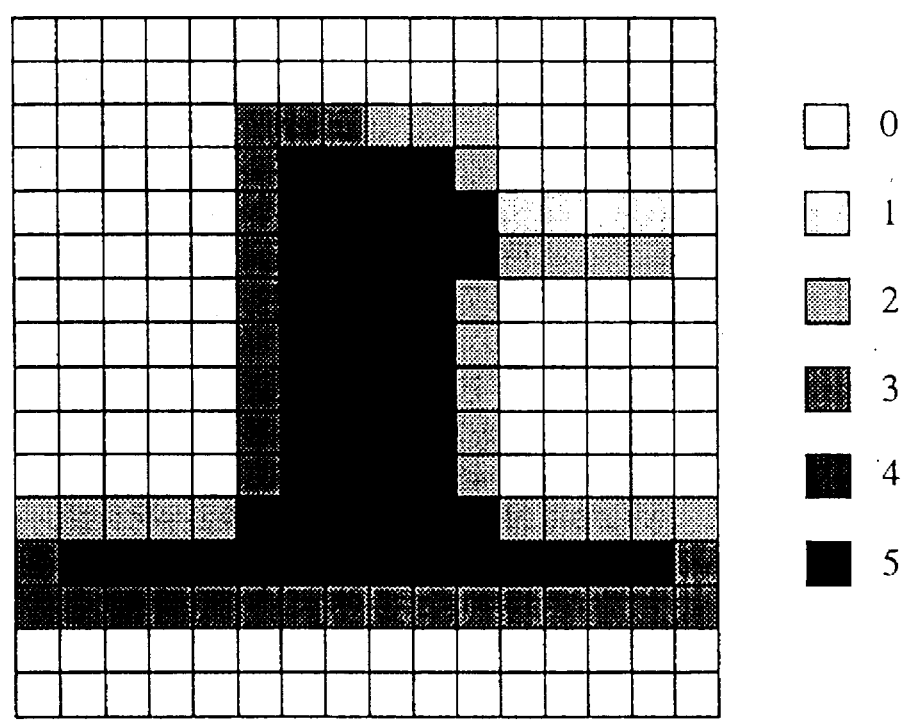
FIG. 38 shows gray scale bold data generated by gray scale modified data generating systems of the sixth and eighth embodiments.

To be more concrete, a case where the gray scale bold data are generated based on the gray scale data in FIG. 23 by setting the number of repetition times to two will be explained. In the first cycle, the gray scale bold data shown in FIG. 35 are generated as explained in the fifth embodiment. In the second cycle, the bold data generating process is applied in the same manner as the fifth embodiment to the gray scale bold data in FIG. 35 generated in the first cycle. FIG. 38 shows the gray scale bold data generated by repeating the bold data generating process twice. It can be acknowledged that the gray scale bold data in the sixth embodiment are thicker than those in the fifth embodiment. The gray scale bold data in various thickness can be generated by setting an arbitrary number to the repetition times.

Seventh Embodiment

In the seventh embodiment, a system for applying the bold process to the gray scale data horizontally at a higher speed will be explained.

Figure 39:
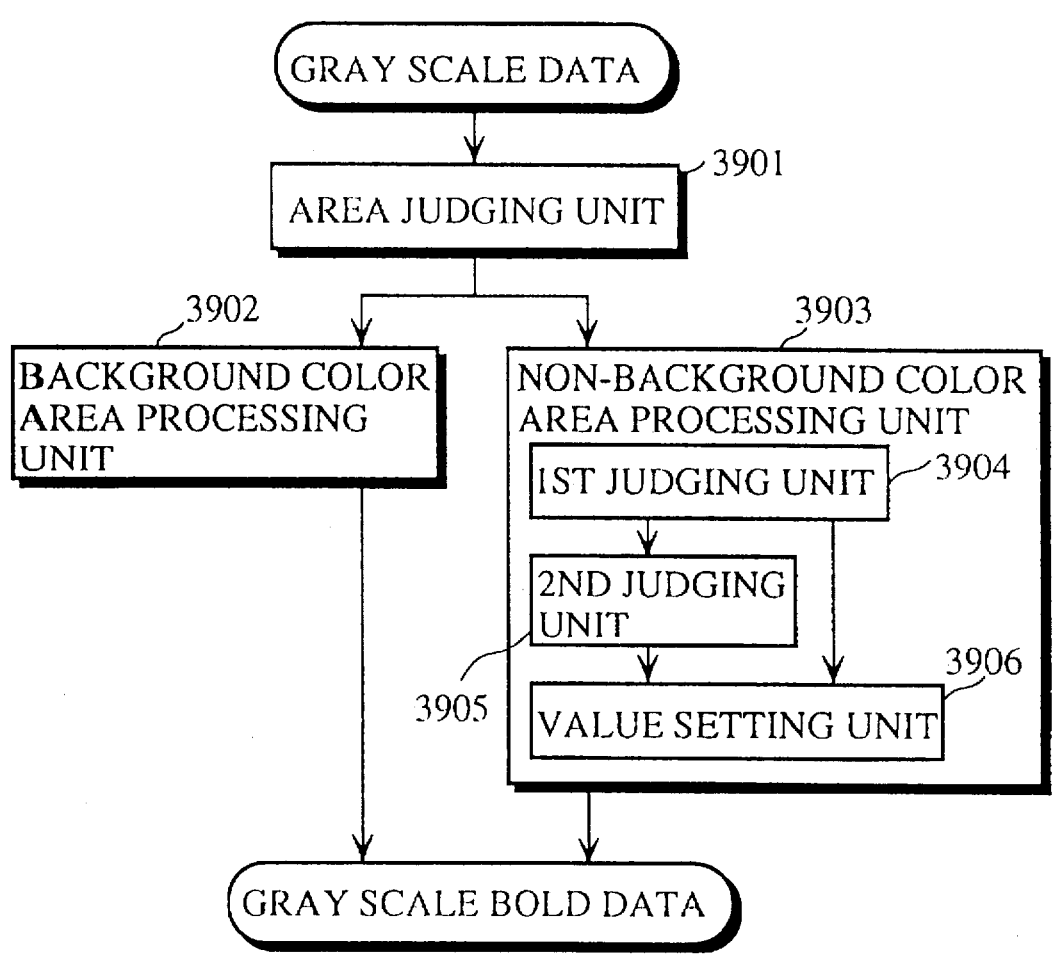
FIG. 39 is a view depicting a structure of a gray scale modified data generating system in accordance with a seventh embodiment of the present invention.
Figure 40:
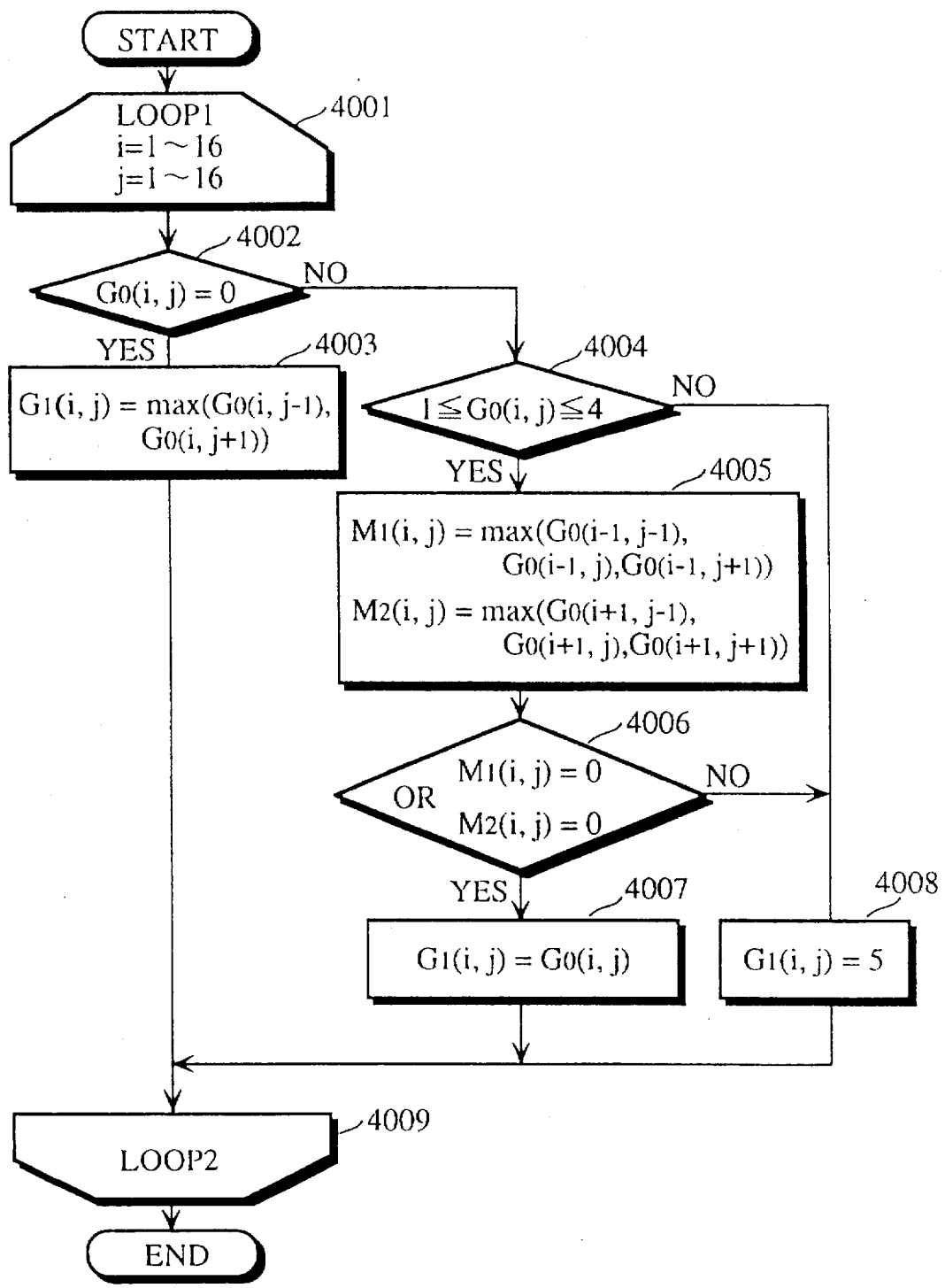
FIG. 40 is a flowchart detailing a procedure of the gray scale modified data generating system of the seventh embodiment.

FIG. 39 is a view depicting the structure of the gray scale modified data generating system of the seventh embodiment. In the drawing, numeral 3901 denotes an area judging unit 3901, numeral 3902 denotes a background color area processing unit, and numeral 3903 denotes a non-background color area processing unit. The entire process of this embodiment is detailed by the flowchart in FIG. 40. In the drawing, G0(i, j) and G1(i, j) represent the values of the pixel positioned at the i'th row and j'th column on the gray scale data to be processed and the resulting gray scale bold data, respectively, and M1(i, j) and M2(i, j) represent the highest values among the three neighboring pixels over and three neighboring pixels under the pixel P, respectively.

The non-background color area processing unit 3903 includes a first judging unit 3904, a second judging unit 3905 and a value setting unit 3906.

As is with the fifth embodiment, the gray scale data to be processed are the ones shown in FIG. 23, or namely, the font data of " 上 ", the Chinese character of an adverb "up".

The area judging unit 3901 judges whether each pixel on the gray scale data has the background color value. This procedure corresponds to Step 4002.

The area judging unit 3901 operates in the same manner as the area judging unit 1701 of the third embodiment.

For example, the pixel P on the gray scale data shown in FIG. 23 exhibits the value "0", and thus is judged to have the background color value; the pixels A, H and V exhibit the values "2", "3", and "5", respectively, and thus are judged not to have the background color value.

The background color area processing unit 3902 sets the highest value of the two neighboring pixels in the right and left to the value of the mapping pixel on the modified data when a pixel is judged to have the background color value by the area judging unit 3901. This procedure corresponds to Step 4003.

The background color area processing unit 3902 operates in the same manner as the background color area processing unit 1702 of the third embodiment except that it calculates the highest value among the two neighboring pixels instead of four neighboring pixels.

For example, since the pixel P is judged to have the background color value by the area judging unit 3901, one of the values of its neighboring pixels Q and R is calculated, whichever greater. The pixels Q and R respectively exhibit the values "0" and "3", and the value "3" is the highest value. Accordingly, the value "3" is set to the value of the mapping pixel of the pixel P on the gray scale bold data shown in FIG. 35.

The non-background color area processing unit 3903 operates as follows when a pixel is judged not to have the background color value.

For example, the pixels A, H, and V are judged not to have the background color value by the area judging unit 3901, and the following process will be further applied to these pixels.

The first judging unit 3904 judges whether each pixel on the non-background color area has an intermediate shade of gray value or a foreground color value. This process corresponds to Step 4004.

For example, the pixels A and H are judged to have intermediate shades of gray values, while the pixel H is judged to have the foreground color value.

The second judging unit 3905 judges whether the highest value among the three neighboring pixels over and diagonally to the upper right and left of a pixel or the highest value among the three neighboring pixels under and diagonally to the lower right and left thereof has the background color value when the pixel is judged to have an intermediate shade of gray value by the first judging unit. This procedure corresponds to Steps 4005 and 4006.

For example, the highest values among the three neighboring pixels B, C, and D over the pixel A and among the three neighboring pixels E, F, and G thereunder are the values "0" and "2", respectively. Thus, one of the highest values is judged to have the background color value. On the other hand, the highest values among the three neighboring pixels I, J, and K over the pixel H and among the three neighboring pixels L, M, and N thereunder are the values "3" and "3". Thus, neither of them is judged to have the background color value.

The value setting unit 3906 sets the value of a pixel to the value of its mapping pixel on the gray scale bold data when the pixel is judged to have in intermediate shade of gray value by the first judging unit 3901 and one of its two highest values is judged to have the background color value by the second judging unit 3905. This procedure corresponds to Step 4007. On the other hand, the value setting unit 3906 sets the foreground color value to the value of the mapping value on the gray scale bold data when a pixel is judged to have the foreground color value by the first judging unit 3901, or when the pixel is judged to have an intermediate shade of gray value by the first judging unit 3901 and one of its two highest values is judged not to be the background color value by the second judging unit 3905. This procedure corresponds to Step 4008.

For example, the pixel A is judged to have an intermediate shade of gray value by the first judging unit and one of its two highest values is judged to be the background color value by the second judging unit. Thus, the value "1" of the pixel A is set to its mapping pixel on the gray scale bold data.

On the other hand, the pixel H is judged to have an intermediate shade of gray value by the first judging unit, and neither of its two highest values is judged to be the background color value by the second judging unit. Thus, the foreground color value "5" is set to the value of its mapping pixel on the gray scale bold data.

Similarly, the pixel V is judged not to have an intermediate shade of gray value by the first judging unit, and the foreground color value "5" is set to the value of its mapping pixel on the gray scale bold data.

The gray scale bold data shown in FIG. 35 are generated by applying the above procedures to all of the pixels in FIG. 23.

The resulting data are identical with those in the fifth embodiment; however, the gray scale modified data generating system of the seventh embodiment operates faster than the gray scale modified data generating system of the fifth embodiment. This is because the former carries out the shift-synthesize process and update-overwrite process in the fifth embodiment at the same time.

Eighth Embodiment

The gray scale modified data generating system of the seventh embodiment can additionally include a repetition control unit for controlling the repetitive operation.

Figure 41:
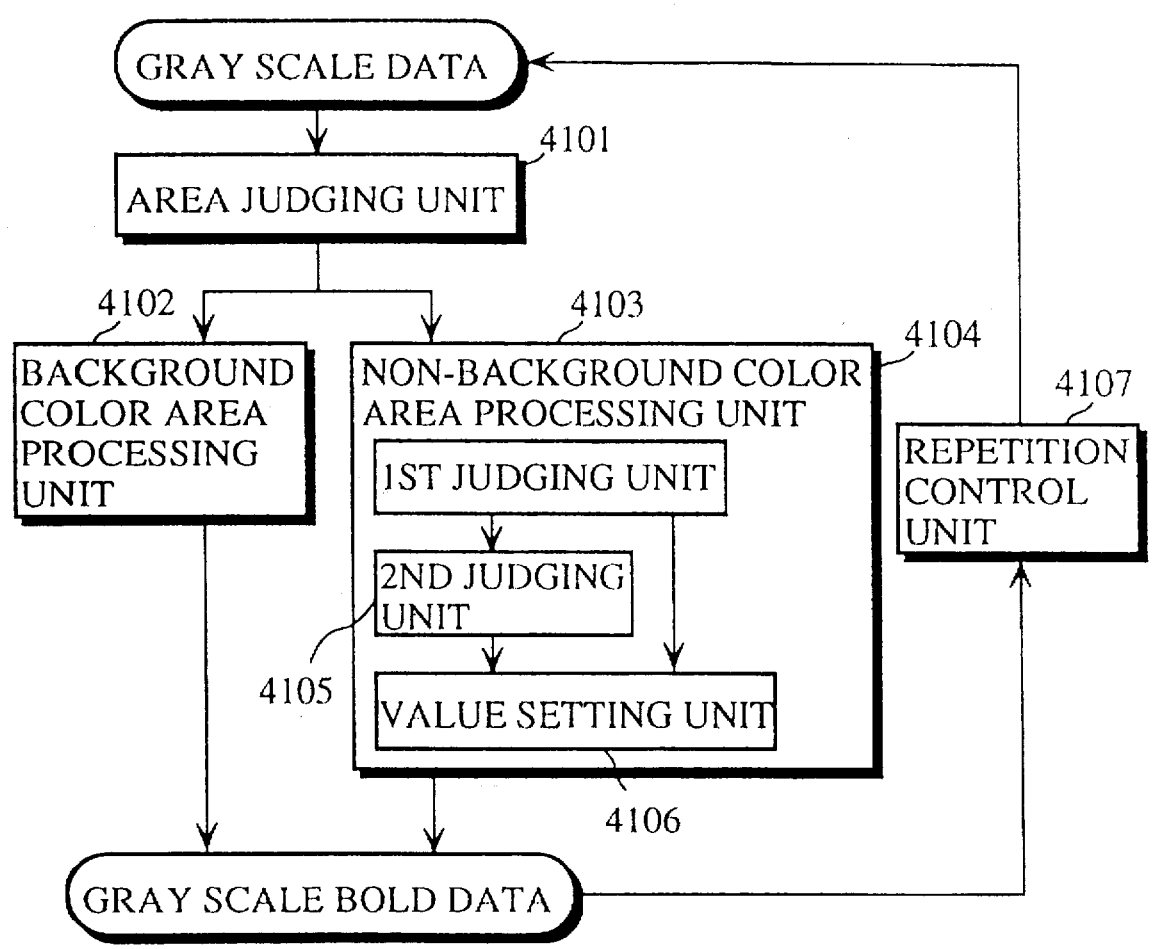
FIG. 41 is a view depicting a structure of the gray scale modified data generating system in accordance with the eighth embodiment of the present invention.
Figure 42:
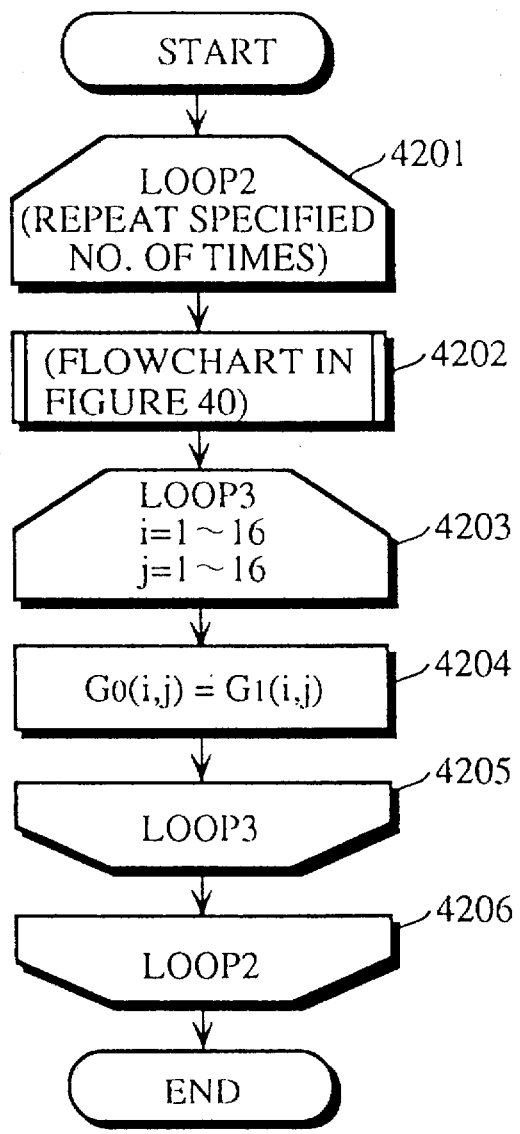
FIG. 42 is a flowchart detailing a procedure of the gray scale modified data generating system of the eighth embodiment.

FIG. 41 is a view depicting the structure of the gray scale modified data generating system of the eighth embodiment. In the drawing, numeral 4101 denotes an area judging unit, numeral 4102 denotes a background color area processing unit, numeral 4103 denotes a non-background color area processing unit, numeral 4104 denotes a first judging unit, numeral 4105 denotes a second judging unit, numeral 4106 denotes a value setting unit, and numeral 4107 denotes a repetition control unit. The units denoted by numerals 4101 through 4106 are identical with their respective counterparts of the gray scale modified data generating system of the seventh embodiment. The entire procedure of the eighth embodiment is detailed by the flowchart in FIG. 42, where the procedure in the seventh embodiment (Steps 4202) is repeated in the loop 2 (Steps 4201 through 4206).

The repetition control unit 4107 repeats the generation of the gray scale bold data by the gray scale modified data generating system of the seventh embodiment for a specific number of times to generate data in various thickness.

To be more concrete, a case where the gray scale bold data are generated based on the gray scale data in FIG. 23 by setting the number of repetition times to two will be explained. In the first cycle, the gray scale bold data shown in FIG. 35 are generated as explained in the seventh embodiment. In the second cycle, the bold data generating process is applied in the same manner as the seventh embodiment to the gray scale bold data in FIG. 35 generated in the first cycle. FIG. 38 shows the gray scale bold data generated by repeating the bold data generating process twice. It can be acknowledged that the gray scale bold data in the eighth embodiment are thicker than those in the seventh embodiment. The gray scale bold data in various thickness can be generated by setting an arbitrary number to the repetition times.

The resulting data are identical with the ones in the sixth embodiment; however, the gray scale modified data generating system of the eighth embodiment operates faster than the gray scale modified data generating system of the sixth embodiment. This is because the former carries out the shift-synthesize process and update-overwrite process in the sixth embodiment at the same time, and repeats such simultaneous processing.

Ninth Embodiment

The gray scale modified data generating systems for applying the vertical and horizontal bold process explained in the first through fourth embodiments, and those for applying the horizontal bold process explained in the fifth through eighth embodiments can be combined.

A case where an image in the gray scale data are expanded vertically by two pixels, while being expanded horizontally by five pixels will be explained as an example.

In the first step, the bold process is repeated twice by the gray scale modified data generating system of the second or fourth embodiment to generate the gray scale bold data, or an image in the gray scale data expanded vertically and horizontally by two pixels.

In the second step, the bold process is repeated three times by the gray scale modified data generating system of the sixth or eighth embodiment to generate the gray scale bold data, or the gray scale bold data generated by further expanding the image in the gray scale bold data generated in the first step horizontally by three pixels.

By combining the bold process in the first step and second step, an image in the gray scale bold data, or the gray scale data expanded vertically by two pixels and horizontally by five pixels, are generated.

Figure 43:
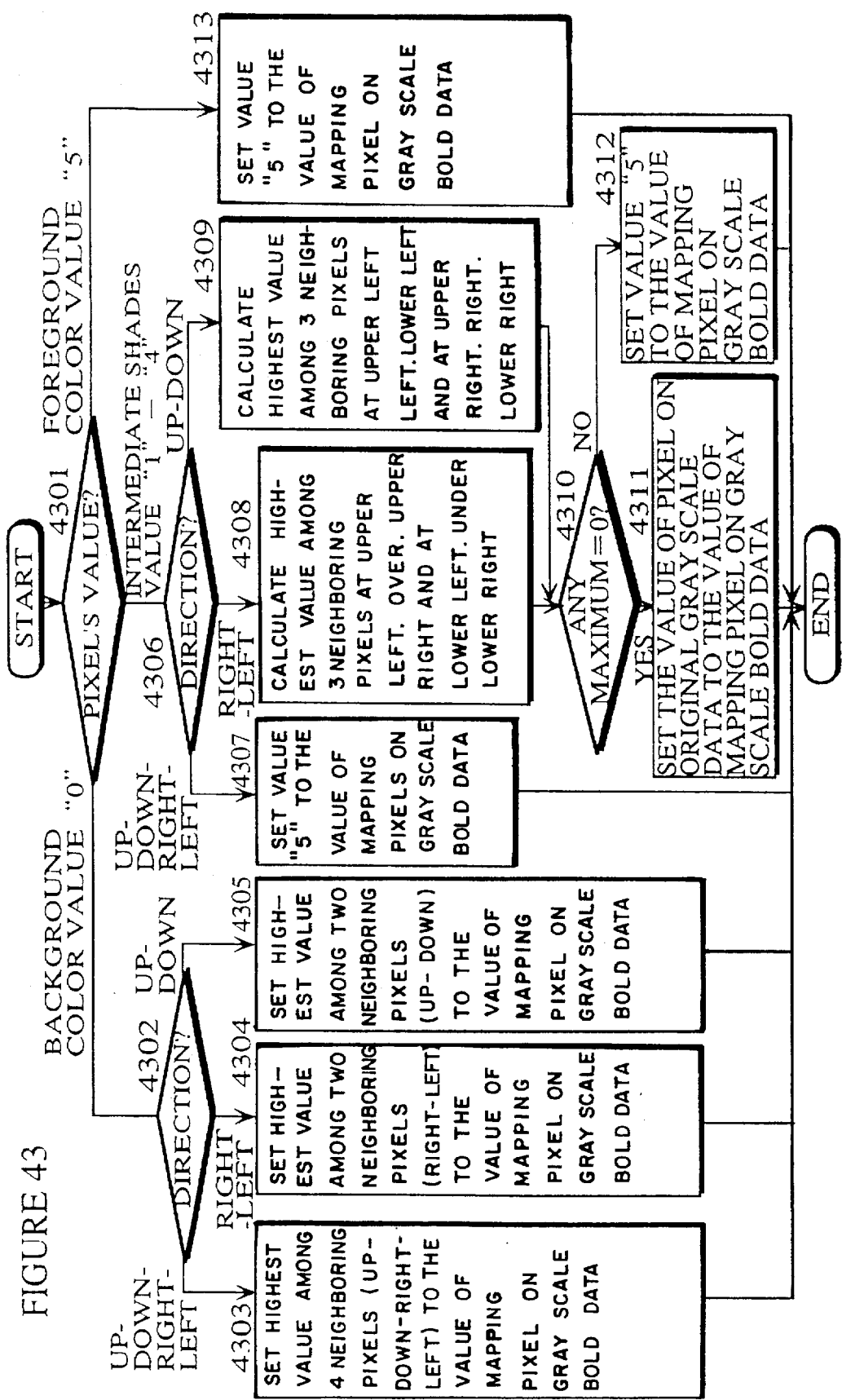
FIG. 43 is a flowchart detailing a procedure for applying the bold process horizontally and vertically, horizontally, or vertically.

The procedure of the above synthesized bold process is detailed by the flowchart in FIG. 43.

In this flowchart, the procedures for applying the bold process to the gray scale data vertically and horizontally, horizontally, and vertically are shown. Also, this flowchart shows how the value of a pixel on the gray scale bold data is determined when generating the same based on the gray scale data.

The value of each pixel on the gray scale bold data is calculated through a process for judging the value of the mapping pixel on the gray scale data (Step 4301) and a process for judging a direction to which the bold process is applied (Steps 4302, 4306).

Tenth Embodiment

In the tenth embodiment, a system for generating the gray scale bold data as intermediate data to further apply the outline process will be explained.

Figure 44:
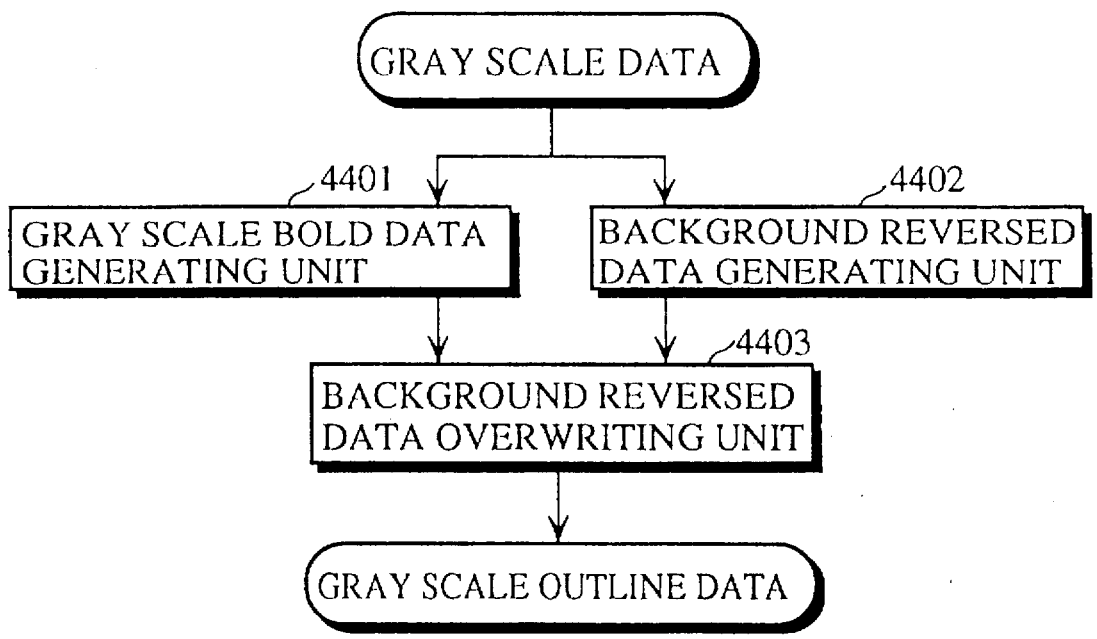
FIG. 44 is a view depicting a structure of a gray scale modified data generating system in accordance with a tenth embodiment of the present invention.

FIG. 44 is a view depicting the structure of the gray scale modified data generating system of the tenth embodiment. In the drawing, numeral 4401 denotes a gray scale bold data generating unit, numeral 4402 denotes a background reversed data generating unit, and numeral 4403 denotes a background reversed data overwriting unit.

Figure 45:
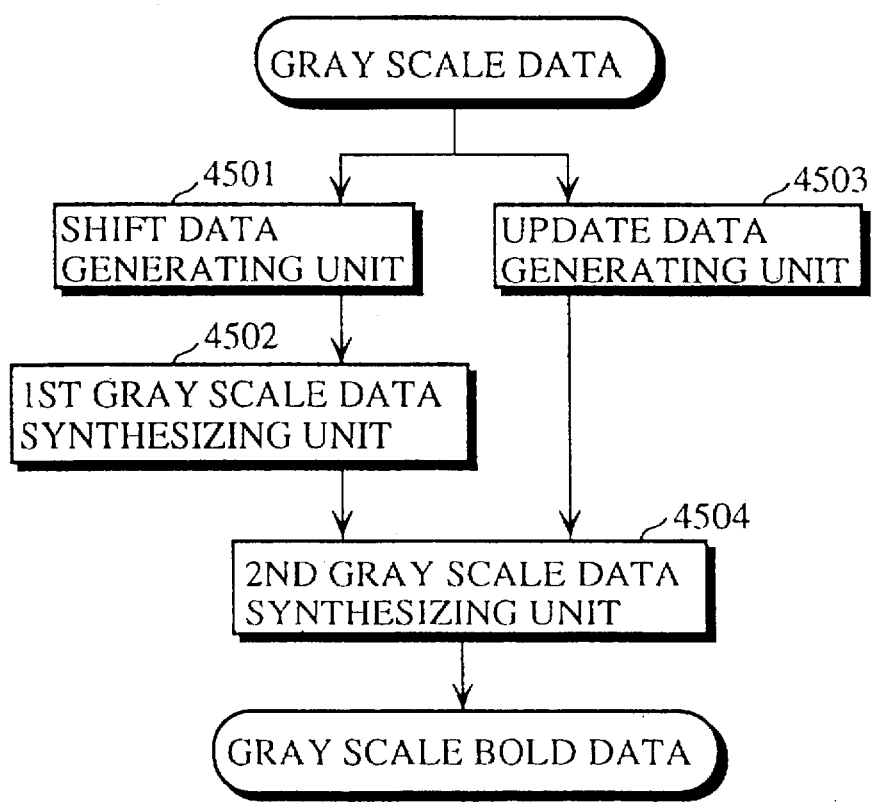
FIG. 45 is a view depicting a structure of a gray scale bold data generating unit 4401 in accordance with the tenth embodiment of the present invention.
Figure 46:
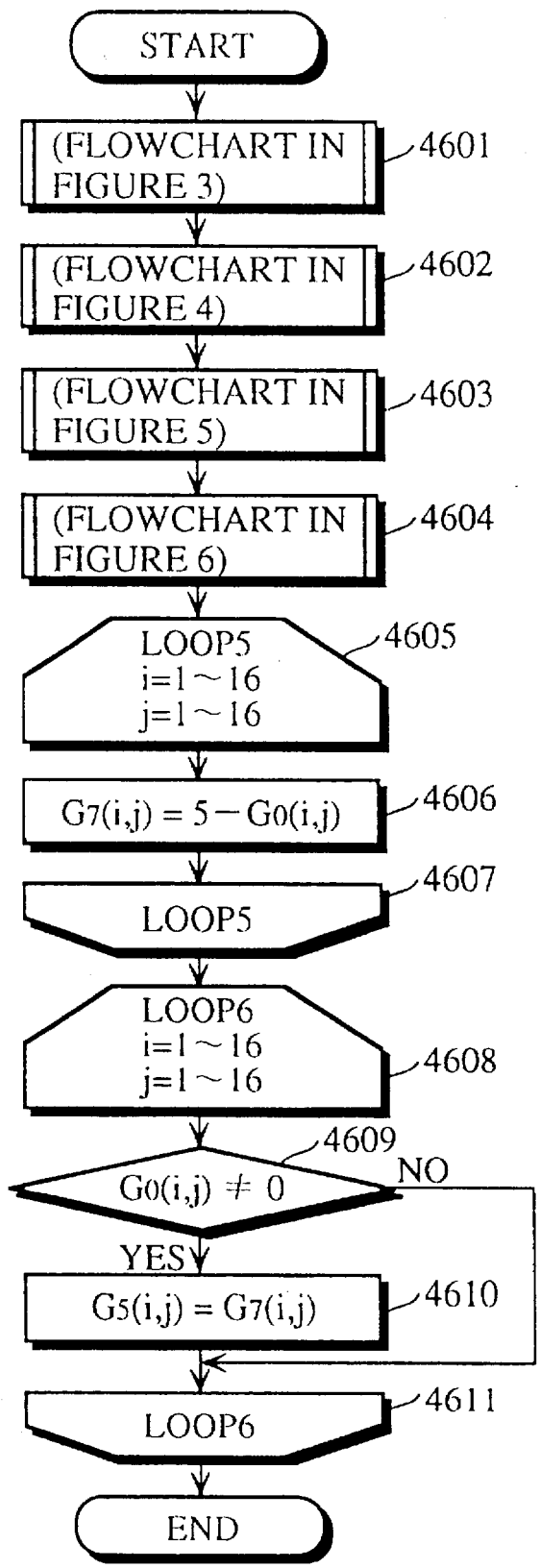
FIG. 46 is a flowchart detailing a procedure of the gray scale modified data generating system of the tenth embodiment.

As is shown in FIG. 45, the gray scale bold data generating unit 4401 includes a shift data generating unit 4501, a first gray scale data synthesizing unit 4502, an update data generating unit 4503, and a second gray scale data synthesizing unit 4504. The entire procedure of this embodiment is detailed by the flowchart in FIG. 46, where G7(i, j) represents the value of the pixel positioned at the i'th row and j'th column on the background reversed data generated by the background reversed data generating unit 4402, and G5(i, j) represents the value of the pixel positioned at the i'th row and j'th column on the resulting gray scale bold data.

The gray scale data to be processed are the ones shown in FIG. 7.

The gray scale bold data generating unit 4401 generates the gray scale bold data based on the gray scale data to be processed. This procedure corresponds to Steps 4601 through 4604. The detailed structure of the gray scale bold data generating unit 4401 shown in FIG. 45 is identical with the structure in FIG. 1 explained in the first embodiment. That is to say, the gray scale bold data generating unit 4401 performs the bold process in the same manner as the gray scale bold data generating system of the first embodiment to generate the gray scale bold data shown in FIG. 12 based on the gray scale shown in FIG. 7.

Figure 47:
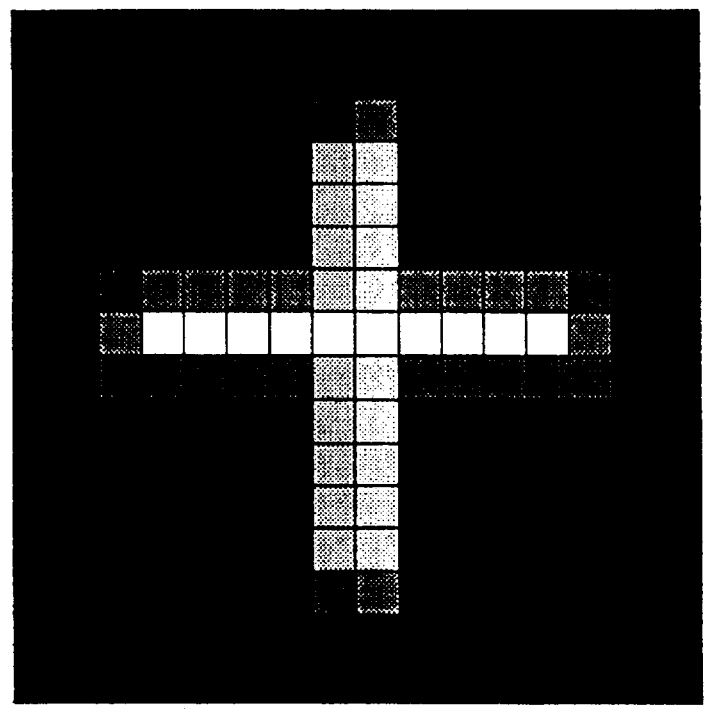
FIG. 47 shows background reversed data generated by a background reversed data generating unit 4402.

The background reversed data generating unit 4402 generates background reversed data by reversing the value of each pixel on the to-be-processed gray scale data. This procedure corresponds to Steps 4605 through 4607. To reverse the value means to rewrites the value "0" into the value "5, and similarly, the value "1" into the value "4", the value "2" into the value "3", the value "3" into the value "2", the value "4" into the value "1", and the value "5" to the value "0". FIG. 47 shows the background reversed data G7(i, j) generated based on the gray scale data shown in FIG. 7 by the background reversed data generating unit 4402.

The background reversed data overwriting unit 4403 overwrites the value of the each pixel of the gray scale bold data with the value of the mapping pixel on the background reversed data on the non-background color area of the to-be-processed gray scale data. This procedure corresponds to Steps 4608 through 4611.

In this embodiment, the pixels on the background reversed data on the non-background color area of the to-be-processed gray scale data in FIG. 7 correspond to the pixels exhibiting any of the values "0" through "4" on the background reversed data shown in FIG. 47. The values of these pixels are overwritten on their respective mapping pixels on the gray scale bold data shown in FIG. 12 to hollow the inside of the gray scale bold data generated by the gray scale bold data generating unit 4401.

Figure 48:
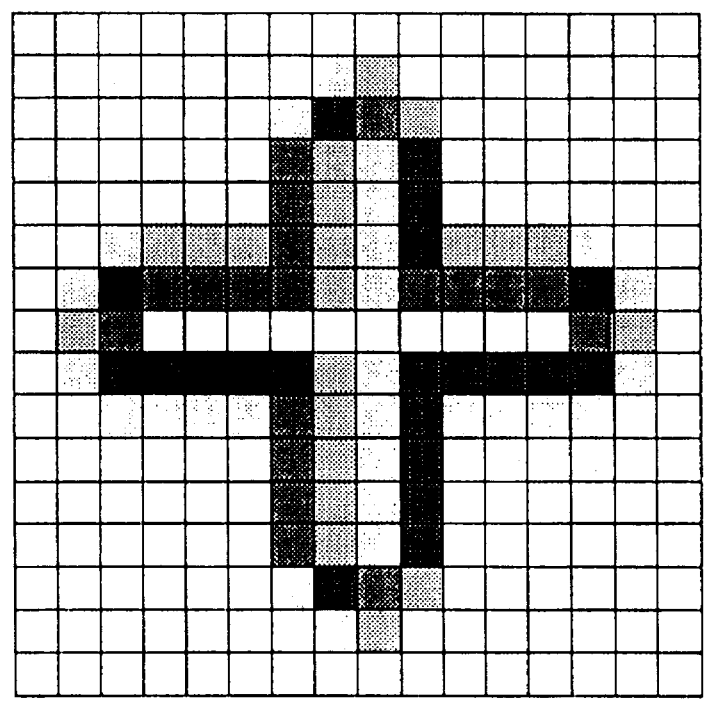
FIG. 48 shows gray scale outline data generated by the gray scale modified data generating system of the tenth embodiment.

FIG. 48 shows the gray scale outline data generated by the background reversed data overwriting unit 4403. The outside boundary of the contour is the gray scale data generated by the gray scale bold data generating unit 4401, while the inside boundary thereof is the background reversed data generated by the background reversed data generating unit 4402.

Figure 49:
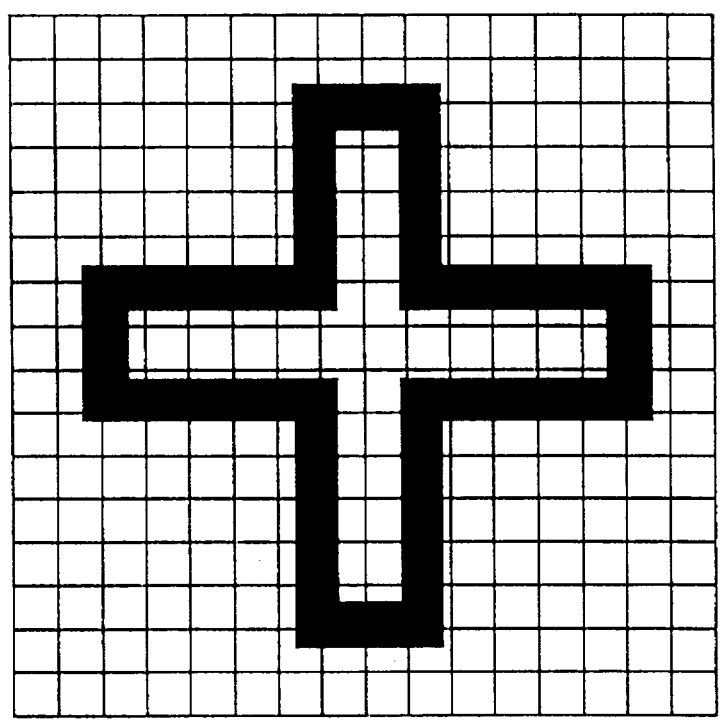
FIG. 49 shows bi-value outline font data, which are the original of the gray scale outline data in FIG. 48.

The resulting data are approximate to the gray scale data representing the bi-value font data of the outline "+", the Chinese character of a number ten in FIG. 49, if they are displayed in the values from "0" to "5". Thus, the gray scale bold data shown in FIG. 48 have high fidelity to the data generated by applying the bold and outline process directly to the bi-value font data shown in FIG. 8.

The gray scale modified data generating system of this embodiment can display well defined gray scale outline data on the gray scale output device.

In addition, since the gray scale modified data generating system of this embodiment includes the gray scale bold data generating unit as a separate component, the gray scale bold data can be generated as the intermediary data.

Eleventh Embodiment

The gray scale modified data generating unit shown in FIG. 45 of the tenth embodiment can additionally include a repetition control unit for controlling the repetitive operation.

The structure of the gray scale modified data generating system of the eleventh embodiment is identical with the gray scale modified data of the tenth embodiment, except that the detailed structure of the gray scale bold data generating unit 4401 is different.

Figure 50:
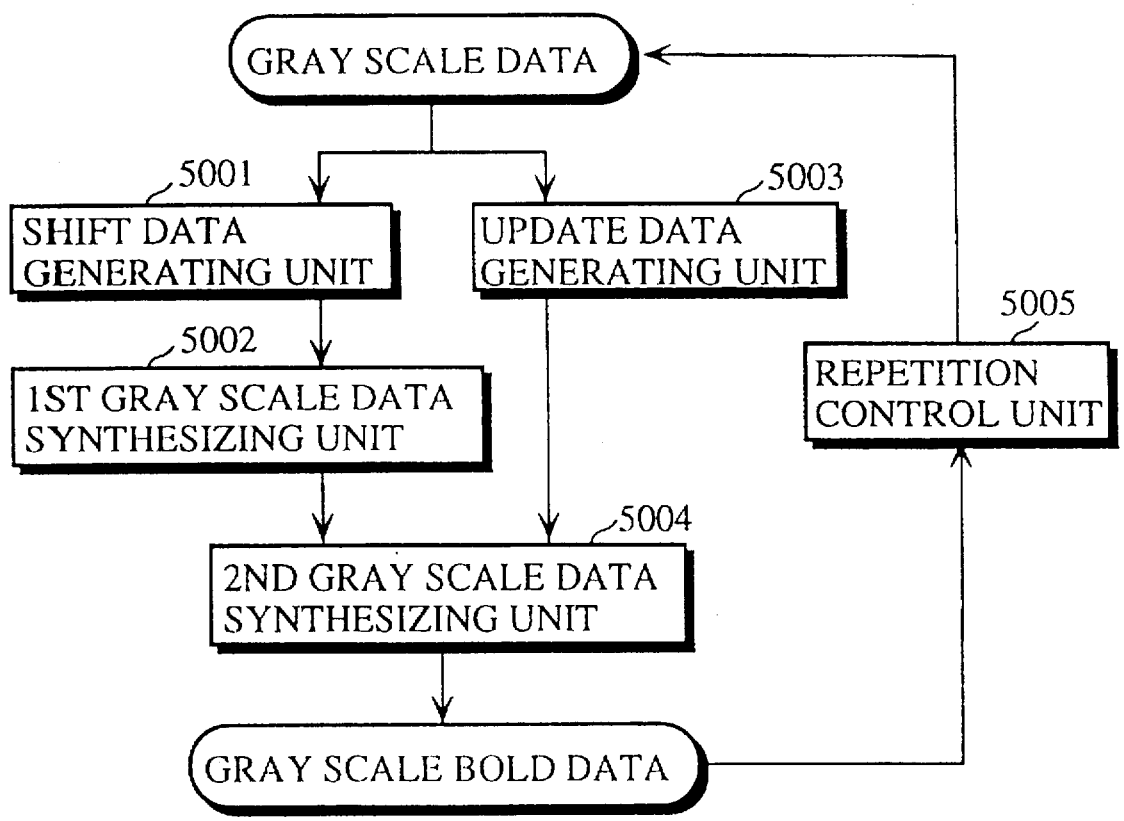
FIG. 50 is a view depicting a structure of a gray scale bold data generating unit 4401 in a gray scale modified data generating system in accordance with an eleventh embodiment of the present invention.
Figure 51:
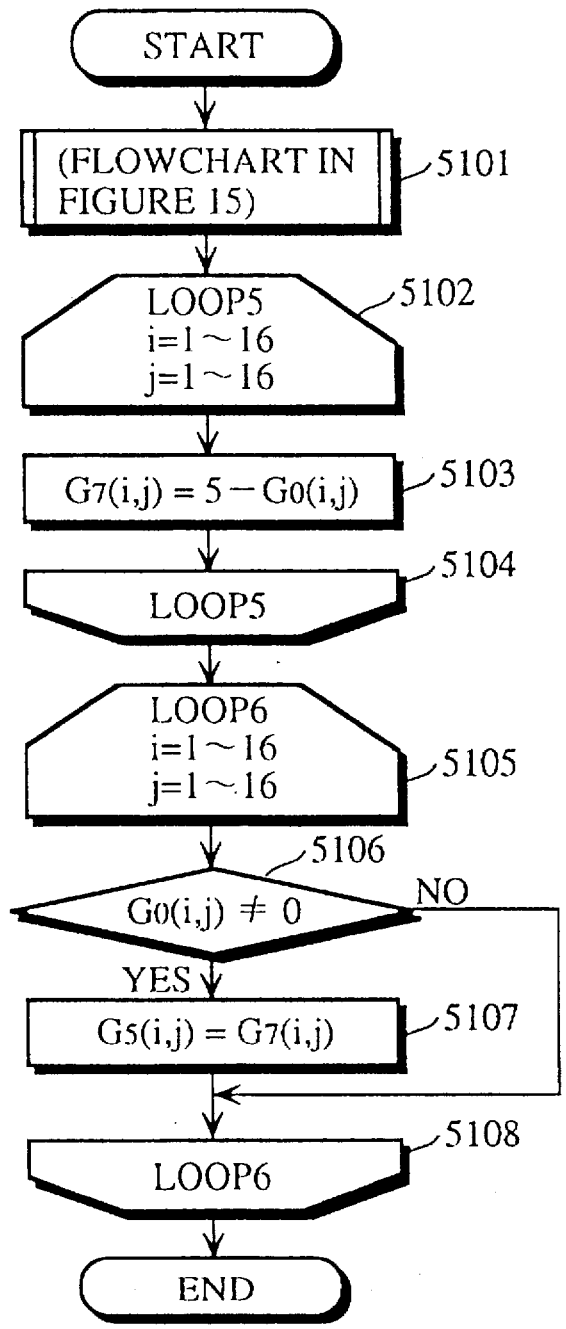
FIG. 51 is a flowchart detailing a procedure of the gray scale modified data generating system of the eleventh embodiment.

FIG. 50 is a view depicting the structure of the gray scale bold data generating unit 4401 of the eleventh embodiment. In the drawing, numeral 5001 denotes a shift data generating unit, numeral 5002 denotes a first gray scale data synthesizing unit, numeral 5003 denotes an update data generating unit, numeral 5004 denotes a second gray scale data synthesizing unit, and numeral 5005 denotes a repetition control unit. The units denoted by numerals 5001 through 5004 are identical with their respective counterparts of the gray scale modified data generating unit 4401 of the tenth embodiment. The entire procedure of the eleventh embodiment is detailed by the flowchart in FIG. 51, where Steps 4601 through 4604 of the tenth embodiment are replaced with Step 5101.

The repetition control unit 5005 repeats the generation of the gray scale bold data by the gray scale modified data generating unit 4401 for a specific number of times to generate data in various thickness.

To be more concrete, a case where the gray scale bold data are generated based on the gray scale data in FIG. 7 by setting the repetition times to two will be explained. In the first cycle, the gray scale bold data shown in FIG. 12 are generated as explained in the tenth embodiment. In the second cycle, the bold data generating process is applied in the same manner as the tenth embodiment to the gray scale bold data in FIG. 12 generated in the first cycle.

Figure 52:
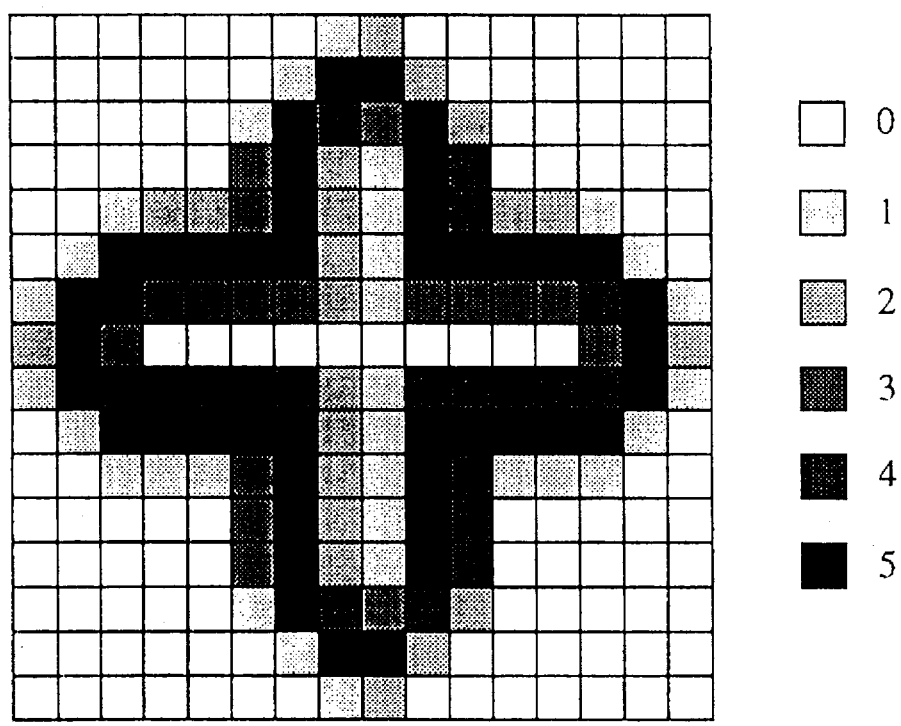
FIG. 52 shows gray scale outline data generated by the gray scale modified data generating system of the eleventh embodiment.

FIG. 52 shows the outline data generated by applying the outline process to the gray scale bold data thus generated in the same manner as the tenth embodiment. The contour thereof is thicker compared with the tenth embodiment. The gray scale outline data having contours in various thickness can be generated by setting an arbitrary number to the repetition times.

Alternately, the vertically and horizontally shifted data may be synthesized in the first cycle to be synthesized with right-shifted data in the second cycle, so that the contour in the right will be more expanded than the others to generate a shadowed outline data.

Twelfth Embodiment

In the twelfth embodiment, a system for generating the modified data at a higher speed by applying the outline process to the gray scale data will be explained.

Figure 53:
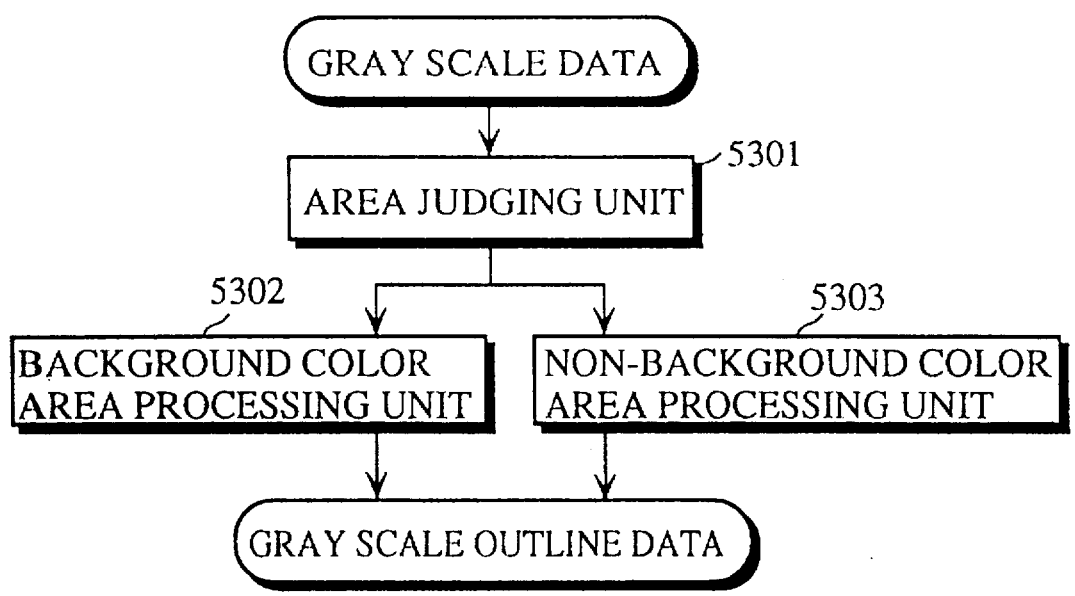
FIG. 53 is a view depicting a structure of a gray scale modified data generating system in accordance with a twelfth embodiment of the present invention.
Figure 54:
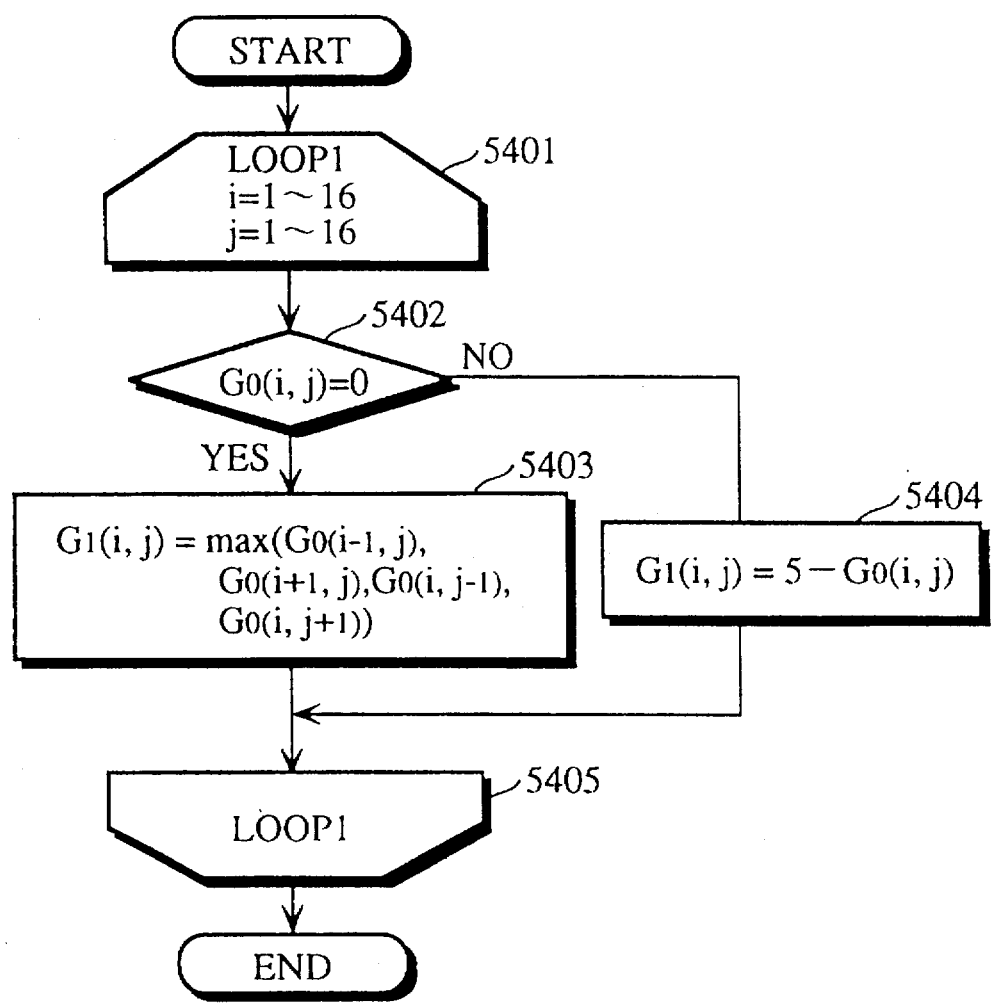
FIG. 54 is a flowchart detailing a procedure of the gray scale modified data generating system of the twelfth embodiment.

FIG. 53 is a view depicting the structure of the gray scale outline data generating system of the twelfth embodiment. In the drawing, numeral 5301 denotes an area judging unit, numeral 5302 denotes a background color area processing unit, and numeral 5303 denotes a non-background color area processing unit. The entire procedure of this embodiment is detailed by the flowchart shown in FIG. 54, where G0(i, j) and G1(i, j) represent the values of the pixel positioned at the i'th row and j'th column on the gray scale data to be processed and the resulting gray scale outline data, respectively.

In this embodiment, a case where the gray scale outline data are generated based on the gray scale data shown in FIG. 7 will be explained while referring to FIG. 19 showing the data with some of the pixels being labeled with references. The area judging unit 5301 judges whether each pixel on the gray scale data has the background color value. This procedure corresponds to Step 5402.

For example, the pixel A in FIG. 19 exhibits the value "0" and thus is judged to have the background color value by the area judging unit 5301. Whereas the pixel F in FIG. 19 exhibits the value "4", and thus is judged not so.

The background color area processing unit 5303 sets the highest value among four vertically and horizontally neighboring pixels to the value of the mapping pixel on the gray scale outline data when a pixel is judged to have the background color value by the area judging unit 5301. This procedure corresponds to Step 5403.

For example, the pixel A in FIG. 19 is judged to have the background color value, and its four neighboring pixels B, C, D, and E exhibit the values of "0", "0", "2" and "3", respectively. Thus, the value "3" is the highest value, which is set to the value of the mapping pixel of the pixel A on the gray scale outline data.

The non-background color area processing unit 5303 sets the reversed value of a pixel to the value of its mapping pixel on the gray scale outline data when the pixel is judged not to have the background color value by the area judging unit 5301. This procedure corresponds to Step 5404.

For example, the pixel F in FIG. 19 exhibits the value "4", and is judged not to have the background color value. Thus, the value of the mapping pixel on the gray scale outline data shown in FIG. 55 is to set to the value "1", which is calculated by reversing the original value "4".

Figure 55:
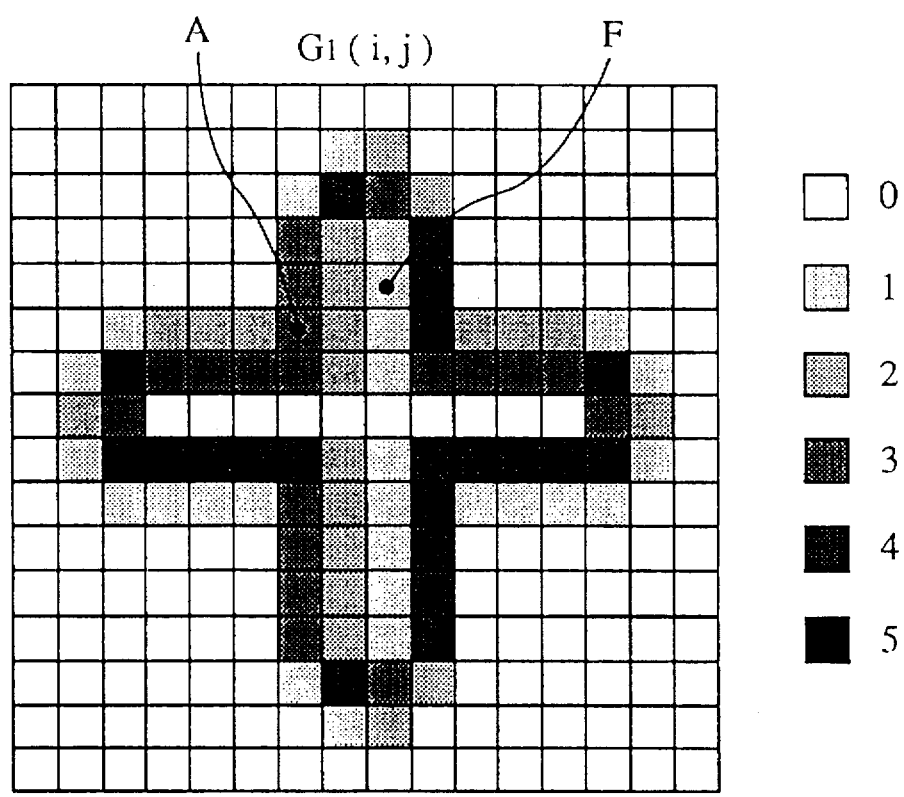
FIG. 55 shows gray scale outline data generated by the gray scale modified data generating system of the twelfth embodiment.
Figure 56:
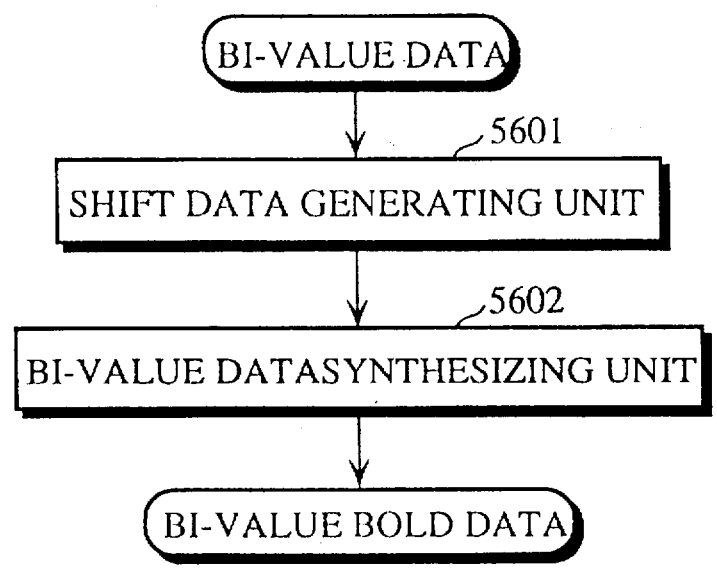
FIG. 56 is a view depicting a structure of a conventional bi-value modified data generating system for performing the bold process.
Figure 57:
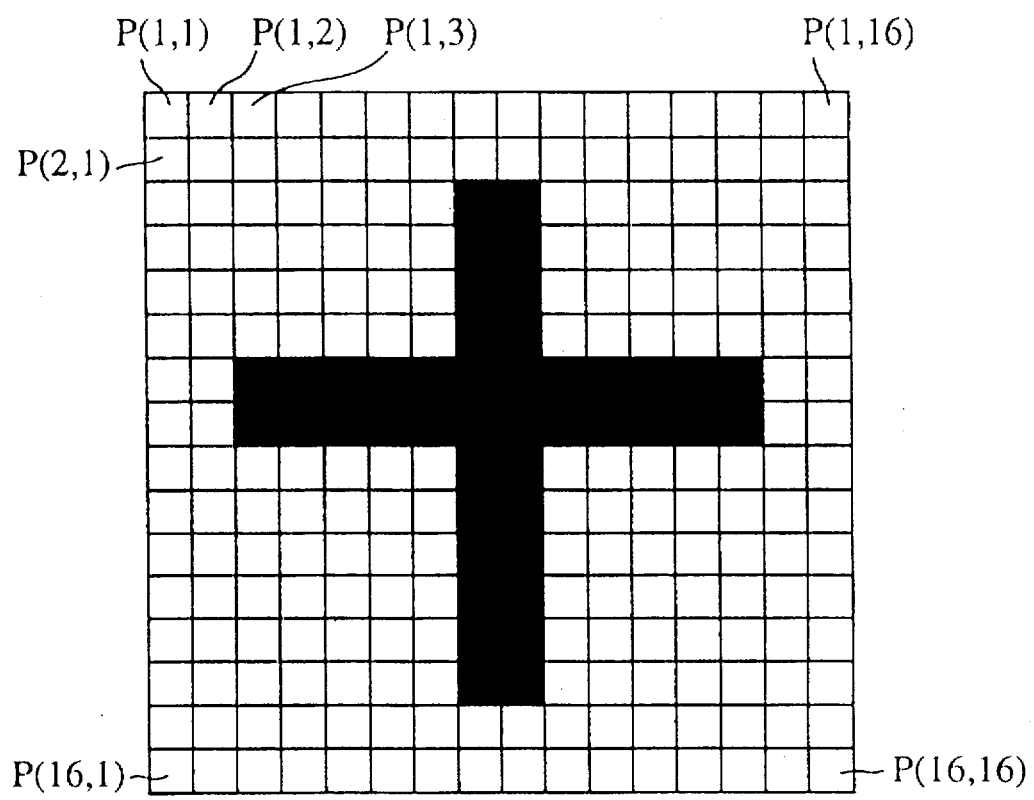
FIG. 57 shows an example of the bi-value data to be processed (font data of "+", the Chinese character for a number ten)
Figure 58A:
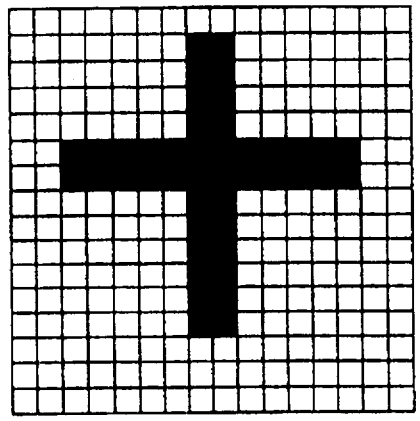
FIGS. 58 (a) through (d) show four kinds of shift data generated by a shift data generating unit 5601.
Figure 58B:
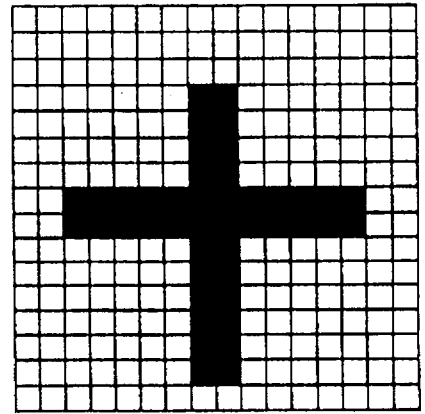
Figure 58C:
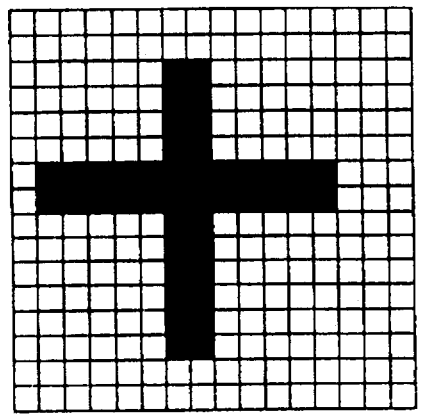
Figure 58D:
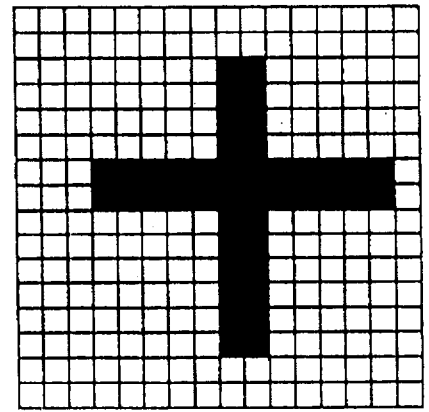
Figure 59:
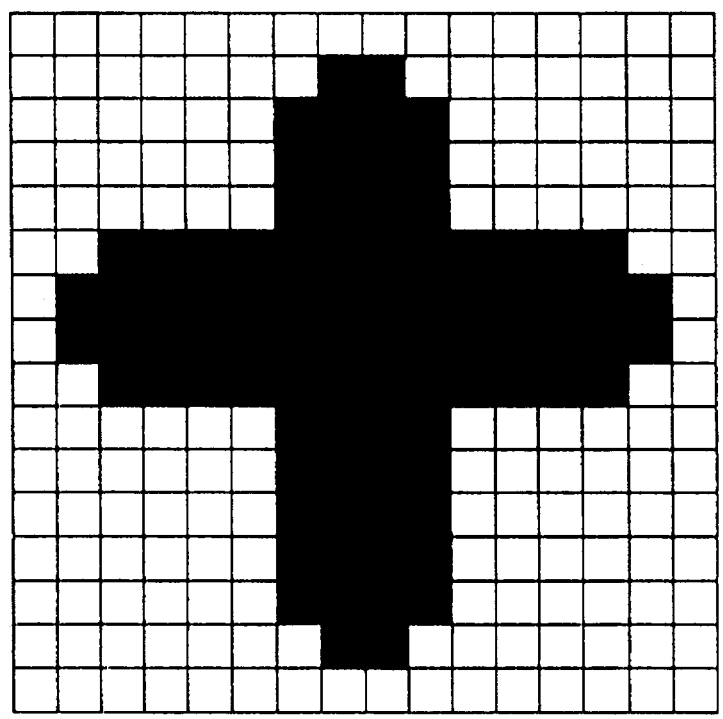
FIG. 59 shows bi-value bold data generated by the conventional bi-value modified data generating system for performing the bold process.
Figure 60:
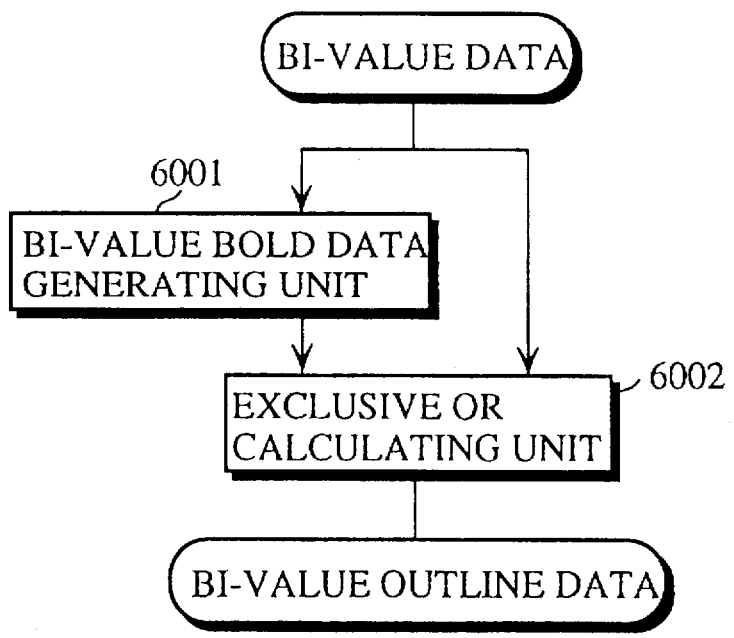
FIG. 60 is a view depicting a structure of a conventional bi-value modified data generating system for performing the outline process.
Figure 61:
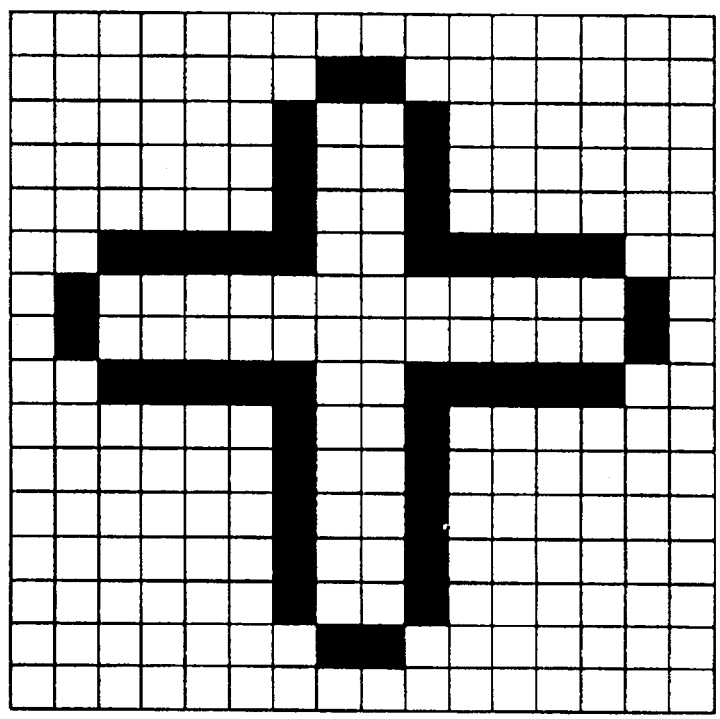
FIG. 61 shows bi-value outline data generated by the conventional bi-value modified data generating system for performing the outline process.

The gray scale outline data G1(i, j) as shown in FIG. 55 are generated by applying the above procedures to all the pixels shown in FIG. 19. The pixels A and F in FIG. 19 exhibit the values "0" and "4", respectively, while their respective mapping pixels on the gray scale outline data shown in FIG. 55 exhibit the values "3" and "1", respectively.

The gray scale outline data generated in this embodiment are identical with those generated in the tenth embodiment; however, the gray scale modified data generating system of the twelfth embodiment operates faster than the gray scale modified data generating system of the tenth embodiment. This is because the former carries out the shift-synthesize process and update-overwrite process in the tenth embodiment at the same time.

The gray scale modified data generating system of the present invention was explained in accordance with the above embodiments; however, it is needless to say that the present invention is not limited to these embodiments. That is to say:

(1) The first through fourth embodiments disclose the systems for performing the 4-direction (vertical and horizontal) bold process, but the direction is not limited to the above four directions. For example, the system may apply the bold process in eight directions: upper right, lower right, upper left, and lower left in addition to the vertical (up and down) and horizontal (right and left) directions. The resulting gray scale bold data will have higher fidelity to the original gray scale data compared with the gray scale bold data processed in the four directions.

(2) In the first embodiment, although the first gray scale data synthesizing unit 102 and second gray scale data synthesizing unit 104 are furnished, these two synthesizing units may be replaced with a single gray scale synthesizing unit. In such a case, the replaced gray scale synthesizing unit synthesizes four kinds of shift data generated by the shift data generating unit 101 and the update data generated by the update data generating unit 103. That is to say, the replaced gray scale synthesizing unit sets the highest value of the mapping pixel among five kinds of gray scale data to the value of the mapping pixel on the gray scale bold data. The gray scale bold data generated as a result of this procedure are identical with the resulting gray scale bold data in the first embodiment. This method can reduce the processing time compared with the first embodiment; for the synthesizing process carried out twice in the first embodiment while it is carried out once in this method.

(3) The fifth through eighth embodiments disclose the systems for performing the horizontal bold process, and it is easily understood that a system for performing the vertical bold process is constructed in the same manner and operates likely.

(4) In the tenth embodiment, the gray scale bold data generating unit 4401 is of the same structure as the gray scale modified data generating system of the first embodiment. However, the structure of the gray scale bold data generating unit 4401 is not limited to the disclosure. For example, the gray scale bold data generating unit 4401 may have the same structure as the gray scale modified data generating system in any of the second through eighth embodiments. As a result, the gray scale outline data can be generated by applying the outline process to various kinds of gray scale bold data.

As has been explained, the present invention enables the application of the bold process and outline process to the gray scale data, which was never realized. By displaying the gray scale data on a gray scale output device such as a color display, the font data or image data can be displayed as if they were displayed in smaller pixels than in those of the actual size compared with the bi-value data. Consequently, the font data or image data thus generated maintain high fidelity to the original shape: the contour thereof is smooth and the shape is well balanced and hence well defined. Thus, the use of the gray scale modified data makes it possible to generate visually appealing sentences, and brings innumerable benefits.

What is claimed is:

1. A system for generating modified image data composed of destination pixels corresponding to source pixels in gray scale image data by applying a process adding effects to said gray scale image data, said system comprising:

color judging means for judging whether each source pixel has a background color or a non-background color;

assigning means for assigning a color level to each source pixel;

first processing means for setting, when said source pixel is judged to have the background color, a color level to a destination pixel in a corresponding position, said color level being calculated based on the color level of a plurality of pixels adjacent to said source pixel; and second processing means for setting, when said source pixel is judged to have a non-background color, a color level calculated by a predetermined process to the destination pixel in a corresponding position.

2. The system of claim 1, wherein said process adding effects is a bold process to expand images in said gray scale image data vertically and horizontally;

said first processing means sets, when said source pixel is judged by said color judging means to have the background color, a highest neighboring color level among color levels of four pixels adjacent to said source pixel vertically and horizontally, respectively, to the destination pixel; and said second processing means sets, when said source pixel is judged by said color judging means to have a non-background color, a foreground color level to the destination pixel.

3. The system of claim 2 further comprising repetition control means for controlling said first processing means and said second processing means to repeat an operation for a specific number of times using the modified image data from a preceding operation as the source pixels for the subsequent operation.

4. The system of claim 1, wherein:

said process adding effects is a bold process to expand images in said gray scale image data horizontally;

said first processing means sets a color level of a destination pixel in said modified image data at a higher neighboring color level out of levels of two pixels adjacent to a source pixel on its right and left, when said source pixel is judged to have the background color by said color judging means, and wherein said second processing means includes:

a first judging unit for further judging whether a source pixel has an intermediate color level or a foreground color level when said source pixel is judged to have non-background color by said color judging means;

a second judging unit for judging whether at least one of a highest upper neighboring color level out of levels of three adjacent pixels over and diagonally upper right and upper left of said source pixel and a highest lower neighboring color level of three adjacent pixels under and diagonally lower right and lower left of said source pixel has the background color level when said source pixel is judged to have an intermediate color level by said first judging unit; and a level setting unit for setting a color level of a destination pixel in said modified image data to equal a color level of said source pixel, if it is a case that said source pixel is judged to have the intermediate color level by said first judging unit and at least one of its highest upper and lower neighboring color levels is judged by the second judging unit to be the background color level, and, if it is not the case, for setting a color level of a destination pixel in a corresponding position in said modified data to equal the foreground color level when said source pixel has a non-background color level.

5. The system of claim 4 further comprising repetition control means for controlling said first processing means and said second processing means to repeat an operation for a specific number of times using the modified image data from a preceding operation as the source pixels for the subsequent operation.

6. The system of claim 1, wherein:

said process adding effects is a bold process to expand images in said gray scale image data vertically; said first processing means sets a color level of a destination pixel in said modified image data at a higher neighboring color level out of levels of two pixels adjacent to a source pixel above and below, when said source pixel is judged to have the background color by said color judging means, and wherein said second processing means includes:

a first judging unit for further judging whether a source pixel has an intermediate color level or a foreground color level when said source pixel is judged to have a non-background color by said color judging means;

a second judging unit for judging whether at least one of a highest left neighboring color level out of levels of three adjacent pixels left and diagonally upper left and lower left of said source pixel and a highest right neighboring color level of three adjacent pixels right and diagonally upper right and lower right of said source pixel has the background color level when said source pixel is judged to have an intermediate color level by said first judging unit; and a level setting unit for setting a color level of a destination pixel in said modified image data to equal a color level of said source pixel, if it is a case that said source pixel is judged to have the intermediate color level by said first judging unit and at least one of its highest right and left neighboring color levels is judged by the second judging unit to be the background color level, and, if it is not the case, for setting a color level of a destination pixel in a corresponding position in said modified data to equal the foreground color level when said source pixel has a non-background color level.

7. The system of claim 6 further comprising repetition control means for controlling said first processing means and said second processing means to repeat an operation for a specific number of times using the modified image data from a preceding operation as the source pixels for the subsequent operation.

8. The system of claim 1, wherein:

said process adding effects is an outline process applied to said gray scale image data;

said first processing means sets, when said source pixel is judged by said color judging means to have the background color, a highest neighboring color level among levels of four pixels adjacent to said source pixel vertically and horizontally, respectively, to the color level to the destination pixel in said modified image data; and said second processing means sets, when said source pixel is judged by said color judging means to have a non-background color, a color level of reverse video of said source pixel to the color level of the destination pixel in said modified image data.

9. A method for generating modified image data composed of destination pixels corresponding to source pixels in gray scale image data by applying a process adding effects to gray scale image data, comprising the steps of:

color judging step for judging whether each source pixel has a background color or a non-background color;

assigning step for assigning a color level to each source pixel;

first processing step for setting, when said source pixel is judged to have the background color, a color level to the destination pixel in a corresponding position, said color level being calculated based on a color level of a plurality of pixels adjacent to said source pixel; and second processing step for setting, when said source pixel is judged to have a non-background color, a color level calculated by a predetermined process to the destination pixel in a corresponding position.

10. The method of claim 9, wherein said process adding effects is a bold process to expand images in said gray scale image data vertically and horizontally;

said first processing step sets, when said source pixel is judged by said color judging step to have the background color, a highest neighboring color level among color levels of four pixels adjacent to said source pixel vertically and horizontally, respectively, to the destination pixel; and said second processing step sets, when said source pixel is judged by said color judging step to have a non-background color, a foreground color level to the destination pixel.

11. The method of claim 9, wherein:

said process adding effects is a bold process to expand images in said gray scale image data horizontally;

said first processing step sets a color level of a destination pixel in said modified image data at a higher neighboring color level out of levels of two pixels adjacent to a source pixel on its right and left, when said source pixel is judged to have the background color by said color judging step, and wherein said second processing step includes:

a first judging step for further judging whether a source pixel has an intermediate color level or a foreground color level when said source pixel is judged to have a non-background color by said color judging step;

a second judging step for judging whether at least one of a highest upper neighboring color level of three adjacent pixels over and diagonally upper right and upper left of said source pixel and a highest lower neighboring color level of three adjacent pixels under and diagonally lower right and lower left of said source pixel has the background color level when said source pixel is judged to have an intermediate color level by said first judging step; and a level setting step for setting a color level of a destination pixel in said modified image data to equal a color level of said source pixel, if it is a case that said source pixel is judged to have the intermediate color level by said first judging step and at least one of its highest upper and lower neighboring color levels is judged by the second judging step to be the background color level, and, if it is not the case, for setting a color level of a destination pixel in a corresponding position in said modified data to equal the foreground color level when said source pixel has a non-background color level.

12. The method of claim 9, wherein:

said process adding effects is a bold process to expand images in said gray scale image data vertically;

said first processing step sets a color level of a destination pixel in said modified image data at a higher level neighboring color level of two pixels adjacent to a source pixel above and below, when said source pixel is judged to have the background color by said color judging step, and wherein said second processing step includes:

a first judging step for further judging whether a source pixel has an intermediate color level or a foreground color level when said source pixel is judged to have a non-background color by said color judging step;

a second judging step for judging whether at least one of a highest left neighboring color level out of color levels of three adjacent pixels left and diagonally upper left and lower left of said source pixel and a highest right neighboring color level of three adjacent pixels right and diagonally upper right and lower right of said source pixel has the background color level when said source pixel is judged to have an intermediate color level by said first judging step; and a level setting step for setting a color level of a destination pixel in said modified image data to equal a color level of said source pixel, if it is a case that said source pixel is judged to have the intermediate color level by said first judging step and at least one of its highest left and right neighboring color levels is judged by the second judging step to be the background color level, and, if it is not the case, for setting a color level of a destination pixel in a corresponding position in said modified data to equal the foreground color level when said source pixel a non-background color level.

13. The method of claim 9, wherein:

said process adding effects is an outline process applied to said gray scale image data;

said first processing step sets, when said source pixel is judged by said color judging step to have the background color, a highest neighboring color level among four pixels adjacent to said source pixel vertically and horizontally, respectively, to the color level to the destination pixel in said modified image data; and said second processing step sets, when said source pixel is judged by said color judging step to have a non-background color level, a color level of reverse video of said source pixel to the color level of the destination pixel in said modified image data.

14. A system for generating modified image data composed of destination pixels corresponding to source pixels in gray scale image data by applying a process adding effects to said gray scale image data, said system comprising:

assigning means for assigning a color level to each source pixel;

generating means for generating a plurality of pieces of shifted data by shifting each source pixel in said gray scale image data in a plurality of predetermined directions by one pixel;

first synthesizing means for generating synthesized gray scale data by setting as a color level of a corresponding pixel in said synthesized gray scale data a highest color level among color levels of the shifted pixels in a corresponding position in said plurality of pieces of shifted data generated by said generating means;

updated data generating means for generating updated data by applying a given process to each source pixel having a non-background color level of said gray scale image data; and second synthesizing means for synthesizing a color level of a pixel in said updated data and a color level of a pixel in a corresponding position in said synthesized gray scale data.

15. The system of claim 14, wherein:

said process adding effects is a bold process to expand images in said gray scale image data vertically and horizontally;

said generating means generates four pieces of shifted data by shifting each source pixel in four directions by one pixel, said four directions being up, down, right and left;

said updated data generating means generates said updated data by updating the color level of each source pixel of said gray scale image data having a non-background color level to a foreground color level; and said second synthesizing means overwrites the color level of each source pixel having a non-background color level in said updated data with a color level of a pixel in a corresponding position in said synthesized gray scale data generated by the first synthesizing means.

16. The system of claim 15 further comprising repetition control means for controlling said generating means, said first synthesizing means, said updated data generating means, and said second synthesizing means to repeat an operation for a specific number of times using the modified image data from a preceding operation as the source pixels for the subsequent operation.

17. The system of claim 14, wherein:

said process adding effects is a bold process to expand images in said gray scale image data horizontally; and said generating means generates two pieces of shifted data by shifting said gray scale image data in a right and a left direction by one pixel, and wherein said updated data generating means includes:

a first judging unit for judging whether each source pixel in said gray scale image data has a background color level, an intermediate color level, or the foreground color level;

a second judging unit for judging whether at least one of a highest upper neighboring color level of three adjacent pixels above and diagonally to upper right and upper left of a source pixel and a highest lower neighboring color level of three adjacent pixels under and diagonally to lower right and lower left of said source pixel having a non-background color level is the background color level, when said source pixel is judged to have an intermediate color level by said first judging unit; and a level setting unit for setting a color level of a pixel in a corresponding position in said updated data to equal a color level of said source pixel, if it is a case that said source pixel is judged to have an intermediate color level by said first judging unit and at least one of its highest upper neighboring and lower neighboring color levels is judged by the second judging unit to be the background color level, and, if it is not the case, for setting a color level of a pixel in a corresponding position in said updated data to equal the foreground color level when said source pixel has a non-background color level; and said second synthesizing means overwrites a color level of each pixel of said updated data having a non-background color level over a color level of a corresponding pixel in said synthesized gray scale data generated by said first synthesizing means.

18. The system of claim 17, further comprising repetition control means for controlling said generating means, said first synthesizing means, said updated data generating means, and said second synthesizing means to repeat an operation for a specific number of times using the modified image data from a preceding operation as the source pixels for the subsequent operation.

19. The System of claim 14, wherein:

said process adding effects is a bold process to expand images in said gray scale image data vertically; and said generating means generates two pieces of shifted data by shifting said gray scale image data in an up and a down direction by one pixel, and wherein said updated data generating means includes:

a first judging unit for judging whether each source pixel in said gray scale image data has a background color level, an intermediate color level, or the foreground color level;

a second judging unit for judging whether at least one of a highest level upper neighboring color of three adjacent pixels left and diagonally to upper left and lower left of a source pixel and a highest lower neighboring color level of three adjacent pixels right and diagonally to upper right and lower right of said source pixel having a non-background color level is the background color level, when said source pixel is judged to have an intermediate color level by said first judging unit;

a level setting unit for setting a color level of a pixel in a corresponding position in said updated data to equal a color level of said source pixel, if it is a case that said source pixel is judged to have an intermediate color level by said first judging unit and at least one of its highest upper neighboring and lower neighboring color levels is judged by the second judging unit to be the background color level, and, if it is not the case, for setting a color level of a pixel in a corresponding position in said updated data to equal the foreground color level when said source pixel has a non-background color level; and said second synthesizing means overwrites a color level of each pixel of said updated data having a non-background color level over a color level of a corresponding pixel in said synthesized gray scale data generated by said first synthesizing means.

20. The system of claim 19 further comprising repetition control means for controlling said generating means, said first synthesizing means, said updated data generating means, and said second synthesizing means to repeat an operation for a specific number of times using the modified image data from a preceding operation as the source pixels for the subsequent operation.

21. The system of claim 14, wherein:

said process adding effects is an outline process;

said generating means generates four pieces of shifted data by shifting said gray scale image data in four directions by one pixel, said four directions being up, down, right and left;

said updated data generating means sets a color level of a corresponding pixel in said updated data to equal a color level of reverse video of each pixel of said gray scale image data having a non-background color level; and said second synthesizing means overwrites a color level of each pixel of said updated data having a non-background color level over a color level of a corresponding pixel in said synthesized gray scale data generated by said first synthesizing means.

22. A system for generating modified image data composed of destination pixels corresponding to source pixels in gray scale image data by adding a bold process to images in said gray scale image, comprising:

assigning means for assigning a color level to each source pixel;

generating means for generating four pieces of shifted data by shifting said gray scale image data in four directions by one pixel, said four directions being up, down, right and left;

updated data generating means for generating updated data by updating a color level of each pixel in a non-background color area of said gray scale image data to a foreground color level; and gray scale data synthesizing means for setting a highest color level among color levels of pixels in said four pieces of shifted data and said updated data to a level of a destination pixel in a corresponding position in said modified image data.

23. The system of claim 22 further comprising repetition control means for controlling said generating means, said updated data generating means, and said gray scale data synthesizing means to repeat an operation for a specific number of times using the modified image data from a preceding operation as the source pixels for the subsequent operation.

24. A system for generating modified outline image data composed of destination pixels corresponding to source pixels in gray scale image data based on said gray scale image data, comprising:

assigning means for assigning a color level to each source pixel;

gray scale bold image data generating means for generating gray scale bold image data based on said gray scale image data;

background reverse video data generating means for generating background reverse video data by reversing a color level of each source pixel in said gray scale image data; and background reverse video data overwriting means for overwriting a color level of each pixel of said background reverse video data having a non-background color level of said gray scale image data over a color level of each pixel in a corresponding position in said gray scale bold image data.

25. The system of claim 24, wherein said gray scale bold image data generating means includes:

a generating unit for generating a plurality of pieces of shifted data by shifting said gray scale image data in a plurality of predetermined directions, such as vertically and horizontally, by one pixel;

a first synthesizing unit for generating synthesized gray scale data by using a method to validate data exhibiting a highest color level among all of pixels in a corresponding position in said plurality of pieces of shifted data shifted by said generating means;

an updated data generating unit for generating bi-level data by changing color levels of pixels of said gray scale image data having a non-background color level to a foreground color level;

and a second synthesizing unit for generating gray scale bold image data by overwriting only color levels of pixels having a foreground color level in the bi-level data generated by said updated data generating means over color levels of corresponding pixels in said synthesized gray scale data synthesized by said first synthesizing means.

26. The system of claim 25, wherein said gray scale bold image data generating means further includes repetition control means for controlling said gray scale bold image data generating means to repeat generation of said gray scale bold image data for a specific number of times to produce image data of images of various degrees of boldness.

27. A method for generating modified image data composed of destination pixels corresponding to source pixels in gray scale image data by applying a process adding effects based on said gray scale image data, comprising the steps of:

assigning step for assigning a color level to each source pixel;

generating step for generating a plurality of pieces of shifted data by shifting each source pixel in said gray scale image data in a plurality of predetermined directions, such as vertically and horizontally, by one pixel;

first synthesizing step for generating synthesized gray scale data by setting as a color level of a corresponding pixel in said synthesized gray scale data a highest color level among color levels of pixels in a corresponding position in said plurality of pieces of shifted data generated by said generating step;

updated data generating step for generating updated data by applying a given process to each source pixel of said gray scale image data having a non-background color level; and second synthesizing step for synthesizing a color level of a pixel in said updated data and a color level of a pixel in a corresponding position in said synthesized gray scale data.

28. The method of claim 27, wherein said process adding effects is a bold process to expand images in said gray scale image data vertically and horizontally;

said generating step generates four pieces of shifted data by shifting said source pixel in four directions by one pixel, said four directions being up, down, right and left;

said updated data generating step generates said updated data by updating the color level of each source pixel of said gray scale image data having a non-background color level to a foreground color level; and said second synthesizing step overwrites the color level of each source pixel having a non-background color level in said updated data with a color level of a pixel in a corresponding position in said synthesized gray scale data generated by the first synthesizing step.

29. The method of claim 27, wherein said process adding effects is a bold process to expand images in said gray scale image data horizontally; and said generating step generates two pieces of shifted data by shifting said gray scale image data in a right and a left direction by one pixel, and wherein said updated data generating step includes:

a first judging step for judging whether each source pixel in said gray scale image data has a background color level, an intermediate color level, or a foreground color level;

a second judging step for judging whether at least one of a highest upper neighboring color level of three adjacent pixels above and diagonally to upper right and upper left of a source pixel and a highest lower neighboring color level of three adjacent pixels under and diagonally to lower right and lower left of said source pixel having a non-background color level is the background color level, when said source pixel is judged to have an intermediate color level by said first judging step;

a level setting step for setting a color level of a pixel in a corresponding position in said updated data to equal a color level of said source pixel, if it is a case that said source pixel is judged to have an intermediate color level by said first judging step and at least one of its highest upper neighboring and lower neighboring color levels is judged by the second judging step to be the background color level, and, if it is not the case, for setting a color level of a pixel in a corresponding position in said updated data to equal the foreground color level when said source pixel has a non-background color level;

said second synthesizing step overwrites a color level of each pixel of said updated data having a non-background color level over a color level of a corresponding pixel in said synthesized gray scale data generated by said first synthesizing step.

30. The method of claim 27, wherein:

said process adding effects is a bold process to expand images in said gray scale image data vertically; and said generating step generates two pieces of shifted data by shifting said gray scale image data in an up and a down direction by one pixel, and wherein said updated data generating step includes:

a first judging step for judging whether each source pixel in said gray scale image data has a background color level, an intermediate color level, or a foreground color level;

a second judging step for judging whether at least one of a highest left neighboring color level of three adjacent pixels left and diagonally to upper left and lower left of a source pixel and a highest right neighboring color level of three adjacent pixels right and diagonally to upper right and lower right of said source pixel having a non-background color level is the background color level, when said source pixel is judged to have an intermediate color level by said first judging step;

a level setting step for setting a color level of a pixel in a corresponding position in said updated data to equal a color level of said source pixel, if it is a case that said source pixel is judged to have an intermediate color level by said first judging step and at least one of its highest right and left neighboring color levels is judged by the second judging step to be the background color level, and, if it is not the case, for setting a color level of a pixel in a corresponding position in said updated data to equal the foreground color level when said source pixel has a non-background color level; and said second synthesizing step overwrites a color level of each pixel of said updated data having a non-background color level over a color level of a corresponding pixel in said synthesized gray scale data generated by said first synthesizing step.

31. The method of claim 27, wherein:

said process adding effects is an outline process;

said generating step generates four pieces of shifted data by shifting said gray scale image data in four directions by one pixel, said four directions being up, down, right and left;

said updated data generating step sets a color level of a corresponding pixel in said updated data to equal a color level of reverse video of each pixel of said gray scale image data having a non-background color level; and said second synthesizing step overwrites a color level of each pixel of said updated data having a non-background color level over a color level of a corresponding pixel in said synthesized gray scale data generated by said first synthesizing step.

32. A method for generating modified image data by applying a bold process to gray scale image data vertically and horizontally, comprising the steps of:

assigning step for assigning a color level to each pixel of the gray scale image data;

generating step for generating four pieces of shifted data by shifting said gray scale image data in four directions by one pixel, said four directions being up, down, right and left;

updated data generating step for generating updated data by updating a color level of each pixel of said gray scale image data having a non-background color level to a foreground color level; and gray scale data synthesizing step for setting a highest color level among color levels of pixels in said four pieces of shifted data and said updated data to a color level of a destination pixel in a corresponding position in said modified image data.

33. A gray scale modified data generation method for generating modified gray scale outline data based on gray scale image data, comprising the steps of:

assigning step for assigning a color level to each source pixel;

gray scale bold image data generating step for generating gray scale bold image data based on said gray scale image data;

background reverse video data generating step for generating background reverse video data by reversing the color level of each source pixel in said gray scale image data; and background reverse video data overwriting step for overwriting a color level of each pixel of said background reverse video data having a non-background color level of said gray scale image data over a color level of each pixel in a corresponding position in said gray scale bold image data.

34. The method of claim 33, wherein said gray scale bold image data generating step includes:

a generating step for generating a plurality of pieces of shifted data by shifting said gray scale image data in a plurality of predetermined directions, such as vertically and horizontally, by one pixel;

a first synthesizing step for generating synthesized gray scale data by synthesizing using a method to validate data exhibiting a highest color level among all of pixels in a corresponding position in said plurality of pieces of shifted data shifted by said generating step;

an updated data generating step for generating bi-level data by changing color levels of pixels having a non-background color level of said gray scale image data to a foreground color level; and a second synthesizing step for generating gray scale bold image data by overwriting only color levels of pixels having a foreground color level in the bi-level data generated by said updated data generating step over color levels of corresponding pixels in said synthesized gray scale data synthesized by said first synthesizing step.

35. A method for generating modified character data including a background color, a foreground color, and at least one intermediate color, from original character data including a background color, a foreground color, and at least one intermediate color, comprising the steps of:

(a) receiving the original character in an input unit;

(b) expressing the character as a plurality of grid units having varying shade levels, said shade levels based on a color intensity of each said grid unit ranging from a zero color intensity for said background color to a maximum color intensity for said foreground color, and said grid units of a sufficiently small size such that the color intensity of each grid unit is substantially uniform;

(c) storing the shade level for each grid unit expressed in step (b);

(d) shifting the grid units of step (b) a predetermined number of units in both horizontal directions, and storing the shade levels for each grid unit;

(e) shifting the grid units of step (b) a predetermined number of units in both vertical directions, and storing the shade levels for each grid unit;

(f) assigning each grid unit the maximum shade level said grid unit experienced in steps (c), (d), or (e);

(g) assigning each grid unit in step (b) having a nonzero color intensity a maximum color intensity;

(h) combining the grid units of step (g) with the grid units of step (f) to provide modified character data; and (i) outputting the modified character data.

36. The method for generating modified character data as recited in claim 35 further including the step of repeating steps (b) through (h) a predetermined number of times to increase the effect.

37. The method for generating modified character data as recited in claim 35 wherein the predetermined number of units in steps (d) and (e) is one.

38. The method for generating modified character data as recited in claim 35 wherein the number of intermediate colors is independent of the number of grid units.

39. A method for generating modified character data including a background color, a foreground color, and at least one intermediate color, from original character data including a background color, a foreground color, and at least one intermediate color, comprising the steps of:

(a) receiving the original character in an input unit;

(b) expressing the character as a plurality of grid units having varying shade levels, said shade levels based on a color intensity of each said grid unit ranging from a zero color intensity for said background color to a maximum color intensity for said foreground color, and said grid units of a sufficiently small size such that the color intensity of each grid unit is substantially uniform;

(c) storing the shade level for each grid unit expressed in step (b);

(d) comparing the shade level of each neighboring grid unit of a source grid unit;

(e) assigning each grid unit the maximum shade level of a neighboring grid unit;

(f) assigning each grid unit in step (b) having a nonzero color intensity a maximum color intensity;

(g) combining the grid units of step (e) with the grid units of step (f) to provide modified character data; and (h) outputting the modified character data.

40. The method for generating modified character data as recited in claim 39 further including the step of repeating steps (b) through (g) a predetermined number of times to increase the effect.

41. The method for generating modified character data as recited in claim 39 wherein the number of intermediate colors is independent of the number of grid units.

42. A system for generating modified character data having a background color, a foreground color, and at least one intermediate color, from original character data including a background color, a foreground color, and at least one intermediate color, said system comprising:

first processing means for receiving said original character data as a plurality of grid units, each said grid unit including an assigned shade level corresponding to a scale from said background color to said foreground color, said processing means storing the shade level for each grid unit;

second processing means for comparing the shade level of each source grid unit with the shade level of each grid unit neighboring said source grid unit, and assigning said source grid unit the maximum shade level of said neighboring grid unit;

third processing means for retrieving the shade level for each grid unit stored in said first processing means, and for assigning each nonbackground color the shade level corresponding to said foreground color;

fourth processing means for comparing the shade levels determined by said second processing means and said third processing means, and for assigning each grid unit the greater value as determined by said comparison; and means to output the shade levels of each grid unit as determined by said fourth processing means.

* * * * *

UNITED STATES PATENT AND TRADEMARK OFFICE
CERTIFICATE OF CORRECTION

PATENT NO : 5,748,798
DATED : May 5, 1998
INVENTOR(S): Nakai et al.

It is certified that error appears in the above-identified patent and that said Letters Patent is hereby corrected as shown below:

On the cover page, [73] Assignee, delete "Matsushita Wlectric Ind." and insert:

--Matsushita Electric Ind.--.

Signed and Sealed this

Fifteenth Day of September, 1998

Attest:

BRUCE LEHMAN

Attesting Officer

Commissioner of Patents and Trademarks